(12) United States Patent
Yamamoto

(10) Patent No.: US 8,941,750 B2
(45) Date of Patent: Jan. 27, 2015

(54) IMAGE PROCESSING DEVICE FOR GENERATING RECONSTRUCTION IMAGE, IMAGE GENERATING METHOD, AND STORAGE MEDIUM

(71) Applicant: Casio Computer Co., Ltd., Tokyo (JP)

(72) Inventor: Ryohei Yamamoto, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 36 days.

(21) Appl. No.: 13/721,582

(22) Filed: Dec. 20, 2012

(65) Prior Publication Data

US 2013/0162861 A1 Jun. 27, 2013

(30) Foreign Application Priority Data

Dec. 27, 2011 (JP) ................................. 2011-284969
Dec. 27, 2011 (JP) ................................. 2011-285188
Dec. 27, 2011 (JP) ................................. 2011-287041
Jul. 31, 2012 (JP) ................................. 2012-169655

(51) Int. Cl.
*H04N 5/225* (2006.01)
*H04N 9/04* (2006.01)
*H04N 13/04* (2006.01)
*H04N 13/02* (2006.01)

(52) U.S. Cl.
CPC ............... *H04N 9/045* (2013.01); *H04N 13/04* (2013.01); *H04N 13/02* (2013.01); *H04N 5/2254* (2013.01)
USPC ..................................... 348/218.1; 348/222.1

(58) Field of Classification Search
USPC .............. 348/218.1, 222.1; 396/332; 382/154
See application file for complete search history.

(56) References Cited

U.S. PATENT DOCUMENTS

| 6,552,744 | B2 * | 4/2003 | Chen ........................... 348/218.1 |
| 7,620,309 | B2 | 11/2009 | Georgiev |
| 7,949,252 | B1 * | 5/2011 | Georgiev ...................... 396/334 |
| 8,103,111 | B2 | 1/2012 | Horie et al. |
| 8,588,516 | B2 * | 11/2013 | Nagasaka et al. ............. 382/154 |
| 2009/0154794 | A1 * | 6/2009 | Kim et al. ..................... 382/154 |

(Continued)

FOREIGN PATENT DOCUMENTS

| JP | 2008-515110 A | 5/2008 |
| JP | 2008-182692 A | 8/2008 |

(Continued)

OTHER PUBLICATIONS

Japanese Office Action dated Mar. 12, 2013 (and English translation thereof) in counterpart Japanese Application No. 2012-169655.
Japanese Office Action dated Jun. 18, 2013 (and English translation thereof) in counterpart Japanese Application No. 2013-059384.

* cited by examiner

*Primary Examiner* — Gevell Selby
(74) *Attorney, Agent, or Firm* — Holtz, Holtz, Goodman & Chick PC

(57) ABSTRACT

A sub-image extractor extracts a target sub-image from a light field image. A partial area definer defines a predetermined area in the target sub-image as a partial area. A pixel extractor extracts pixels from the partial area, the number of pixels meeting correspondence areas of a generation image. The pixel arranger arranges the extracted pixels to the correspondence areas of the generation image in an arrangement according to the optical path of the optical system which photographs the light field image. Pixels are extracted for all sub-images in the light field image, and are arranged to the generation image to generate a reconstruction image.

26 Claims, 33 Drawing Sheets

(56) References Cited

U.S. PATENT DOCUMENTS

2010/0020187 A1    1/2010  Georgiev
2011/0211824 A1*   9/2011  Georgiev et al. ............. 396/332
2012/0019712 A1    1/2012  Ng et al.

2012/0300097 A1   11/2012  Ng et al.

FOREIGN PATENT DOCUMENTS

| | | |
|---|---|---|
| JP | 2008-294741 A | 12/2008 |
| JP | 2009-532993 A | 9/2009 |
| JP | 2010-273035 A | 12/2010 |
| JP | 2011-135170 A | 7/2011 |

| AREA DEFINITION TABLE | |
|---|---|
| IMAGE DISPLACEMENT DEGREE | AREA SIZE |
| 0~4 | 4 |
| 5~6 | 6 |
| 10~15 | 8 |
| ... | ... |

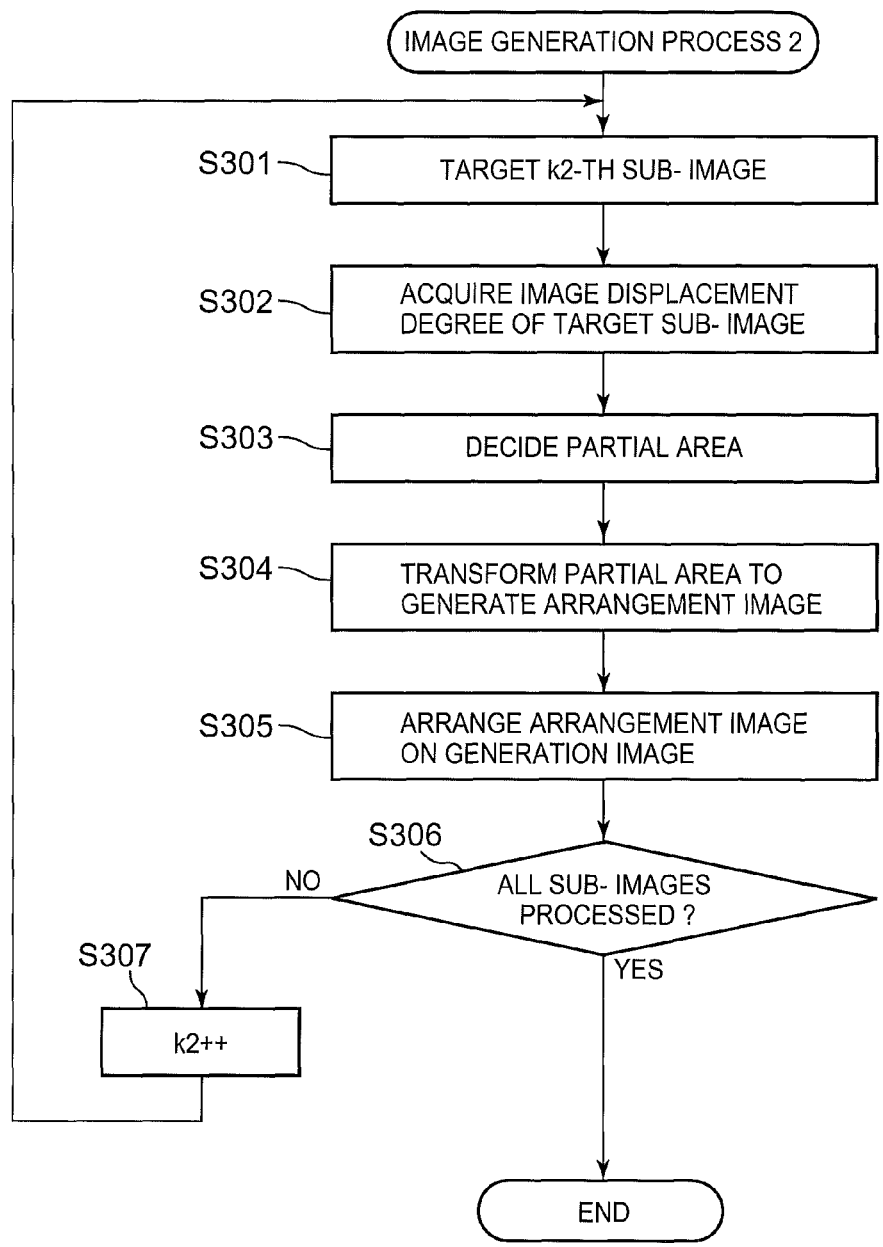

FIG. 13C

| RECONSTRUCTION DISTANCE (m) | IMAGE DISPLACEMENT DEGREE (PIXEL) | ML FOCAL LENGTH (m) | ARRANGEMENT INTERVAL (PIXEL) |
|---|---|---|---|
| 1~5 | 0~4 | 1~5 | 3 |
| | | 6~20 | 2 |
| | | 20~100 | 3 |
| | 5~9 | 1~5 | 4 |
| | | 6~20 | 3 |
| | | 20~100 | 5 |
| | 4~7 | 1~5 | 3 |
| | ... | ... | ... |
| 6~20 | 0~4 | 1~5 | 3 |
| | | 6~20 | 3 |
| | | 20~100 | 2 |
| | ... | ... | ... |

FIG. 13D

| BLURRING INTENSITY | CLIPPING SIZE CORRECTION |
|---|---|
| 0 | 1 TIME |
| 1~2 | 1.2 TIMES |
| 3~5 | 1.5 TIMES |
| ... | ... |

| a1 | a2 | a3 | b1 | b2 | b3 | c1 | c2 | c3 | d1 | d2 | d3 |
| a4 | a5 | a6 | b4 | b5 | b6 | c4 | c5 | c6 | d4 | d5 | d6 |
| a7 | a8 | a9 | b7 | b8 | b9 | c7 | c8 | c9 | d7 | d8 | d9 |
| e1 | e2 | e3 | f1 | f2 | f3 | g1 | g2 | g3 | h1 | h2 | h3 |
| e4 | e5 | e6 | f4 | f5 | f6 | g4 | g5 | g6 | h4 | h5 | h6 |
| e7 | e8 | e9 | f7 | f8 | f9 | g7 | g8 | g9 | h7 | h8 | h9 |
| i1 | i2 | i3 | j1 | j2 | j3 | k1 | k2 | k3 | l1 | l2 | l3 |
| i4 | i5 | i6 | j4 | j5 | j6 | k4 | k5 | k6 | l4 | l5 | l6 |
| i7 | i8 | i9 | j7 | j8 | j9 | k7 | k8 | k9 | l7 | l8 | l9 |

| RECONSTRUCTION DISTANCE (m) | ML FOCAL LENGTH (m) | CLIPPING SIZE (PIXEL) |
|---|---|---|
| 1~5 | 1~5 | 6 |
|  | 6~20 | 7 |
|  | 20~100 | 8 |
|  | ... | ... |
| 6~20 | 1~5 | 5 |
|  | 6~20 | 6 |
|  | 20~100 | 7 |
|  | ... | ... |

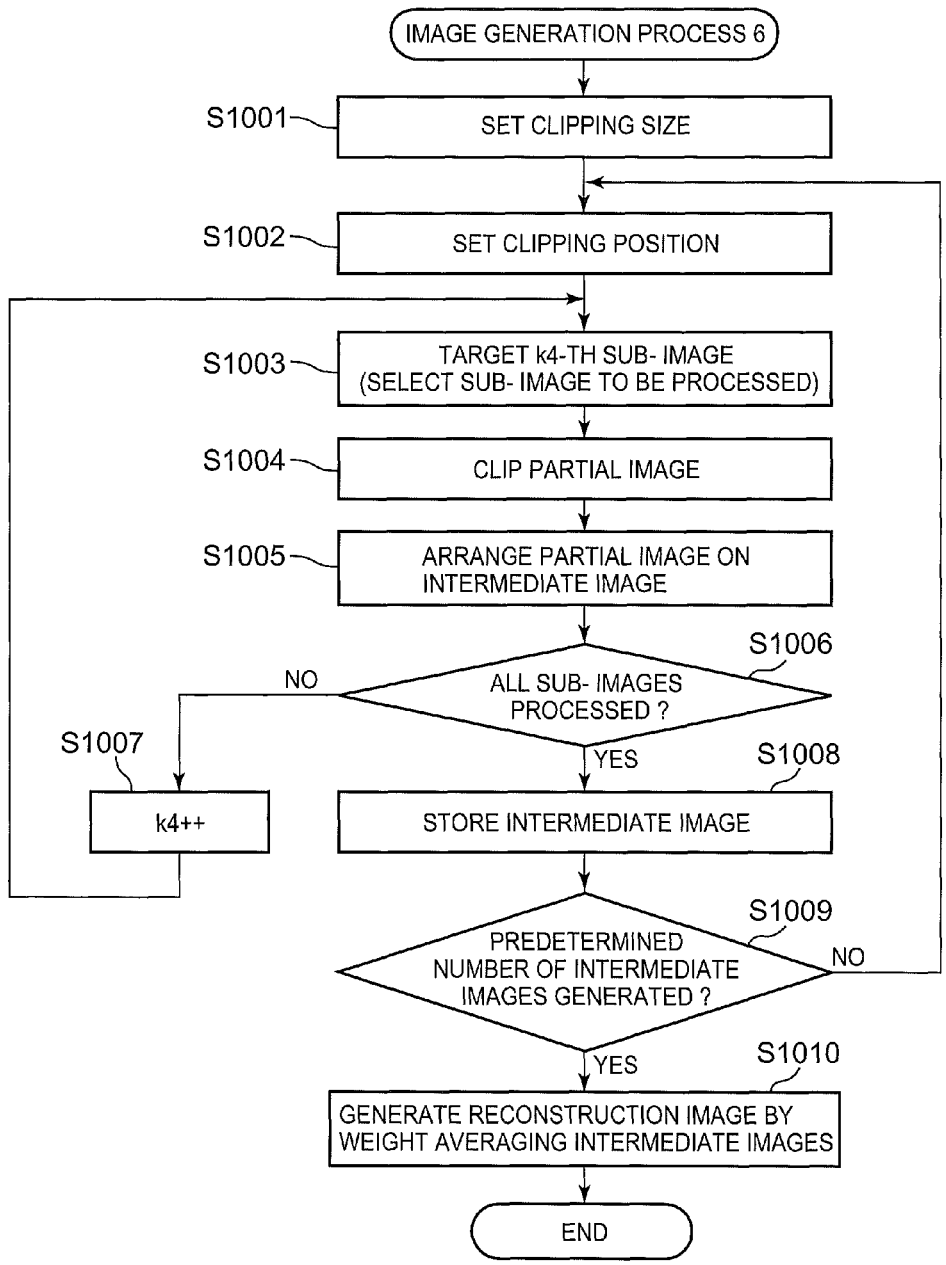

IMAGE PROCESSING DEVICE FOR GENERATING RECONSTRUCTION IMAGE, IMAGE GENERATING METHOD, AND STORAGE MEDIUM

CROSS-REFERENCE TO RELATED APPLICATION

This application claims the benefits of Japanese Patent Application No. 2011-285188, filed on Dec. 27, 2011, Japanese Patent Application No. 2011-284969, filed on Dec. 27, 2011, Japanese Patent Application No. 2011-287041, filed on Dec. 27, 2011, and Japanese Patent Application No. 2012-169655, filed on Jul. 31, 2012, the entire disclosure of which is incorporated by references herein.

FIELD

The present invention relates to a technique which reconstructs an image.

BACKGROUND

In recent years, an imaging device which captures information on direction distribution of incident light, that is an imaging device called as "plenoptic camera", is known.

In optical systems of the plenoptic camera, a compound eye-like lens (hereinafter, referred to as "micro lens array"), in which extremely small lenses (hereinafter, referred to as "micro lenses") are repeatedly arranged, is inserted between a conventional imaging lens (hereinafter, referred to as "main lens") and an imaging element.

Each micro lens which forms a micro lens array distributes the light focused by the main lens to a plurality of pixel groups in an imaging element according to the angle of the received light.

That is, if an image focused on an imaging element by each micro lens is hereinafter referred to as "sub-image," data of image formed by an aggregate of a plurality of sub-images is output from an imaging element as data of a captured image.

Such captured image by the plenoptic camera is hereinafter referred to as "light field image."

The light field image is generated by the light which is incident through not only a conventional main lens but also the micro lens array. Therefore, the light field image includes two-dimensional spacial information which indicates from which part the light beam reaches and is included in conventional captured images, and further includes two-dimensional direction information indicating a direction from which the light beam reaches when viewed from imaging element, as information not included in conventional captured images.

The plenoptic camera, after imaging the light field image, can reconstruct an image on a plane separated at an arbitrary distance ahead at the time of imaging using the data of the light field image.

In other words, the plenoptic camera can freely make data of an image (hereinafter, referred to as "reconstruction image") by using data of light field image after the imaging as if the image is focused at predetermined distance and captured, even if the light field image is captured without focusing at predetermined distance.

SUMMARY

An image processing device according to a first aspect of the present invention comprises: an image obtainer that obtains a multi-view image in which sub-images from viewpoints are aligned; a clipper that clips partial images from the sub-images; and a generator that generates a reconstruction image by arranging the partial images based on an alignment position of the sub-images corresponding to the partial images.

An image processing device according to a second aspect of the present invention comprises: an image obtainer that obtains a multi-view image in which sub-images from viewpoints are aligned; a first selector that selects a first image from the sub-images; a pixel selector that selects a first pixel included in the first image; a second selector that selects a second image from the sub-images; a searcher that searches a second pixel corresponding to the first pixel among pixels included in the second image; a pixel processor that processes the first pixel and the second pixel based on a position relationship between the first pixel and the second pixel; and a reconstructor that reconstructs an image from the sub-images processed by the pixel processor.

An image generating method according to a third aspect of the present invention comprises steps of: obtaining a multi-view image in which sub-images from viewpoints are aligned; clipping partial images from the sub-images; and arranging the partial images based on an alignment position of the sub-images corresponding to the partial images to generate the reconstruction image.

A non-transitory computer-readable storage medium according to a fourth aspect of the present invention stores a computer-executable program, the program causes a computer to execute: obtaining a multi-view image in which sub-images from viewpoints are aligned; clipping partial images from the sub-images; and arranging the partial images based on an alignment position of the sub-images corresponding to the partial images to generate the reconstruction image.

BRIEF DESCRIPTION OF THE DRAWINGS

A more complete understanding of this application can be obtained when the following detailed description is considered in conjunction with the following drawings, in which:

FIG. 11 is a flowchart of an image generation process executed by the digital camera according to the embodiment 1;

FIG. 13C is a drawing illustrating an example of an arrangement interval table according to the embodiment 1;

FIG. 13D is a drawing illustrating an example of a clipping size correction table according to the embodiment 1;

FIG. 28 is a flowchart of an image generation process according to the embodiment 5;

DETAILED DESCRIPTION

Figure 1A:
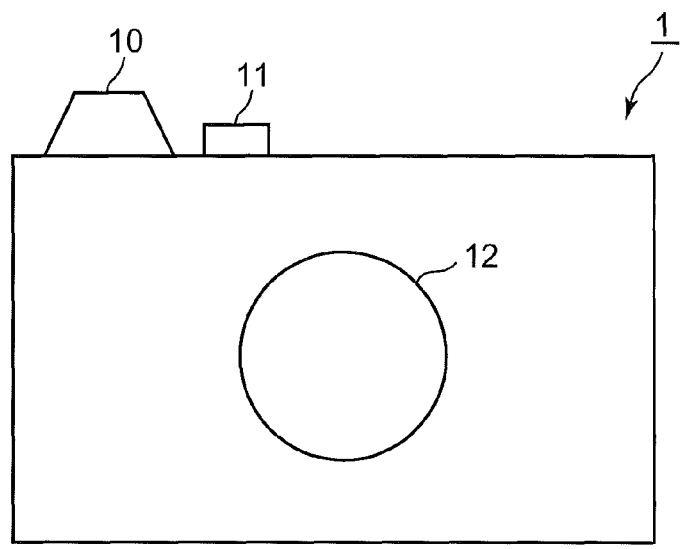
FIG. 1A is an front view of a digital camera according to an embodiment 1 of the present invention.

Hereinafter, an imaging device according to embodiments of the present invention will be described with reference to drawings. Besides, the identical reference is given to the identical or corresponding part in the drawings.

(Embodiment 1)

Figure 1B:
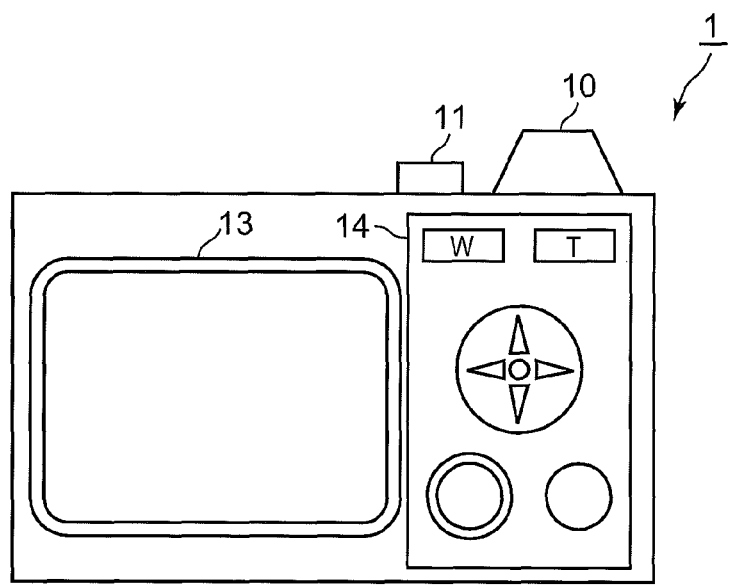
FIG. 1B is a back view of the digital camera according to the embodiment 1.

An external appearance of a digital camera 1 as one embodiment of the imaging device according to the present invention will be described. FIG. 1A illustrates an external appearance of a front side. FIG. 1B illustrates an external appearance of a back side. The digital camera 1 includes imaging lenses (lens group) 12 in the front side. The back side of the digital camera 1 is provided with a liquid crystal display monitor 13 as a display, and an operator 14 including a mode dial, a cursor key, a SET key and zoom buttons (W button and T button), a menu key, and the like. Moreover, a shutter key 10 and a power button 11 are provided on a top surface. Besides, although not illustrated, the side part is provided with a USB terminal connector used when connecting with an external device such as a personal computer (hereinafter, PC) and a modem via USB cables.

Next, a hardware configuration of the digital camera 1 will be illustrated with reference to FIG. 2.

The digital camera 1 includes a CPU (Central Processing Unit) 21, a ROM (Read Only Memory) 22 and a RAM (Random Access Memory) 23, and an internal bus 20. The digital camera 1 includes an I/O interface 30, an imager 31, an input device 32, an output device 33, a memory 34, a display 35, a communicator 36, and a media drive 37.

The CPU 21 performs a process for outputting image, which is described below, in accordance with a program stored in the ROM 22 or the memory 34, using the RAM 23 as workspace.

At least one of the ROM 22 and memory 34 stores data required for performing various kinds of processes by the CPU 21, the processes being described below. The stored data is arbitrarily loaded to the RAM 23. Moreover, the RAM 23 timely stores the intermediate data of the process mentioned below.

The CPU 21, the ROM 22, the RAM 23, and the I/O interface 30 are connected one another through the internal bus 20. Moreover, the imager 31, the input device 32, the output device 33, the memory 34, the display 35, the communicator 36, and the media drive 37 are connected to the I/O interface 30.

The imager 31 includes a main lens 311, a micro lens array 312, and an imaging element 313. Further details of the imager 31 are described below with reference to FIG. 3.

The input device 32 includes input devices and a transmitter, the input devices being various buttons of a shutter key 10 and an operator 14, and a touch panel provided on the display 35 and the like, and the transmitter transferring information on the operation performed by the user using the input devices to the I/O interface 30. The user can enter a command to the digital camera 1 using the input device 32, and can enter various kinds of information.

The output device 33 includes a monitor, loudspeaker and the like, and outputs various images and various voices which are generated by the process of the CPU 21.

The memory 34 includes a hard disk, a DRAM (Dynamic Random Access Memory) and the like, and stores the data of various images and various kinds of setting information, such as a light field image and a reconstruction image which are mentioned below, transferred from the CPU 21 or input from other equipment.

The communicator 36 controls a communication with other equipment (not illustrated) through a network including the Internet.

A removable media 38 (a magnetic disc, an optical disc, a magneto-optical disc, semiconductor memory, or the like) is inserted arbitrarily in the media drive 37. A program retrieved from the removable media 38 by the media drive 37 is installed in the memory 34 if necessary. Moreover, the removable media 38 can store the various kinds of data such as the data of the images stored in the memory 34, as is the case with the memory 34. The display 35 includes a liquid crystal display, an electro-luminescence display, or the like. The display 35 displays the live view images prior to photographing (in a photographing preparatory phase or live view mode) and an image for confirmation after photographing, which are generated by the process described later and transferred from the CPU 21. Hereinafter, it is described assuming that the display 35 has the resolution of 320×240 pixels.

With respect to the digital camera 1 with such configuration, a configuration example of an optical system therein will be described with reference to FIG. 3.

In the optical system of the digital camera 1, a main lens 311, a micro lens array 312, and imaging element 313 are arranged in this order when viewed from photographic object OB.

In the micro lens array 312, N×M pieces of micro lenses 312-1 to 312-N×M (N and M are two or more arbitrary integer) are arranged. FIG. 3 illustrates micro lenses (N pieces) in one column of horizontal direction. Hereinafter, it is described assuming that the micro lenses 312-$i$ ($i$ is an integer within a range of 1 to N×M) have the same diameter, and are arranged in a lattice pattern at the same interval in the micro lens array 312.

The main lens 311 condenses a light flux emitted from a point on the photographic object OB to form an image on a predetermined plane MA, and causes the light flux to be entered in the micro lens array 312. Hereinafter, the plane on which the image is formed by the main lens 311 is referred to as "main lens imaging plane MA." In the present embodiment, the main lens imaging plane MA is presented between the main lens 311 and the imaging element 313.

The micro lenses 312-$i$ condenses the light flux which is entered through the main lens 311 from the photographic object OB for each incidence direction, to form sub-images on the imaging element 313.

In other words, in the imaging element 313, a plurality of sub-images are formed by each of a plurality of micro lenses 312-1 to 312-N×M, and the light field image is generated which is an aggregate of the plurality of sub-images.

Thus, the images seen from different angles to the identical photographic object are recorded as a plurality of corresponding sub-images. In other words, an image is obtained in which a plurality of sub-images when the photographic object is seen from a plurality of viewpoints at the same time are aligned.

The sub-images obtained in this manner includes images when the identical photographic object is seen from different angles, different viewpoints. Therefore, selecting and combining suitable pixels from a plurality of sub-images allows a reconstruction of an image imaged by focusing on a plane separated at arbitrary distance ahead when imaging, and an image the depth of field of which is arbitrarily changed.

Figure 4:
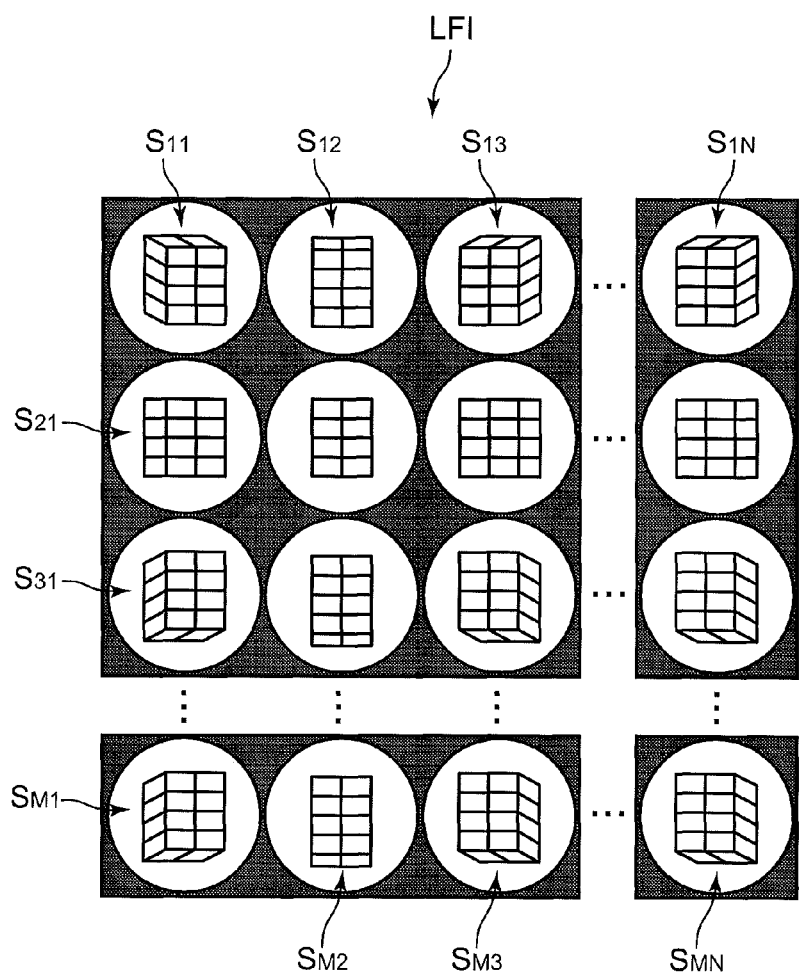
FIG. 4 is a conceptual diagram of a light field image according to the embodiment 1.

An example of the light field image LFI which is obtained by photographing the photographic object OB of a block shape is illustrated in FIG. 4.

The light field image LFI includes the images (sub-images $S_{11}$ to $S_{MN}$) which correspond to N×M pieces of micro lenses 312-$i$ arranged in the lattice pattern, respectively. For example, the upper left sub-image $S_{11}$ corresponds to the image when the photographic object OB is photographed from the upper left, and the lower right sub-image $S_{MN}$ corresponds to the image when the photographic object OB is photographed from the lower right. Images in which a plurality of sub-images from a plurality of viewpoints is aligned like the light field image LFI are multi-view images.

The sub-images on the i-th row (sub-images in one row in horizontal direction) $S_{i1}$-$S_{iN}$ correspond to stereo images in which the image formed by the main lens 311 is imaged by the micro lenses 312-$i$ arranged in i-th row in the micro lens array 312. Similarly, the sub-images on the j-th column (sub-images in one column in vertical direction) $S_{1j}$-$S_{Mj}$ correspond to stereo images in which the image formed by the main lens 311 is imaged by the micro lenses 312-$i$ arranged in j-th column in the micro lens array 312.

In the present embodiment, each sub-image S is a gray scale image, and each pixel which forms the sub-image has a pixel value (scalar value).

In the present embodiment, 80 pieces of micro lenses are arranged in horizontal direction (x-axis), and 60 pieces of micro lenses are arranged in vertical direction (y-axis), in the micro lens array 312. Each sub-image corresponding to each micro lens is in an area with 60×60 pixels to form the light field image LFI which has the resolution of 4800×3600 pixels.

Figure 3:
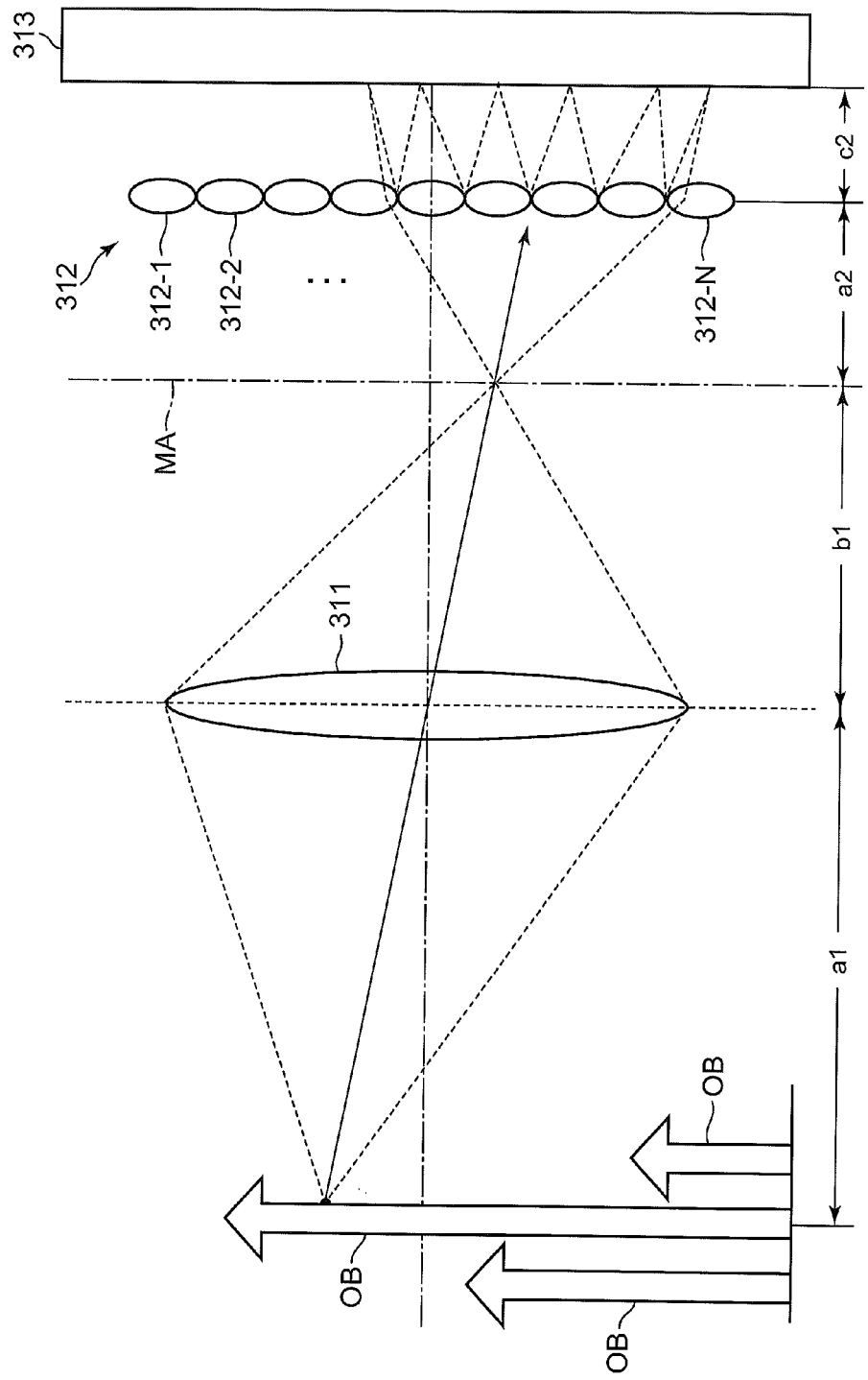
FIG. 3 is an exemplary diagram illustrating a configuration example of an optical system in the digital camera according to the embodiment 1.

In the optical system as illustrated in FIG. 3, the focal point of the main lens is presented in the main lens side from the imaging element and the focal point of the micro lenses is presented behind the imaging element. In the light field image LFI photographed by such optical system, the photographic object is captured as reverted image which is inverted point-symmetric manner in the unit of sub-image. On the other hand, by an optical system which has a focal point of the main lens behind the imaging element, the photographic object is captured as an image which is not inverted on the sub-image. This is the same when the focal point of the main lens is in the main lens side from the imaging element, and the focal point of the micro lenses is in front of the imaging element. The digital camera 1 generates the reconstruction image RI from such light field image LFI and outputs the reconstruction image.

Figure 5:
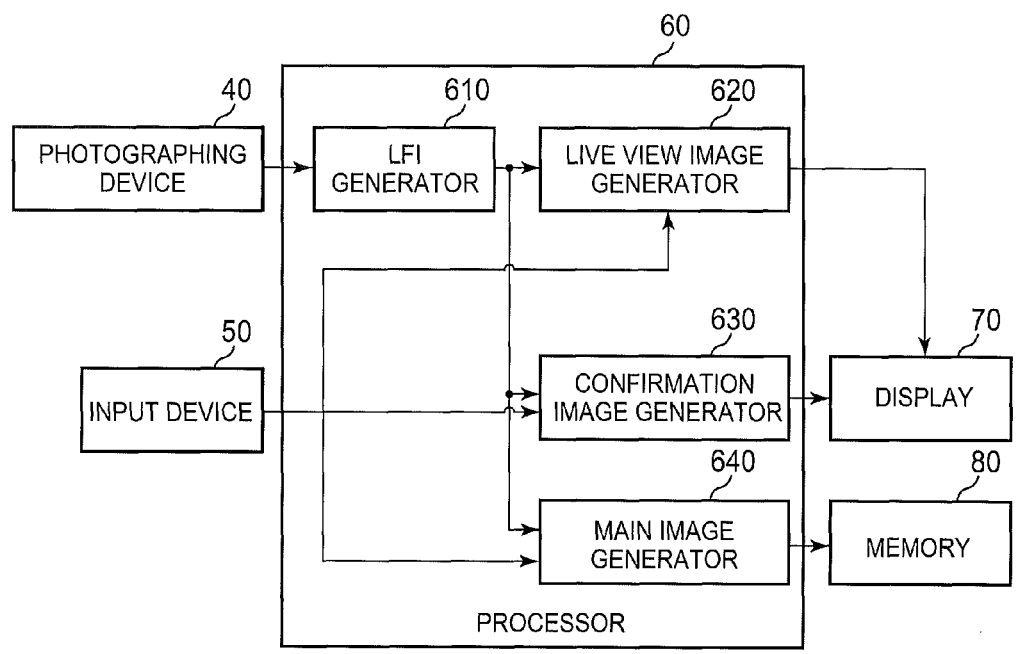
FIG. 5 is a block diagram illustrating a functional constitution of the digital camera according to the embodiment 1.

The digital camera 1 functions as, according to the above-described physical configuration, a photographing device 40, an input device 50, an image generation processor 60 including an LFI generator 610, a live view image generator 620, a confirmation image generator 630 and a main image generator 640, a display 70, and a memory 80, as illustrated in FIG. 5.

The photographing device 40 photographs the photographic object by the main lens 311 and the micro lens array 312, and transfers the information to the LFI generator 610. The input device 50 acquires photographing setting stored in the ROM 22 and the RAM 23, a user's operation received by the input device 32, and reconstruction setting stored in the ROM 22 or the RAM 23, and transfers acquired information to each element of the image generation processor 60.

The LFI generator 610 generates the light field image LFI (multi-view image), which is exemplified in FIG. 4, from the information transferred from the photographing device 40. The LFI generator 610 transfers the generated light field image LFI to the live view image generator 620, the confirmation image generator 630, and the main image generator 640.

The live view image generator 620, the confirmation image generator 630, and the main image generator 640 generate the reconstruction image from the sub-images of the light field image LFI based on the position of each micro lens.

The process to generate the reconstruction image based on the position of each micro lens from the light field image is hereinafter referred to as "reconstruction process." In the reconstruction process, a surface on which the photographic object to be reconstructed is virtually presented is referred to as "reconstruction surface."

The live view image generator 620 generates images for live view (live view images) among the reconstruction images. The process to generate the live view images is referred to as "live view image generation process." In the live view mode prior to photographing, it is desired to display the images of the current photographic object switching rapidly for photographing preparation. For this reason, the live view image generation process is made to use small calculations in the present embodiment. The live view image generator 620 outputs the generated live view image to the display 70. Since the live view image generator 620 generates the images used for the live view mode prior to photographing (preparation of photographing), the live view image generator 620 is also referred to as a preparation generator or a first generator.

The confirmation image generator 630 generates the image for the confirmation (confirmation image) after image photographing among the reconstruction images. The process to generate the confirmation image is referred to as a "confirmation image generation process." In the confirmation after photographing, image quality like the image for viewing is not required, whereas suitable degree of image quality is desired so that it is possible to confirm what the obtained image is like. Moreover, although it may be necessary to display the confirmation image promptly after photographing, there is no necessity to generate an image as quickly as in the live view mode. For this reason, a confirmation image generation process is made to use more calculations than live view image generation process, so that the confirmation image generation process can generate the image with higher image quality. The confirmation image generator 630 outputs the generated confirmation image to the display 70. High image quality herein not only represents high resolution, but also generally indicates images which are convenient for a user, for example, image with high accuracy of reconstruction, image with low noises, and image in which suitable blurring is added for emphasize the non-blurred features and emphasize the blurred features of the photographic objects. The confirmation image generator 630 generates the image for a display in order to confirm the photographed image, and the confirmation image generator 630 is therefore referred to as display generator or a second generator as well.

The main image generator 640 generates the image for viewing (main image) among the reconstruction images. The process to generate the main image is referred to as "main image generation process." In order to satisfy the needs for viewing, the main image is desired that the image meets the reconstruction setting requested by a user, and has a high image quality. For this reason, the main image generation is made to use many calculations. The main image generator 640 stores the generated main image to the memory 80. The main image generator 640 is referred to as a third generator as well. It is noted that the live view image generator 620, the confirmation image generator 630, and the main image generator 640 may not be distinguished, and may be simply referred to as a generator. Moreover, when the reconstruction image generated by the confirmation image generator 630 (the second generator) satisfies a need of user's image quality, the confirmation image generator 630 may also serve as the main image generator 640 (a third generator).

The display 70 displays the transferred reconstruction images. The display 70 has the resolution of 320×240 pixels in the embodiment.

The memory 80 stores the transferred main image. The memory 80 may store the main image with a corresponding confirmation image.

The process (image output process 1) for acquiring the light field image LFI and outputting the reconstruction image, which is performed by the digital camera 1, will be described with reference to FIG. 6.

Figure 6:
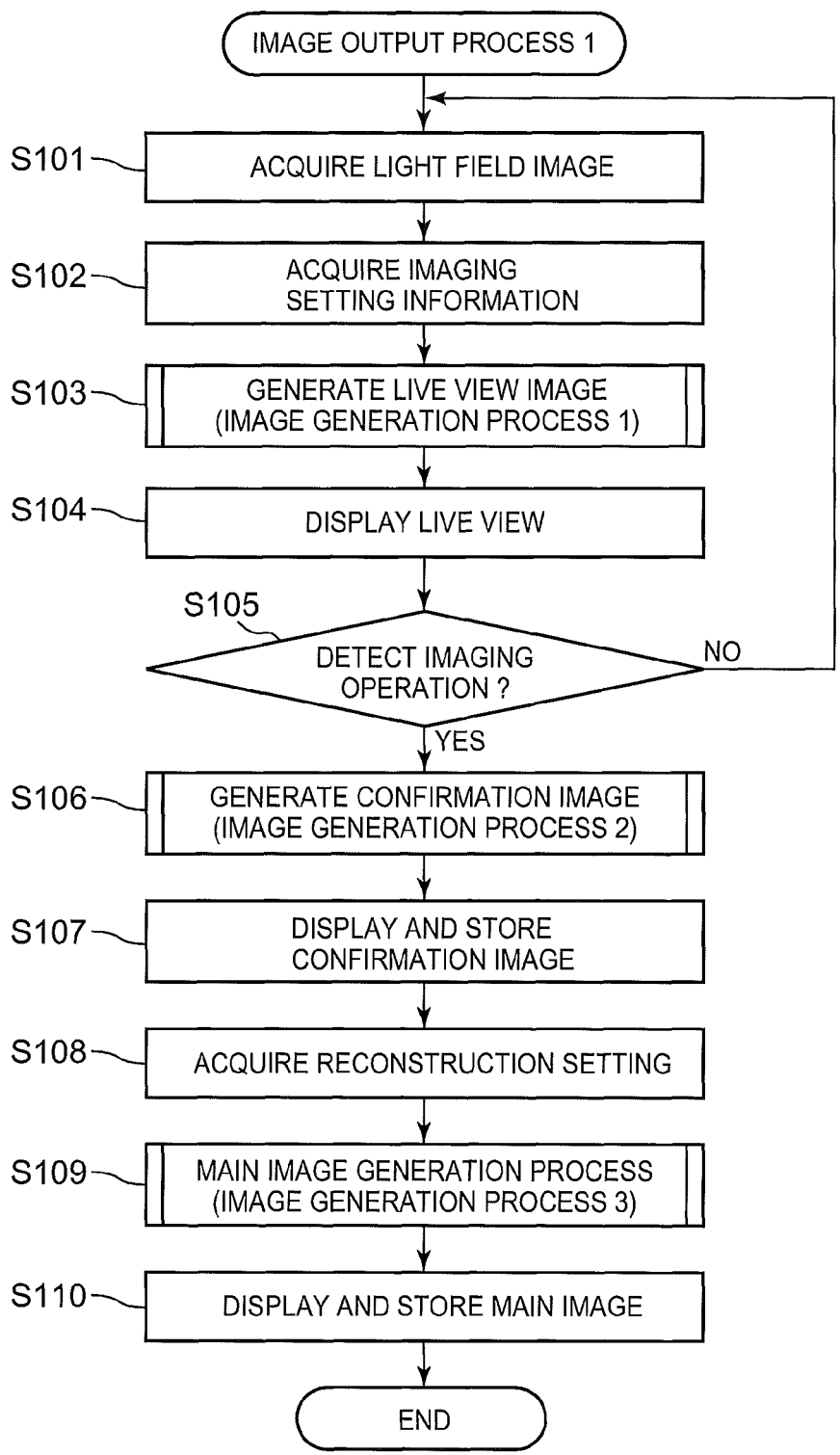
FIG. 6 is a flowchart of an image output process according to the embodiment 1.

When the digital camera 1 is powered on and the input device 50 receives an operation to prepare the photographing, the digital camera 1 starts the image output process 1 illustrated in FIG. 6.

In the image output process 1, the digital camera 1 first acquires the light field image LFI using the photographing device 40 and LFI generator 610 (step S101).

Next, the input device 50 acquires current imaging setting information stored in the RAM 23 and the ROM 22 (step S102). The imaging setup information includes current focal length $f_{ML}$ of the main lens 311, diaphragm (F value), position information of each micro lens in the micro lens array 312, position information of the micro lens array 312 and the imaging element 313, and the like.

When the imaging setting information is acquired, the live view image generator 620 performs a live view image generation process (step S103). In the present embodiment, the live view image generation process is an image generation process 1 described below.

Figure 7:
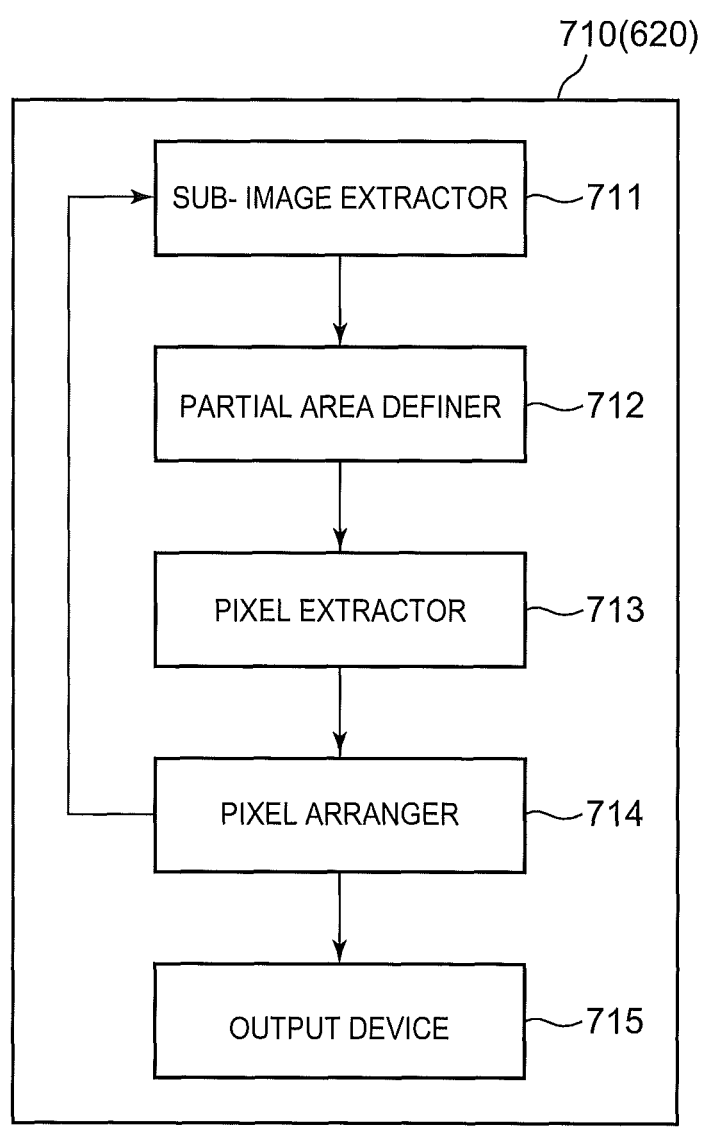
FIG. 7 is a block diagram illustrating a functional constitution of a live view image generator according to the embodiment 1.

The functional constitution of the live view image generator 620 which performs the live view image generation process will be described with reference to FIG. 7. In the present embodiment, the live view image generator 620 corresponds to a first reconstruction image generator 710 illustrated in FIG. 7.

The first reconstruction image generator 710 includes a sub-image extractor 711, a partial area definer 712, a pixel extractor 713, a pixel arranger 714, and an output device 715. By means of such elements, the first reconstruction image generator 710 generates a first reconstruction image (live view image of the present application) as an output image from the light field image LFI. Hereinafter, it is described with an example of a case where the first reconstruction image is an image of 320×240 pixels.

The sub-image extractor 711 extracts one sub-image from the sub-images which forms the light field image LFI as a target sub-image in order, and transfers the target sub-image to the partial area definer 712.

The partial area definer 712 defines a predetermined area in the target sub-image transferred from the sub-image extractor 711 as a partial area. The details of the partial area are described below. The partial area definer 712 transfers the information indicating the partial area to the pixel extractor 713.

The pixel extractor 713 extracts pixels, in accordance with a predetermined condition, from the partial area on the target sub-image which is indicated by the information transferred from the partial area definer 712. The concrete steps of the process which extracts the pixels are described below. The pixel extractor 713 transfers the extracted pixels to the pixel arranger 714. As identifying the portion (partial area) of the sub-image which is either inside or outside a region (clipping partial area from sub-image) and extracting pixel data on the partial area, the partial area definer 712 and pixel extractor 713 also behave as a "clipper" as a whole.

The pixel arranger 714 arranges the pixels extracted by the pixel extractor 713 on the first reconstruction image. The concrete steps of the process which arranges the pixels are described below. If an images on a partial area is referred to as a "partial image," and an arranging pixel of a partial image is referred to as an "arranging a partial image," the pixel arranger 713 can be referred to as an "arranger arranging the partial image on the first reconstruction image".

The sub-image extractor 711 through the pixel arranger 71 generates the first reconstruction image, by extracting pixels using all sub-images as the target images in order, and arranging the pixels on the first reconstruction image.

The output device 715 outputs the first reconstruction image generated in this way to outside (the display 70).

Next, a reconstruction image generation process (image generation process 1) performed by the first reconstruction image generator 710 will be described with reference to FIG. 8 and FIG. 9.

Figure 8:
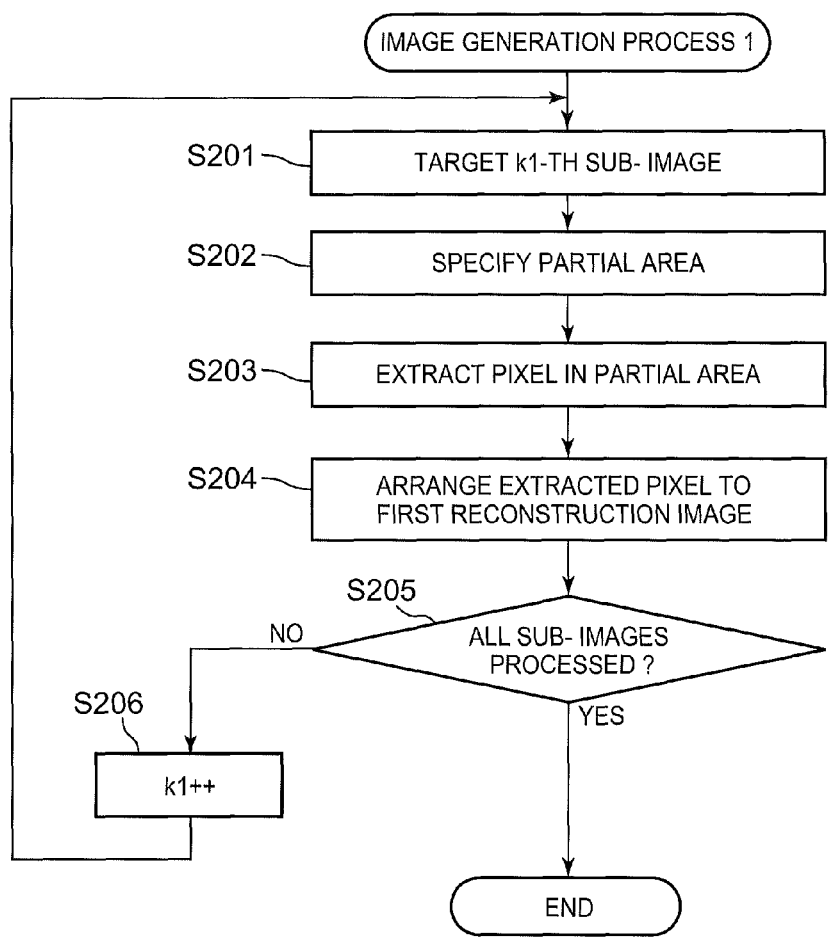
FIG. 8 is a flowchart of an image generation process executed by the digital camera according to the embodiment 1.

The live view image generator 620 (first reconstruction image generator 710), when arriving at step S103 of the image output process 1 (FIG. 6), starts the image generation process 1 illustrated in FIG. 8.

In the image generation process 1, k1 represents a counter variable, and the sub-image extractor 711 first extracts k1-th sub-image in the light field image LFI as a target sub-image (step S201).

Next, the partial area definer 712 defines the predetermined area (here, area with a square of 8×8 pixels located at the center of the sub-image) in the target sub-image as the partial area (step S202). The size of predetermined area is determined based on the range of displacement (parallax) of the pixels corresponding to photographic objects on the range of object distance designed to the digital camera 1. For example, when the range of displacement of the pixels corresponding to the nearest and farthermost objects on the range of object distance designed to the camera is from 4 pixels to 12 pixels, approximately intermediate pixels such as 8 pixels are adopted.

When the partial area is defined, the pixel extractor 713 extracts the pixels of the partial area (step S203). The number of extracted pixels is the number of pixels in an area (correspondence area) corresponding to the target sub-image in the first reconstruction image which is described below.

Then, the pixel arranger 714 arranges the extracted pixels to correspondence parts of the corresponding area on the first reconstruction image (generation image) (step S204).

The process from step S201 to step S204 will be described with reference to FIG. 9 using concrete examples.

Figure 9:
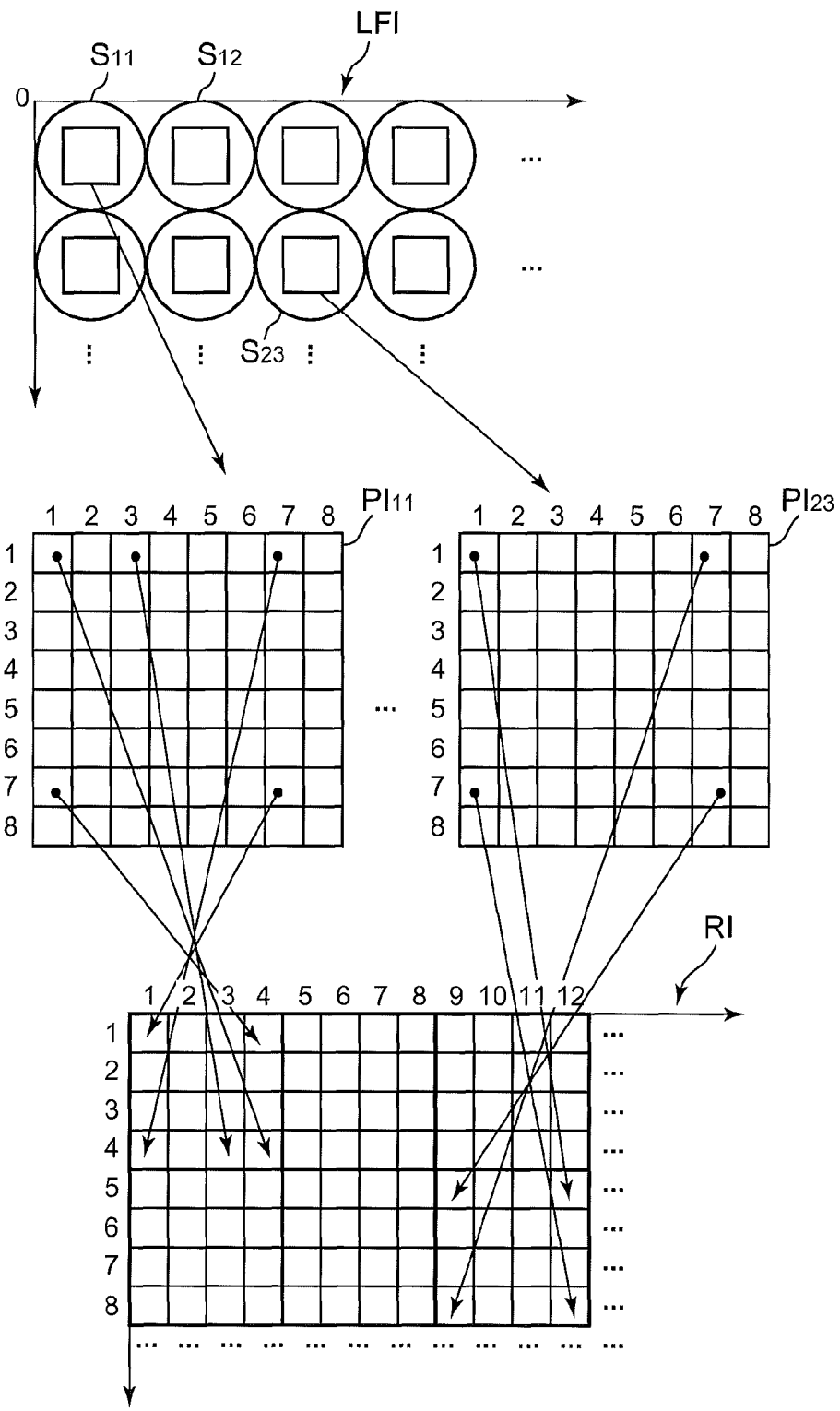
FIG. 9 is a drawing illustrating a concept of a process which generates a first reconstruction image from the light field image according to the embodiment 1.

As illustrated in the upper side of FIG. 9, in the light field image LFI, the approximately circular sub-images $S_{11}$ to $S_{MN}$ are arranged with the lattice pattern. The sub-images are extracted as the target sub-images from the sub-image $S_{11}$ in order (step S201), and the part with a square of 8×8 pixels at the central part is extracted as the partial area (step S202).

The enlargements of the partial area (partial image $PI_{11}$) extracted from the sub-image $S_{11}$ and the partial area (partial image $PI_{23}$) extracted from the sub-image $S_{23}$ are illustrated in the middle of FIG. 9. The pixels of each partial area are represented by a lattice, and the pixels is represented by the coordinates (1, 1) to (8, 8).

The example of the first reconstruction image RI is illustrated in the lower side of FIG. 9. In this example, the first reconstruction image is an image with 320×240 pixels, and each of 80×60 pieces of sub-images is divided into a correspondence area with 4×4 pixels (area illustrated by a thick line) according to the coordinates of the sub-image.

The corresponding area of $S_{11}$ is a square part with coordinates (1, 1) to (4, 4) in the first reconstruction image RI, and the correspondence area of $S_{23}$ is a square part with coordinates (9, 5) to (12, 8).

At step S203, 4×4 pixels are extracted every other pixels from the partial area. Then, at step S204, the position of the extracted pixels is inverted in four directions (point symmetry) for every sub-image, and the pixels are arranged at the inverted position on the correspondence area. This is because the image of the photographic object OB has been reversed for every sub-image, since the main lens imaging plane MA is presented in front of the imaging element 313.

In the example of FIG. 9, the pixel (1, 1) in the partial area of $S_{11}$ is arranged at the coordinate (4, 4) in the first reconstruction image RI. Moreover, the pixel (1, 3) in the partial area of $S_{11}$ is arranged at the coordinate (3, 4) in the first reconstruction image RI. In a similar way, every other pixels are extracted from the partial area and arranged, and the pixel (7, 7) in the partial area is arranged at the coordinate (1, 1) in the first reconstruction image RI.

Return to FIG. 8, when the extracted pixels are arranged to all pixels of the correspondence area with respect to the current target sub-image at step S204, it is determined whether the above-described processes have been performed on all sub-images (step S205). When an unprocessed sub-image exists (step S205; NO), the counter variable k1 is incremented (step S206), and the process is repeated from step S201 for the following target sub-image.

On the other hand, when the above-described process have been performed for all sub-images (step S205; YES), the completed first reconstruction image is regarded as the live view image, and then the image generation process 1 is terminated.

In the case where the number of pixels in the partial area is the same as the number of pixels in the correspondence area, the above-described extraction process may be omitted, and all pixels in the partial area are inverted in point symmetry manner to arrange the pixels at the inverted position on the correspondence area.

Moreover, when the pixels cannot be extracted at equal interval, for example in the case where the partial area has 11×11 pixels and the correspondence area has 4×4 pixels, the pixels are extracted in an extraction method of approximately equal intervals, such that the first pixel, the fourth pixel, the seventh pixel, and the eleventh pixel are extracted. Alternatively, the partial area (11×11 pixels) may be resized to the correspondence area (4×4 pixels) with interpolation.

Return to FIG. 6, after generating the live view image, the display 70 displays the generated live view image (step S104).

Then, it is determined whether or not the input device 50 detects an imaging (photographing) operation (operation of pressing the shutter key 10) (step S105). When it is determined that the imaging operation is not detected (step S105; NO), the digital camera 1 returns to step S101 and repeats the process for displaying the live view image.

On the other hand, when it is determined that the imaging (photographing) operation is detected (step S105; YES), the confirmation image generator 630 next performs the confirmation image generation process (step S106). In the present embodiment, the confirmation image generation process corresponds to the image generation process 2 described below.

The functional constitution of the confirmation image generator 630 which performs the confirmation image generation process will described with reference to FIG. 10A. In the present embodiment, the confirmation image generator 630 corresponds to a second reconstruction image generator 720 illustrated in FIG. 10A.

The second reconstruction image generator 720 includes a sub-image extractor 721, a displacement value calculator 722, a partial area definer 723, an arrangement image generator 724, an image arranger 725, and an output device 726. By means of such elements, the second reconstruction image generator 720 generates the second reconstruction image (the confirmation image in the present embodiment) as an output image from the light field image LFI. The second reconstruction image is, for example, an image with 320×240 pixels.

The sub-image extractor 721 extracts one sub-image from the sub-images which forms the light field image LFI as a target sub-image in order, and transfers the target sub-image to the displacement value calculator 722.

The displacement value calculator 722 calculates a degree (image displacement degree) indicating a degree of displacement of the target sub-image to a sub-image in a predetermined range around the target sub-image (peripheral sub-images).

The image displacement degree is calculated, for example by the following manners.

A predetermined area near a center of the target sub-image (for example, center area of 10×10), which is determined according to a specification of design, is referred to as a center area. A position is calculated where an image corresponding to the center area of the sub-image is presented in a sub-image on the right (if the sub-image on the right does not exist, a sub-image on the left, in this case hereinafter right-and-left reversal). Although an arbitrary known manner of determining a position where the part of image is presented in another image may be used, the present embodiment uses the following manner.

First, center area of 10×10 in the right image is set as a calculation target part. Then, it is calculated the sum of absolute values of pixel value differences between the central part and the calculation target part. Next, the sum of absolute values of differences is similarly calculated for an area shifted 1 pixel to the right. Such calculation is repeated within a range of possible parallax. Then, a position displacement of which the obtained sum of absolute values of differences is the minimum is determined as the image displacement degree.

In case of obtaining the image displacement degree from two sub-images on the right, the sum of absolute values of differences is calculated in a position which is shifted d pixels for the sub-image on immediate right, the sum of absolute values of differences is calculated in a position which is shifted 2d pixels for the sub-image next to the sub-image on immediate right, the sum of two sums is set as an evaluation function, and d is obtained for which the evaluation function is the minimum. In case of increasing the number of sub-images, it can be similarly processed.

The partial area definer 723 acquires the partial area size corresponding to the image displacement degree calculated by the displacement value calculator 722 with reference to an area definition table stored in the ROM 22.

Figures 10A, 10B:
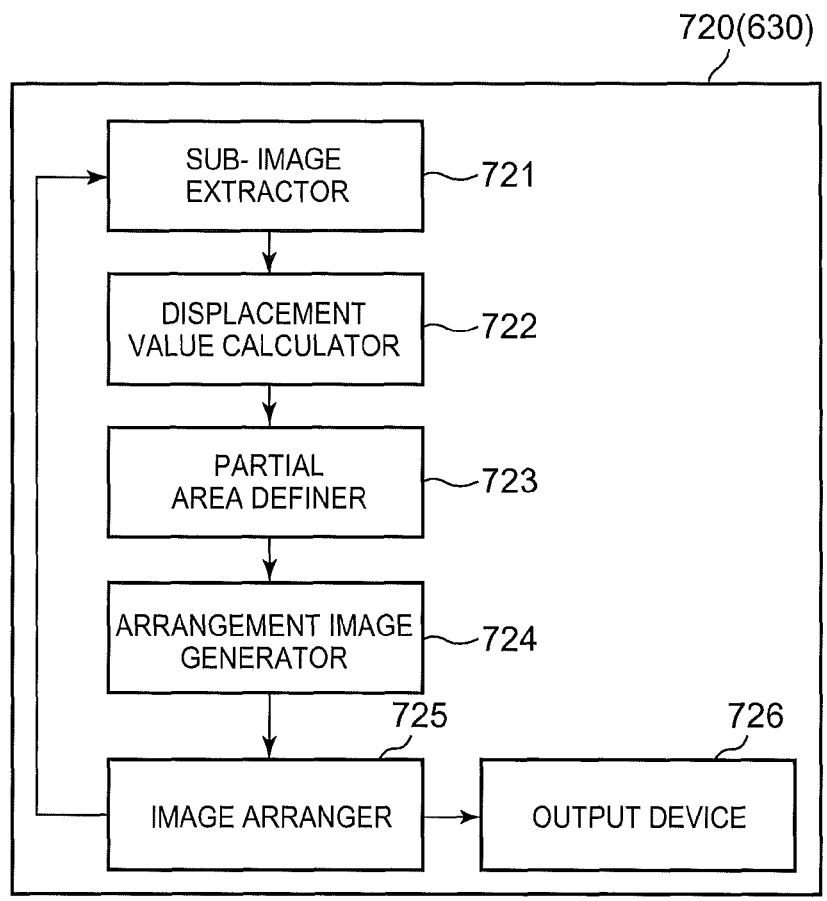
FIG. 10A is a block diagram illustrating a functional constitution of a confirmation image generator according to the embodiment 1.
FIG. 10B is a drawing illustrating an example of an area definition table according to the embodiment 1.

An area definition table records, as illustrated in FIG. 10B, a range for the image displacement degree, and the value indicating an area size associated with each other. For example, in the case where the image displacement degree is 8, the partial area is an area of 6×6 pixels at the center of the target sub-image. The partial area definer 723 transfers the information indicating the defined partial area to the arrangement image generator 724.

In the area definition table, it is desirable that the partial area size is increased generally in proportion to an increase of the image displacement degree on the premise of a predetermined offset value.

A method for calculating the area size is not limited to the manners, the area size may be calculated using arbitrary tables or formulas according to which the partial area size (natural number) is larger in the predetermined range when the image displacement degree is larger.

When the arrangement image generator 724 receives the information which defines the partial area, the arrangement image generator 724 resizes the image included to the area with interpolation, and generates the arrangement image for arranging on the generation image (the second reconstruction image). Specifically, the arrangement image generator 724 resizes the image to a size (here 4×4 pixels) corresponding to the size of the correspondence area of the generation image (the second reconstruction image). As identifying the portion (partial area) of the sub-image which is either inside or outside a region (clipping partial area from sub-image) and extracting image on the partial area to generate an arrangement image, the partial area definer 723 and arrangement image generator 724 also behave as a "clipper" as a whole.

The image arranger 725 arranges the arrangement image generated by the arrangement image generator 724 on the second reconstruction image. Arranging the image from the partial aria, the image arranger 725 can be referred to as an "arranger arranging the partial image on the second reconstruction image".

The sub-image extractor 721 through the image arranger 725 generate the arrangement images for all sub-images, and the image arranger 725 arranges the arrangement images on the second reconstruction image to generate the second reconstruction image.

The output device 726 outputs the second reconstruction image generated in this manner to outside (the display 70).

Next, the process (the image generation process 2) performed by the second reconstruction image generator 720 will be described with reference to FIG. 11 and FIG. 12.

When arriving step S106 in the image output process 1 (FIG. 6), the confirmation image generator 630 (the second reconstruction image generator 720) starts the image generation process 2 illustrated in FIG. 11.

In the image generation process 2, k2 represents a counter variable, and the sub-image extractor 721 extracts k2-th sub-image in the light field image LFI as a target sub-image (step S301).

Next, the displacement value calculator 722 calculates the image displacement degree in the above-described manner (step S302), the image displacement degree indicating an estimation value on how many pixels the photographic object captured in the predetermined area (10×10 pixels of central part) of the target sub-image are shifted from the center of the sub-image on the right.

Next, the partial area definer 723 defines the partial area of the target sub-image (step S303). At step S303, an area size L corresponding to the image displacement degree obtained at step S302 is acquired with reference to the area definition table. Then, the area having the acquired size (square area with L×L pixels) at the center of the target sub-image is defined as the partial area.

The arrangement image generator 724 resizes the image of the partial area having L×L pixels to fit the area (correspondence area) corresponding to the target sub-image in the second reconstruction image to be the arrangement image (step S304). The size of the correspondence area is a size of each sub-image which is obtained by dividing the second reconstruction image (here 320×240 pixels) which is determined according to a setting, and follows a setting value stored in advance.

The arrangement image is arranged to the part corresponding to the target sub-image on the second reconstruction image (generation image) (step S305). At this time, the image is inverted in four directions prior to the arrangement.

The concrete example of the process from step S301 to step S305 will be described with reference to FIG. 12.

Figure 12:
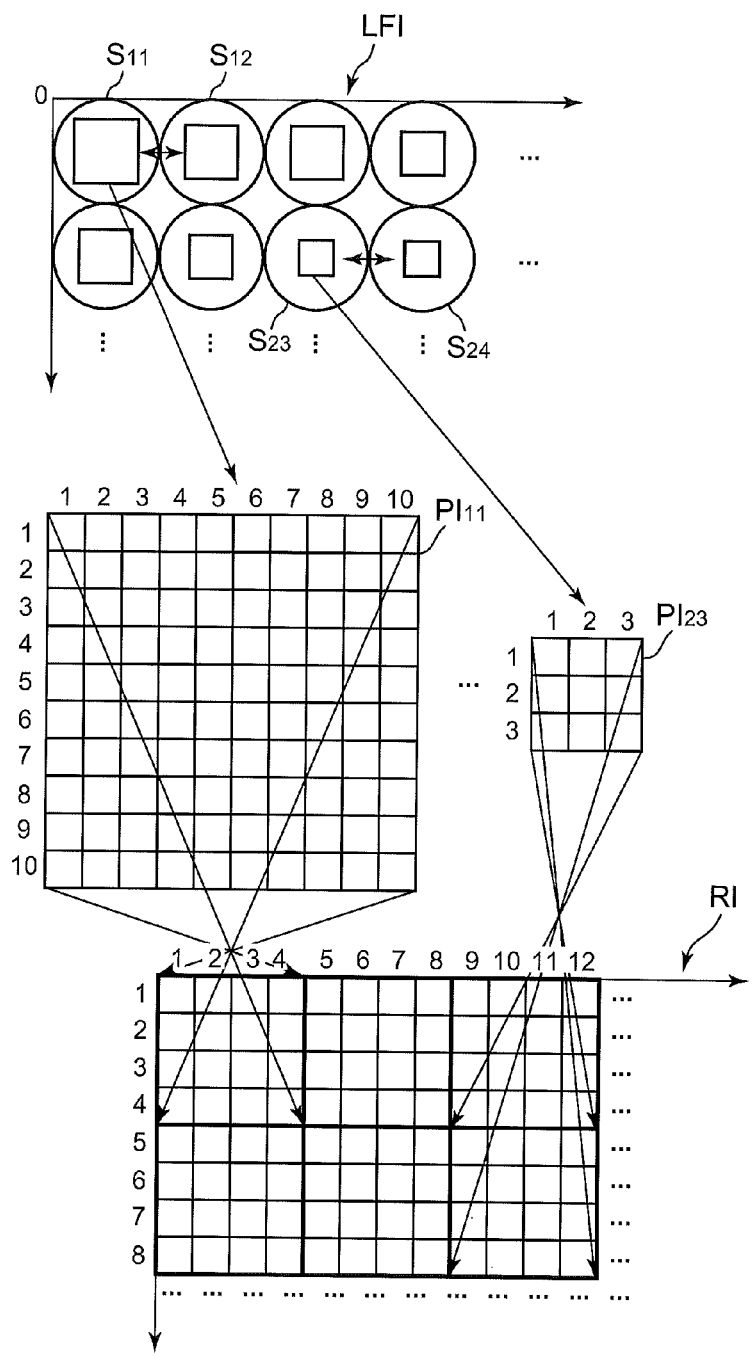
FIG. 12 is a drawing illustrating a concept of a process which generates a second reconstruction image from the light field image according to the embodiment 1.

As illustrated in the upper side of FIG. 12, in the light field image LFI, the approximately circular sub-images $S_{11}$ to $S_{MN}$ are arranged with the lattice pattern. The sub-images are extracted as the target sub-images from the sub-image $S_{11}$ in order (step S301), and a position displacement degree with the sub-image on the right is acquired (step S302). In FIG. 12, it is supposed that the image displacement degree of $S_{11}$ to $S_{12}$ illustrated by a thick arrow is larger, and the image displacement degree of $S_{23}$ to $S_{24}$ is small.

Next, the partial area definer 723 defines the size (clipping size) for extracting the partial area so that larger the image displacement degree is, larger the partial area is (step S303).

As illustrated in the middle of FIG. 12 in this example, a square part with 10×10 pixels at the central part of $S_{11}$ is defined as the partial area of $S_{11}$, and a square part with 3×3 pixels at the central part of $S_{23}$ is defined as the partial area of $S_{23}$, respectively.

An example of the second reconstruction image RI is illustrated in the lower side of FIG. 12. In this example, the second reconstruction image has 320×240 pixels, and, for each of 80×60 pieces of sub-images, the correspondence area with 4×4 pixels (area illustrated by a thick line) in accordance with the coordinates of the sub-image is defined.

At step S304, the image of the partial area is resized to be the arrangement image with 4×4. At following step S305, the image arranger 725 inverts the arrangement image on four directions (point symmetry), and arranges the inverted image to the correspondence area. This is because the main lens imaging plane MA is presented in front of the imaging element 313, and thus the image of the photographic object OB is inverted for every sub-image. The resizing is only reducing size when the second reconstruction image corresponding to the number of pixels of the liquid crystal display monitor 13 is small, and a rate of reduction changes according to the image displacement degree. On the other hand, when the number of pixels of the liquid crystal display monitor 13 is large and the correspondence area is large, expansion or reduction is performed depending on the image displacement degree.

Return to FIG. 11, the image has been arranged to the correspondence area for the current target sub-image at step S305, it is then determined whether the above-described process is performed for all sub-images (step S306). When an unprocessed sub-image exists (step S306; NO), the counter variable k2 is incremented (step S307), and the process from step S301 is repeated for the following target sub-image.

On the other hand, when the above-described process has been performed for all sub-images (step S306; YES), the completed second reconstruction image is set as the confirmation image, and the image generation process 2 is terminated.

In this example, the confirmation image has the same number of pixels (320×240 pixels) as the live view image so as to correspond to the number of pixels of the liquid crystal display monitor 13. However, the confirmation image may be larger than the live view image.

Moreover, although the arrangement image is generated by resizing the partial area, the arrangement image may be generated by extracting the pixel of the partial area according to the size of the correspondence area.

Return to FIG. 6, after finishing a generation of the confirmation image, the display 70 displays the generated confirmation image (step S107).

Then, the input device 50 acquires the reconstruction setting to generate the main image from the memory 34, the input device 32 or the like (step S108). The reconstruction setting includes information such as a set of a distance between the main lens 311 and the reconstruction surface, and the part which a reconstruction image occupies on the reconstruction surface, a set of information on whether a filter is used, and filter setting, the number of pixels of the reconstruction image, and the like. A part, where the input device 50 sets the distance to a reconstruction surface (it is also referred to as a reconstruction distance or a re-focal length) based on the information from the input device 32 or the memory 34, and stores the distance in a buffer set in the RAM 23, is also referred to as a distance setter. Moreover, since the reconstruction distance is a distance for focusing at the time of reconstruction of the image, it is also referred to as the re-focal length.

When the reconstruction setting is acquired, the main image generator 640 performs the main image generation process using the reconstruction setting (step S109). In the present embodiment, the main image generation process is the image generation process 3 described below.

The functional constitution of the main image generator 640 which performs the main image generation process will be described with reference to FIG. 13A to FIG. 13D. In the present embodiment, the main image generator 640 corresponds to the third reconstruction image generator 730 illustrated in FIG. 13A.

The third reconstruction image generator 730 includes a sub-image extractor 731, a pixel displacement degree calculator 732, a filter processor 733, an image displacement degree calculator 734, an arrangement interval determiner 734A, a partial area definer 735, a partial image extractor 735A, an image arranger 736, and an output device 737. By means of such elements, the third reconstruction image generator 730 generates a third reconstruction image (main image) as an output image from the light field image LFI.

The sub-image extractor 731 extracts the sub-images which form the light field image LFI as target sub-images in order, and transfers the extracted sub-images to the pixel displacement degree calculator 732.

The pixel displacement degree calculator 732 sets each pixel in the target sub-image as a target pixel in order, and calculates the degree (pixel displacement degree of the target pixel) indicating a degree of displacement of the pixel corresponding to the target pixel in the peripheral sub-images. The pixel displacement degree corresponds to distance with the photographic object of the target pixel. Although the pixel displacement degree may be calculated using an arbitrary manner of estimating the distance with the photographic object according to the pixel of the light field image LFI, the present embodiment calculates the pixel displacement degree using the functional constitution of FIG. 13B in the following manner.

First, a target pixel selector 7321 selects a target sub pixel to be used as the processing object on the target sub-image extracted by the sub-image extractor 731. Then, a peripheral image selector 7322 selects the sub-image (peripheral image) to be used as a comparison object located within a predetermined range from the target sub-image. In this embodiment, the sub-images on the right of the target sub-image (on the left when there is nothing on the right, in this case right-and-left reversal) are selected as SR1, SR2 . . . SRk in a position order. k is the natural number determined according to a setting. The peripheral image selector 7322 is also referred to as a second selector, when the sub-image extractor 731 is referred to as the first selector.

Then, a comparison pixel selector 7323 selects the pixel (comparison pixel) to be used as the comparison object on the peripheral image. In this embodiment, assuming that the coordinate of the target pixel on the target sub-image is represented by (x, y) and the current pixel displacement is represented by d, the pixel located in (x+d, y) on the peripheral image SR1, the pixel located in (x+2d, y) on the peripheral image SR2, . . . , the pixel located in (x+kd, y) on the peripheral image SRk are selected as the comparison pixels, respectively.

Next, a difference calculator 7324 calculates a sum of absolute values of differences between the pixel values of the target pixel and the comparison pixel (pixel value of the pixel which is displaced by d pixels to the right). Such calculation is repeated within a range of possible parallax (value of d).

After that, a correspondence pixel determiner 7325 determines the value of d of which the obtained sum of absolute values of differences is the minimum. As for the obtained value d, the pixel located in (x+d, y) on the peripheral image SR1, the pixel located in (x+2d, y) on the peripheral image SR2, . . . , the pixel located in (x+kd, y) on the peripheral image SRk can be estimated as the pixels in which the same photographic object as the target pixel is captured (correspondence pixels), respectively. A position displacement indicated by the value of d is determined as the pixel displacement degree. The difference calculator 7324 and the correspondence pixel determiner 7325 function as a searcher which searches the second corresponding to the target pixel (first pixel) in cooperation.

The pixel displacement degree calculator 732 calculates the pixel displacement degrees for all pixels included in the target sub-image, and transfers the pixel displacement degrees to the filter processor 733. The filter processor 733 compares a distance to the photographic object corresponding to each pixel indicated by the pixel displacement degree and a distance to the reconstruction surface included in the reconstruction setting acquired from the input device 50. Then, a blurring addition is applied to each pixel of the light field image by filtering according to the difference. When the difference between the re-focal length and the distance to the photographic object is equal to or greater than a predetermined value, a blurring addition process is applied in accordance with a blurring intensity which is set. For example, a Gaussian filter is used for the blurring addition process. The pixel displacement degree calculator 732 can be refereed to as a "pixel processor" which processes the target pixel and the correspondence pixel based on a position relationship between the target pixel and the correspondence pixel.

When a certain pixel represents a point where the photographic object existing long way away from the camera is photographed, the pixel displacement degree (which corresponds to the amount of position displacement) is small, and a certain pixel represents a point where the near photographic object is photographed, the pixel displacement degree is large. The relation of the position displacement and a distance between the photographic object and the camera in the real world depends on focal lengths of the main lens 311 and the micro lenses 312-*i* in the micro lens array 312, and the position on which the imaging element 313 is arranged, and the size of the imaging element 313. The correspondence relation of the position displacement and a photographic object distance is obtained by experiments in advance, and is stored as a displacement distance table in the ROM 22.

In the present embodiment, the filtering is performed using a displacement distance table. The displacement distance table is obtained by experiments in advance, and is stored in the ROM 22. The displacement distance table stores a level (LV) indicating a distance in the predetermined range, the displacement degrees (the image displacement degree and the pixel displacement degree) belonging to the level, and a distance to the reconstruction surface belonging to the level, associated each other.

The filter processor 733 calculates a difference between the level to which the pixel displacement degree belongs and the level to which the distance to the reconstruction surface belongs using the displacement distance table. The pixel whose difference is 0 is not applied the filtering, under an estimation that it may correspond to the photographic object sufficiently close to the reconstruction surface. That is, blurring is not added. On the other hand, when the difference is equal to one or more, the blurring is added since the photographic object for the pixel is displaced from the reconstruction surface. The filtering is performed so that stronger blurring is added, larger the difference is.

The image displacement degree calculator 734 calculates the image displacement degree of the target sub-image as is the case in the displacement value calculator 722 of FIG. 10A. The image displacement degree calculator 734 calculates the image displacement degrees for both a horizontal direction and a vertical direction, and after that, averages both degrees to be the image displacement degree of the target image.

The arrangement interval determiner 734A determines an interval for arranging the image of the partial area on the reconstruction image according to the image displacement degree. The arrangement interval is determined depending on the image displacement degree, the focal length of the main lens 311 included in the imaging setting information, the focal length of micro lenses 312-*i* in the micro lens array 312, the position on which the imaging element 313 is arranged, and the distance to the reconstruction surface included in the reconstruction setting (reconstruction distance).

The difference of the angles of view for every micro lens is smaller as the photographic object exists further away, and thus movement in the sub-image is also small. This is followed so that the arrangement interval of the partial area extracted from the sub-image, for which the image displacement degree is small, is made small. On the contrary, the difference of the angles of view for every micro lens is larger as the photographic object exists nearer, and thus the movement in the sub-image is also large. This is followed so that the arrangement interval of the partial area extracted from the sub-image, for which the image displacement degree is large, is made large.

In the present embodiment, the arrangement interval is determined using a table (arrangement interval table) stored in the ROM 22, in which the arrangement interval is determined using the focal length of the main lens 311, the distance to the reconstruction surface, and the image displacement degree as indexes.

The arrangement interval table defines appropriate value of the arrangement interval obtained by experiments for each of values of the image displacement degree, the distance (reconstruction distance) to the reconstruction surface, and the focal length of the main lens 311, in accordance with the focal length of the micro lenses 312-$i$ in the micro lens array 312 which is a fixed parameter, and the position on which the imaging element 313 is arranged (for example, FIG. 13C). In the example of FIG. 13C, the arrangement interval is set to be larger as a difference between the level of the image displacement degree defined by the above-described displacement distance table, and the level of the distance to the reconstruction surface is larger.

The arrangement interval may be calculated according to an equation which is obtained by experiments in advance, and is stored in the ROM 22, and in which the above-described parameter is used as a variable.

The partial area definer 735 acquires the partial area size corresponding to the image displacement degree from the area definition table of FIG. 10B, and corrects the size based on the blurring intensity of the target sub-image.

The blurring intensity of the target image is a degree for indicating the degree of displacement of the photographic object included in the target sub-image from the reconstruction surface, and for determining whether the part is to be blurred to display. In this embodiment, a different between the level of the image displacement degree defined by the above-described displacement distance table, and the level of the distance to the reconstruction surface is regarded as the blurring intensity.

One side of the partial area after correction is larger than the arrangement interval. Therefore, when the image of the partial area is arranged on the third reconstruction image, arrangement images are overlapped. Since the pixel values are averaged for the overlapped part, the blurring is stronger as the number of the arrangement images to be overlapped increases. Therefore, if the blurring intensity is strong, the partial area size is corrected so that the partial area size is made larger. Since the partial area definer 735 determines the partial area size, the partial area definer 735 also behaves as a "size determiner".

The partial image extractor 735A extracts the pixels of the partial area as the partial image as it is. The process in which the partial image extractor 735A extracts the partial image in the size defined by the partial area definer 735 is also expressed as a clipping process. The partial image extractor 735A is also referred to as a clipper which clips the partial images from the sub-images.

The image arranger 736 arranges the image extracted by the partial image extractor 735A on the generation image (third reconstruction image). As a result, the image of the partial area is arranged on the reconstruction image without resizing. In this case, an interval with the image of the partial area previously arranged is in accordance with the arrangement interval calculated by the above-described image displacement degree calculator 734. In this case, the arrangement interval and the partial area size are set so that the arranged images overlap. As for the overlapping part, the pixel values of the pixels arranged and overlapped are averaged to be the pixel value of the generation image. As a result, stronger blurring is added as the overlapping part is larger. The sub-image extractor 731 through the image arranger 736 perform the above-described process for all sub-images included in the light field image LFI to generate the third reconstruction image.

Then, the output device 737 outputs the generated third reconstruction image to outside (to the display 35, the memory 34, removable media 38 and the like), and whereby storing the third reconstruction image as the image for viewing.

Next, the process (image generation process 3) performed by the third reconstruction image generator 730 will be described with reference to FIG. 14 and FIG. 15.

Figure 14:
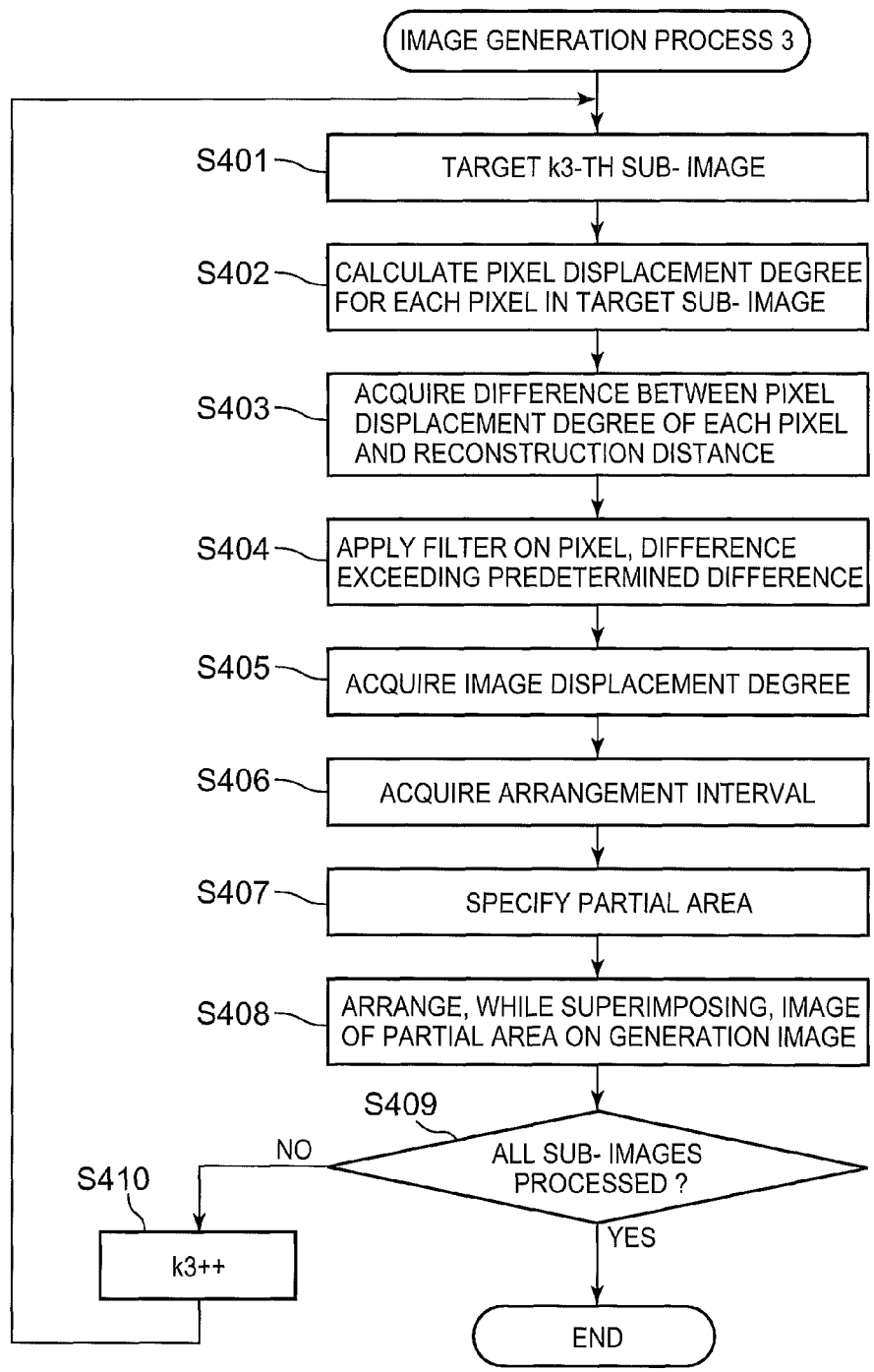
FIG. 14 is a flowchart of an image generation process executed by the digital camera according to the embodiment 1.

When arriving step S109 of the image output process 1 (FIG. 6), the main image generator 640 (the third reconstruction image generator 730) starts the image generation process 3 illustrated in FIG. 14.

In the image generation process 3, k3 represents a counter variable first, and the sub-image extractor 731 extracts k3-th sub-image in the light field image LFI as a target sub-image (step S401).

Next, for each pixel of the target sub-image, the pixel displacement degree calculator 732 calculates the pixel displacement degree as described above (step S402).

For each pixel in the target sub-image, the filter processor 733 calculates the difference (level difference) between the pixel displacement degree and the reconstruction distance using the displacement distance table (step S403).

Next, the filter processor 733 applies the filtering process to the pixel, of which the difference with the reconstruction distance is equal to or greater than a predetermined value (the level difference is not 0), according to the level difference under a condition stored by the ROM 22 (step S404). The filter processor 733 performs a Gaussian filtering using larger value of δ as the level difference is larger, for example, the kernel of 3×3 is used for the pixel of which the level difference is 1, and the kernel of 9×9 is used for the pixel of which the level difference is 2.

Next, the image displacement degree calculator 734 acquires (obtains) the image displacement degree of the target sub-image (step S405). At step S405, the image displacement degree is acquired for the sub-image on the right as is the case in step S302 of FIG. 11, the image displacement degree is further acquired for the sub-image on lower side (upper side when there is nothing on the lower side), and an average of both degrees is regarded as the displacement degree of the target sub-image.

Since the image displacement degree is calculated based on the position displacements in the vertical direction and the horizontal direction in exchange for increasing calculation amount, the image displacement degree which incorporates the photographic object distance of the sub-image more correctly in comparison with a case of step S302 of FIG. 11, and the image quality of the generation image improves. In addition, as a manner for improving the accuracy of the image displacement degree, it is supposed that the image displacement degrees may be calculated for more sub-images in one direction.

The image displacement degree may be calculated by averaging the pixel displacement degrees for respective pixels included in the target sub-image calculated at step S402.

Next, at step S406, the arrangement interval determiner 734A retrieves the numerical value of the arrangement interval in accordance with the image displacement degree, the focal length of the main lens 311, and the distance to the reconstruction surface from the arrangement interval table (for example, FIG. 13C) stored in the ROM 22, and determines (sets) the retrieved numerical value as the arrangement interval.

Next, the partial area definer 735 acquires the partial area size (L2×L2) corresponding to the image displacement degree from the area definition table (FIG. 10B). Furthermore, the size is corrected so that the partial area size is larger as the blurring intensity is stronger (for example, as in FIG. 13D) to determine the partial area size (L2×L2). Then, the square are with L2×L2 at the central part of the target sub-image is defined as the partial area (step S407). L2 is larger than the arrangement interval.

Figure 15:
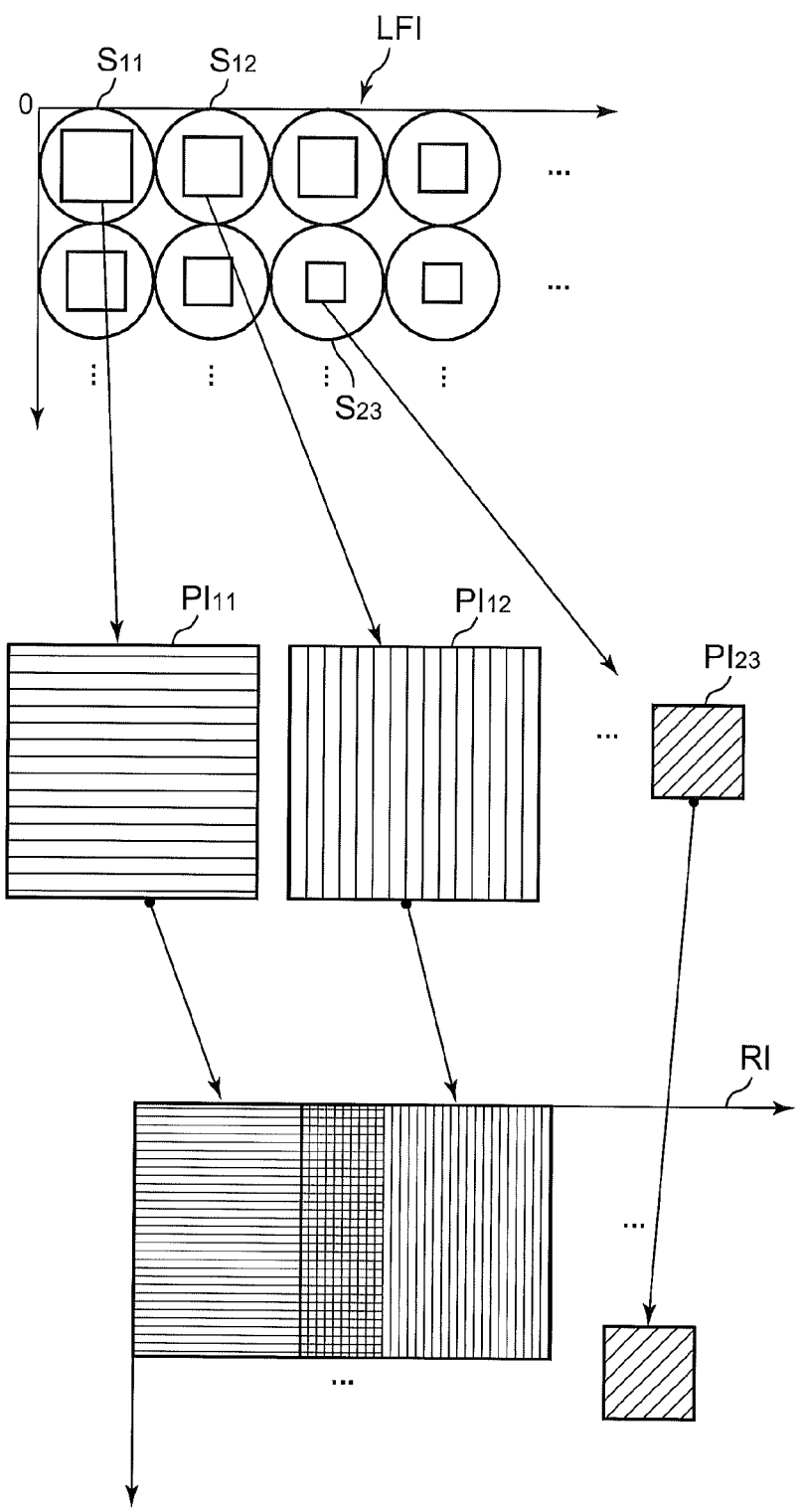
FIG. 15 is a drawing illustrating a concept of a process which generates a third reconstruction image from the light field image according to the embodiment 1.

In the example of FIG. 15, since the image displacement degree between $S_{11}$ and $S_{12}$ is large, the partial area is large. On the other hand, the image displacement degree for $S_{23}$ is small, and therefore the partial area is small.

The image of the partial area is arranged on the third reconstruction image which is the generation image at the arrangement interval determined at step S406 (FIG. 15 lower side, step S408). Since arrangement images overlaps, the overlapped part is averaged to determine the pixel value. In the lower side of FIG. 15, the image (area with horizontal lines) of the partial area for $S_{11}$ and the image (area with vertical lines) of the partial area for $S_{12}$ are overlapped.

After the image is arranged to the correspondence area for the current target sub-image at step S408, it is next determined whether the above-described process has been performed for all sub-images (step S409). When an unprocessed sub-image exists (step S409; NO), the counter variable k3 is incremented (step S410), and the process is repeated from step S401 for a following target sub-image.

On the other hand, when the above-described process has been performed for all sub-images (step S409; YES), the completed third reconstruction image is regarded as the main image, and the image generation process 3 is terminated.

Returns to FIG. 6, after finishing a generation of the main image, the generated main image is stored in the memory 80 (step S110), and the image output process 1 is terminated.

Figure 16A:
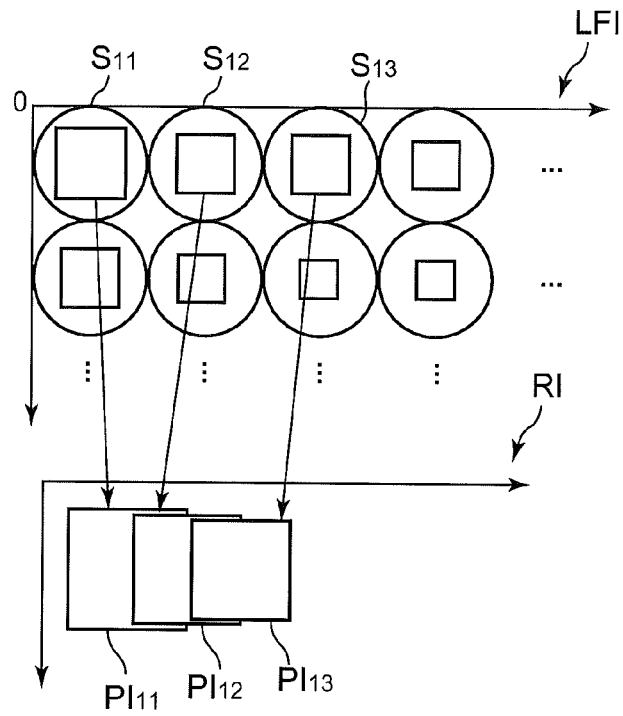
FIG. 16A and FIG. 16B are drawings illustrating a concept of a process which arranges partial images in a process which generates a third reconstruction image according to the embodiment 1.

The process which arranges the partial images on the reconstruction image RI will be described using a setting example in which one side of the partial image is set to the twice of the arrangement interval and using FIGS. 16A and B. The four partial images overlap in each part except for the edge parts of the reconstruction image. First, the sub-image $S_{11}$ at the upper left of the light field image LFI is selected (step S401). A partial area (partial image $PI_{11}$) is clipped (extracted) from the selected sub-image $S_{11}$ (step S407), and this partial image $PI_{11}$ is arranged at the upper left of the reconstruction image RI (S408). Return to step S401, the adjacent sub-image $S_{12}$ on the right is selected (step S401). A partial image $PI_{12}$ is clipped from the selected sub-image $S_{12}$ (S407), and the partial image $PI_{12}$ is arranged at the right of the partial image which has been arranged in the reconstruction image RI (S408). Since one side of the clipped partial image $PI_{12}$ is twice the arrangement interval, it is arranged with an overlap in horizontal direction. The pixel values of the overlapped part are added on a buffer. Similarly, a partial image $PI_{13}$ is clipped from adjacent sub-image $S_{13}$ on the right of the sub-image $S_{12}$, it is arranged with an overlap in horizontal direction (FIG. 16A).

Figure 16B:
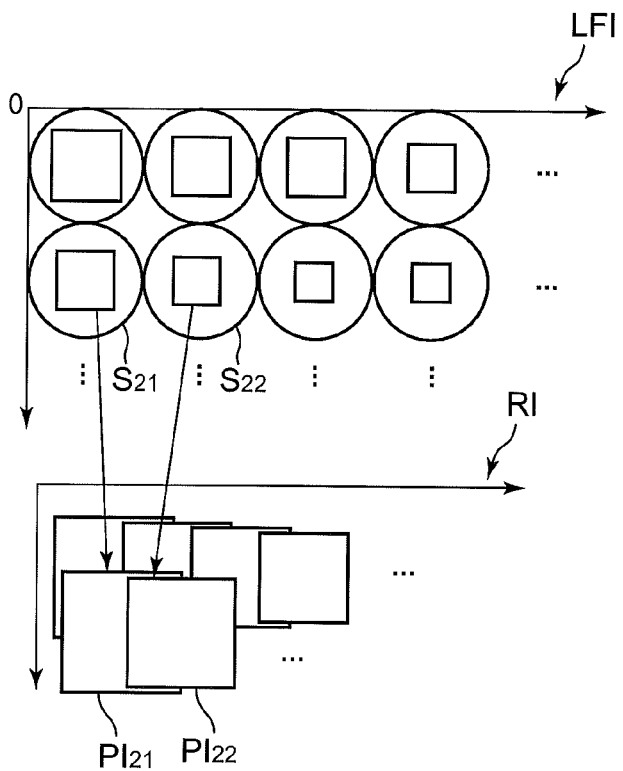

Such operations are repeated to the right end of the light field image LFI. When the process for the sub-image $S_{1N}$ at the right end is completed, it returns to the left end of the light field image LFI, and selects the sub-image $S_{21}$ on the second row from the top (step S401). A partial image $PI_{21}$ clipped from the selected sub-image $S_{21}$ is arranged under the partial image P11 which has been first arranged in the reconstruction image RI (step S408). Since one side of the clipped partial image $PI_{21}$ is twice the arrangement interval, as illustrated in FIG. 16B, the arrangement is made with an overlap in a vertical direction. The pixel values of the overlapped part are added on a buffer.

Such operations are repeated to the right end of the light field image LFI, as is the case of the first row. When the process for all sub-images $S_{21}$ to $S_2N$ in the second row is completed, the sub-image S on the following row in the light field image LFI will be processed. These operations are repeated. When it is determined that the process for the sub-image $S_{MN}$ at the lowermost and rightmost of light field image LFI is completed (step S409; Yes), after normalizing pixel values of the overlapped part as appropriate, the created reconstruction image RI is displayed on the display 35 or output from the output device 33, and is stored in the memory 80 (removable media 38 and the like) (S110).

In the image generation process 3, blurring processing for every sub-image and blurring processing for every pixel are applied, respectively. For that reason, even when the error is included in photographic object distance estimation for every pixel, it is averaged by the blurring processing (overwriting) for every sub-image, and the influence of the error is eased. Therefore, it is possible to generate the main image having high image quality.

As having described above, the digital camera 1 of the present embodiment includes a plurality of reconstruction image generation means suitable for securable calculation time and a usage. Therefore, appropriate reconstruction images suitable for various usages, such as the live view, confirmation after photographing, and for viewing, can be generated and displayed at a preferred speed. In other words, the reconstruction images can be generated with a suitable generation method according to a purpose of using an image. Thus, the digital camera 1 of the present embodiment can display necessary and sufficient reconstruction images with required and sufficient quality at sufficient speed according to a status, and whereby improving convenience for a user.

Specifically, according to the first reconstruction image generation process, it is possible to generates the reconstruction image (the first reconstruction image) including the contents of all sub-images included in the light field image LFI with small calculation amount.

Therefore, even when sufficient calculation amount is not securable, such as a case in which the live view is used, the reconstruction image which can be used for photographing preparation can be generated especially at high speed, and can be displayed. Moreover, in comparison with a case of using the image in which pixels are extracted from the sub-image one by one and arranged, an image can be generated with higher quality.

According to the second reconstruction image generation process, it is possible to generate the reconstruction image (the second reconstruction image) of which the image quality is higher than the image quality of the first reconstruction image using more calculations than first reconstruction image generation process, in accordance with the degree corresponding to a distance to the photographic object in sub-image unit. Therefore, the reconstruction image of which the image quality is higher than the image quality of the first reconstruction image can be displayed at high speed for the confirmation after photographing.

According to the third reconstruction image generation process, it is possible to generate the reconstruction image (the third reconstruction image) with high image quality using more calculations than second reconstruction image generation process, the image being applied the blurring addition process in sub-image unit and the blurring addition process in pixel unit. Therefore, the reconstruction image with high image quality cab be generated at a terminal, such as a digital camera, which has limited capability of processing speed.

Moreover, by arranging images while inverting every sub-image in four directions, the reconstruction image arranged correctly can be generated with small calculation amount from the image which is photographed while sub-images are inverted due to the configuration of the optical system.

The digital camera 1 of the present embodiment is designed to define a larger partial area for a sub-image with a large image displacement degree so that the information on overall partial area appears in the reconstruction image.

A large image displacement degree represents that the photographic object of the target sub-image exists in a near position from the main lens, and in the adjacent sub-image, the visible position is displaced largely due to the parallax of the corresponding micro lens. In this embodiment, the photographic object at the central part is regarded as a photographic object on behalf of the sub-image.

A large displacement of corresponding photographic object between the sub-images means that the necessary size of partial area to avoid an omission of information, when forming the overall image by connecting the partial areas of adjacent sub-images, is large. In the present embodiment, the partial area is made larger as the image displacement degree is larger, and the partial area is arranged to the correspondence area of the reconstruction image, whereby preventing the omission of information in the generation image. Moreover, the partial area is made smaller as the image displacement degree is smaller, so that overlap of information which is presented in a section between the adjacent sub-images does not appear too much on the reconstruction image.

According to the digital camera 1 of the present embodiment, even if the reconstruction image is generated at high speed (generated by process using small calculations) by such a configuration, omission of information and the degree of overlap of information is reduced taking the position displacement by the parallax into consideration.

Moreover, since the blurring addition by an overwrite and the blurring addition by a filtering after a photographic object distance estimation are used together in the main image generation process, the degree of blurring (bokeh's flavor) can be changed by adjusting intensities of both blurring.

In each image generation process, the reconstruction distance may be set on the basis of manual operation (user's operation). Alternatively, the reconstruction distance may be set by measuring a distance to the photographic object (for example, the photographic object of the central part, or the photographic object designated by the user's operation) which is desired to focusing a phase difference sensor or the like, and focusing on the photographic object. Furthermore, again the re-focal length may be set by reselecting a photographic object which is desired to focusing a touch panel or the like after displaying the reconstruction image.

(Embodiment 2)

The embodiment 2 of the present invention will be described.

Figure 2:
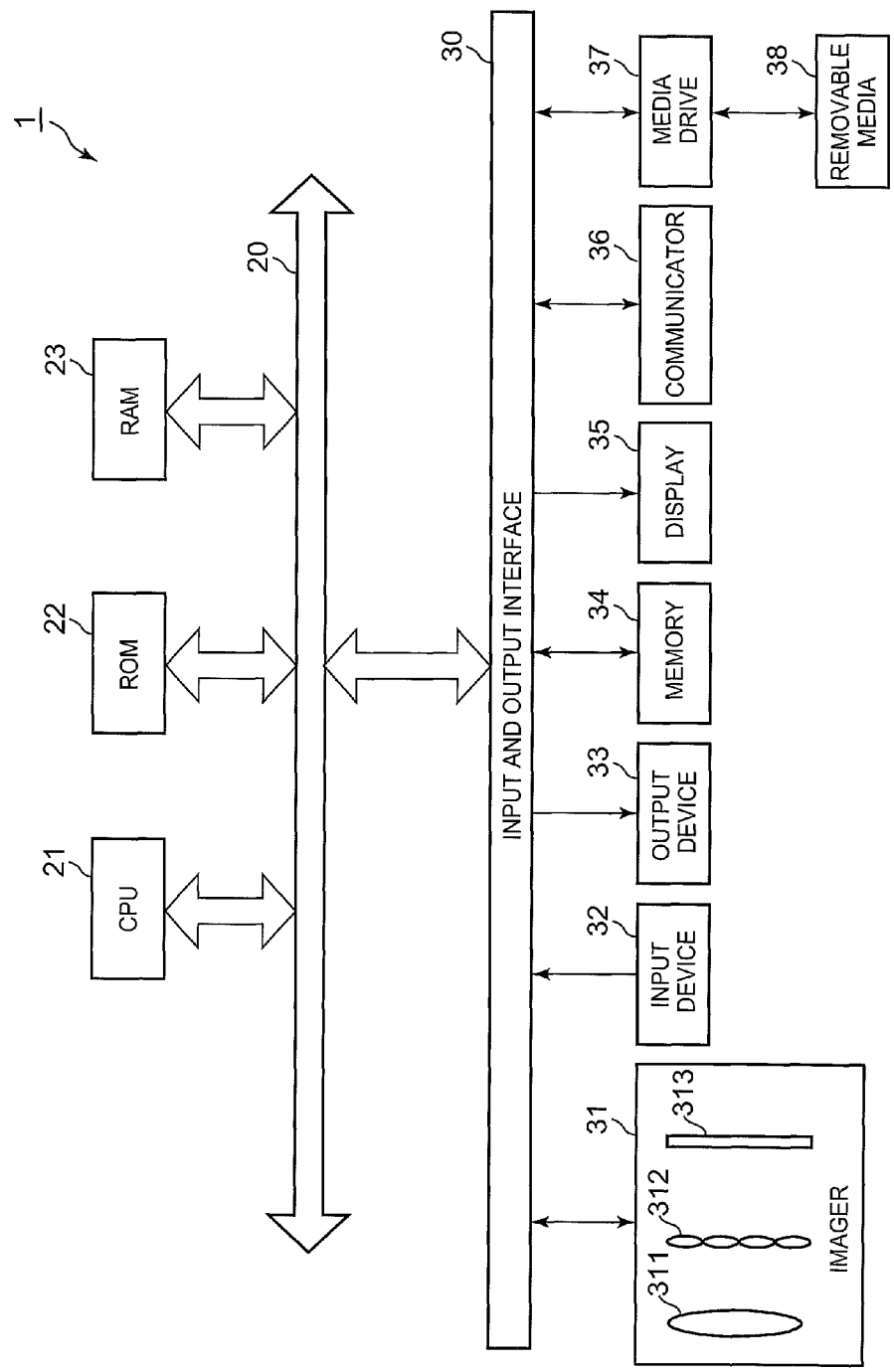
FIG. 2 is a block diagram illustrating a hardware configuration of the digital camera according to the embodiment 1.

The digital camera 1 of the present embodiment has a physical configuration illustrated in FIG. 2. As for the digital camera 1 of the present embodiment, in comparison with the corresponding elements in the embodiment 1, the CPU 21 can process at higher speed, and the display 35 has higher resolution, for example, VGA (640×480 pixels).

Other elements of FIG. 2 are the same as the elements of the digital camera 1 according to the embodiment 1.

In the digital camera 1 of the present embodiment, since the display 35 is large, the impreciseness of an image is noticeable. Then, utilizing that the CPU 21 can process at higher speed, a reconstruction image with high preciseness and high image quality for displaying on the display 35 of the digital camera 1 is generated.

The digital camera 1 of the present embodiment includes functional constitution illustrated in FIG. 5.

In the present embodiment, the live view image generator 620 is the second reconstruction image generator 720, the confirmation image generator 630 is the third reconstruction image generator 730, and the main image generator 640 is a fourth reconstruction image generator. Other elements of FIG. 5 are the same as the corresponding elements of the digital camera 1 according to the embodiment 1.

The second reconstruction image generator 720 and the third reconstruction image generator 730 have the same configuration as the elements with same names in the embodiment 1.

The fourth reconstruction image generator performs a reconstruction image generation process described below to generate the reconstruction image from the light field image LFI, and transfers the generated image to the memory 80.

The process performed by the digital camera 1 of the present embodiment will be described with reference to a flowchart.

Figure 17:
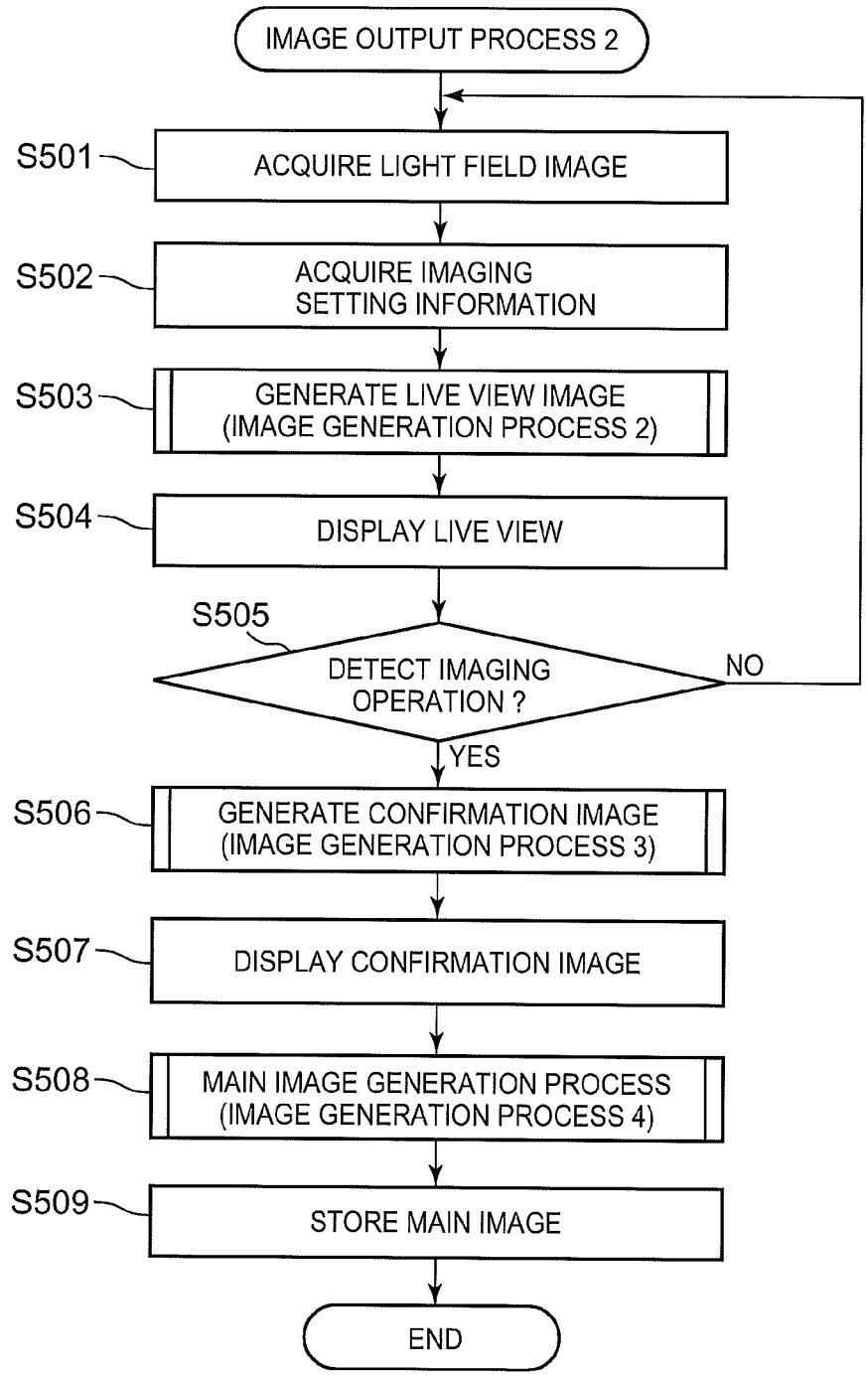
FIG. 17 is a flowchart of an image output process according to an embodiment 2 of the present invention.

When the digital camera 1 is powered on, and the input device 50 receives an operation for preparing a photographing, the digital camera 1 starts an image output process 2 illustrated in FIG. 17.

In the image output process 2, process from step S501 to step S502 is similarly performed with step S101 to step S102 of the image output process of FIG. 6.

In the present embodiment, the image generation process 2 (FIG. 11) is performed as is the case in the embodiment 1 at step S503 to generate the live view image.

After generating the live view image at step S503, the digital camera 1 performs the process from step S504 to step S505 similarly with step S104 to step S105 of the image output process 1 of FIG. 6.

Figure 13A:
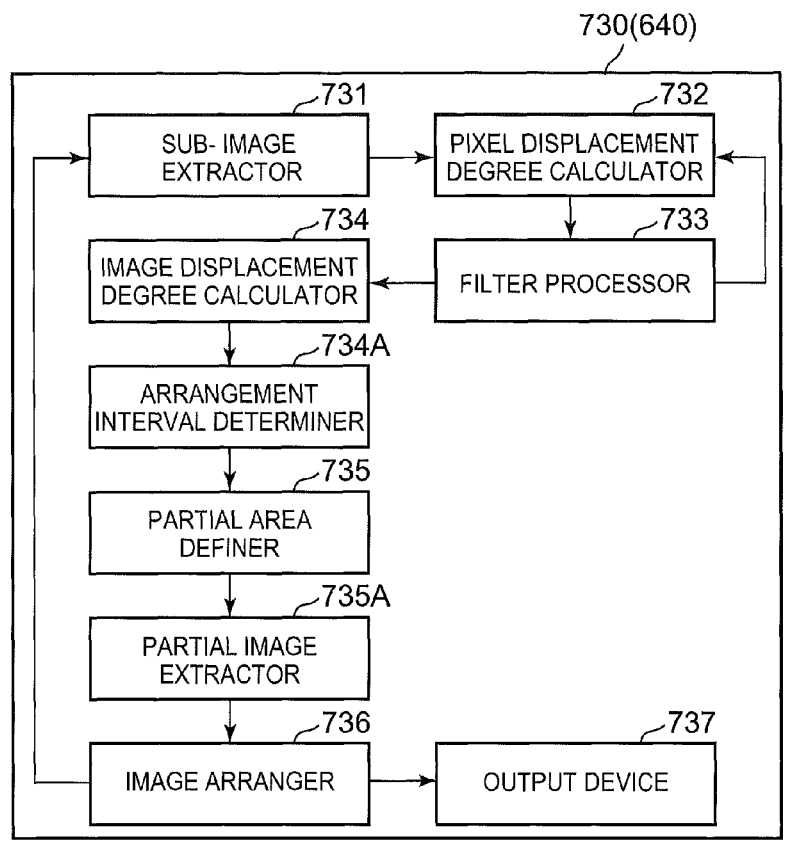
FIG. 13A is a block diagram illustrating a functional constitution of a main image generator according to the embodiment 1.
Figure 13B:
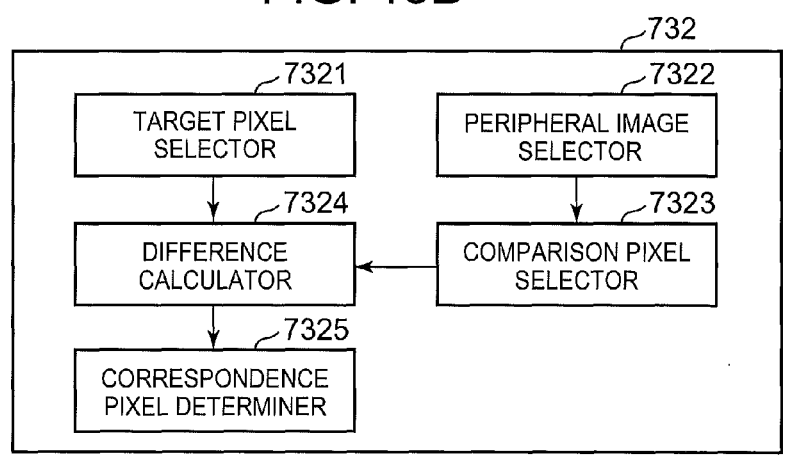
FIG. 13B is a block diagram illustrating a functional constitution of an pixel displacement degree calculator according to the embodiment 1.

At step S506, the confirmation image generator 630 which is the third reconstruction image generator 730 of FIG. 13A performs the image generation process 3 illustrated in FIG. 14 as in the embodiment 1 to generate the confirmation image.

After generating the confirmation image at step S506, the digital camera 1 performs step S507 similarly with step S107 of the image output process of FIG. 6.

At step S508, the main image generator 640 which is the fourth reconstruction image generator performs an image generation process 4 to generate the main image.

The image generation process 4 reconstructs an image by performing weighted addition on the pixel values of the light field image for every micro lens through which the light has passed.

The image generation process 4 generates the reconstruction image in the following procedures.

(1) Specifying a position on the micro lens array where a light beam from a target pixel to reconstruct has reached passing through a principal point of the main lens.

(2) Calculating a main lens blur area (area on the micro lens array which the light beam from the target pixel reaches) with a radius based on the re-focal length corresponding to the reconstruction surface centering on the specified position.

(3) Specifying the micro lenses a part of or all of which are included in the main lens blur area among the micro lenses included in the micro lens array.

(4) Selecting one of the specified micro lenses.

(5) Calculating an area of overlapping section of the selected micro lens and the main lens blur area, and dividing the result by an area of the micro lens to obtain a weighting factor.
(6) Obtaining a pixel value on the sub-image located in a position on which the light beam from the target pixel forms image by the selected micro lens.
(7) Multiplying the acquired pixel value by the weighting factor to obtain a corrected pixel value.
(8) Calculating the corrected pixel values for all of micro lenses, a part of or all of which are included in the main lens blur area, and sums the corrected pixel values.
(9) Dividing the total of the corrected pixel values by the total of the overlap area to obtain the target pixel value of the image to reconstruct.

After generating the main image at step S508, the digital camera 1 performs step S509 similarly with step S110 of the image output process of FIG. 6, and terminates the image output process 2.

As having described above, the digital camera 1 of the present embodiment can display the live view image with image quality equivalent to the confirmation image of the embodiment 1. Moreover, the confirmation image can be displayed at image quality equivalent to the main image of the embodiment 1.

As a modification of the present embodiment, the live view image may be generated using the image generation process 1 instead of the image generation process 2.

According to such configuration, the live view image which desires the fastest generation speed can be generated with a small calculation amount as is the case in the embodiment 1, whereas each of the confirmation image and the main image has image quality higher than the image quality in the embodiment 1.

The fourth reconstruction image generator of the present embodiment may generate the reconstruction image using a known arbitrary process which generates the reconstruction image from the light field image LFI.

(Embodiment 3)

The embodiment 3 of the present invention will be described.

The digital camera 1 of the present embodiment has a physical configuration illustrated in FIG. 2. As for the digital camera 1 of the present embodiment, in comparison with the corresponding element in the embodiment 1, the CPU 21 can process at higher speed. Other elements of FIG. 2 are the same as the elements of the digital camera 1 according to the embodiment 2.

In the embodiment 1 and the embodiment 2, an image which does not include blurring is displayed as the live view image. The embodiment 3 is characterized by displaying an image to which blurring is added from a phase of the live view image (prior to the photographing), utilizing that the CPU 21 can process at higher speed.

The digital camera 1 of the present embodiment includes the functional constitution illustrated in FIG. 5.

Figure 18:
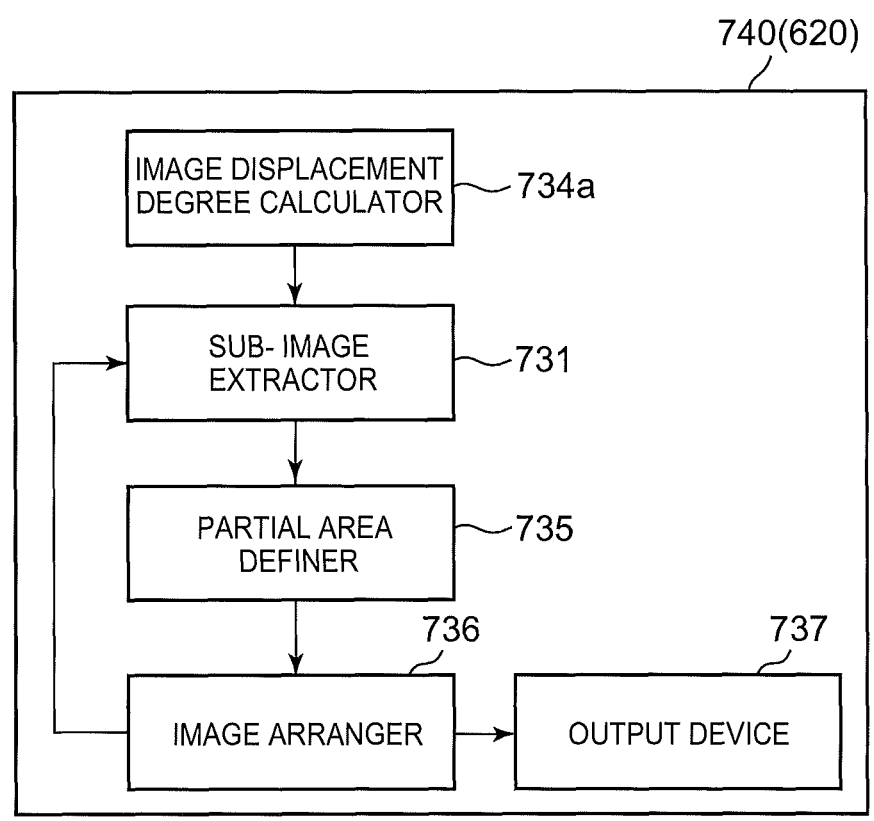
FIG. 18 is a block diagram illustrating a functional constitution of a live view image generator according to an embodiment 3 of the present invention.

In the present embodiment, the live view image generator 620 is a fifth reconstruction image generator 740 illustrated in FIG. 18. Other elements of FIG. 5 are the same as the corresponding elements of the digital camera 1 according to the embodiment 2.

The fifth reconstruction image generator 740 is different from the third reconstruction image generator 730 illustrated in FIG. 13A in that:

(1) the fifth reconstruction image generator 740 does not include elements corresponding to the pixel displacement degree calculator 732 and the filter processor 733; and (2) the image displacement degree calculator 734a acquires the pixel displacement degrees for the sub-images in a predetermined area. The average value is used as a displacement degree for entire sub-images to determine an arrangement area size and an arrangement interval.

Other elements are the same as the elements with same names of the third reconstruction image generator 730 of the embodiment 1.

The process performed by the digital camera 1 of the present embodiment will be described with reference to a flowchart.

Figure 19:
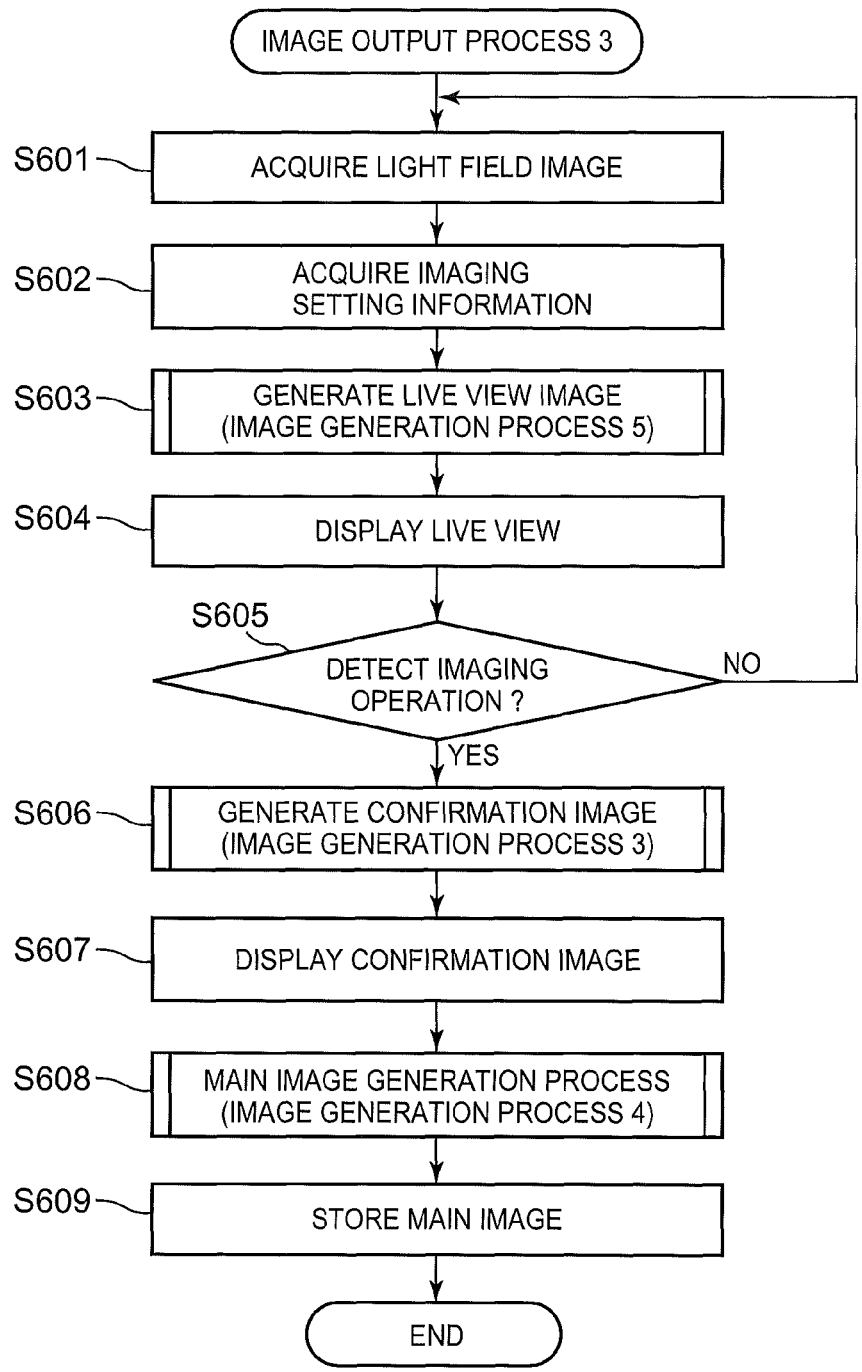
FIG. 19 is a flowchart of an image output process according to the embodiment 3.

When the digital camera 1 is powered on, and the input device 50 receives an operation for preparing a photographing, the digital camera 1 starts an image output process 3 illustrated in FIG. 19.

In the image output process 3, process from step S601 to step S602 is similarly performed with step S101 to step S102 of the image output process of FIG. 6 according to the embodiment 1.

In the present embodiment, the image generation process 5 (FIG. 20) is performed at step S603 to generate the live view image.

Figure 20:
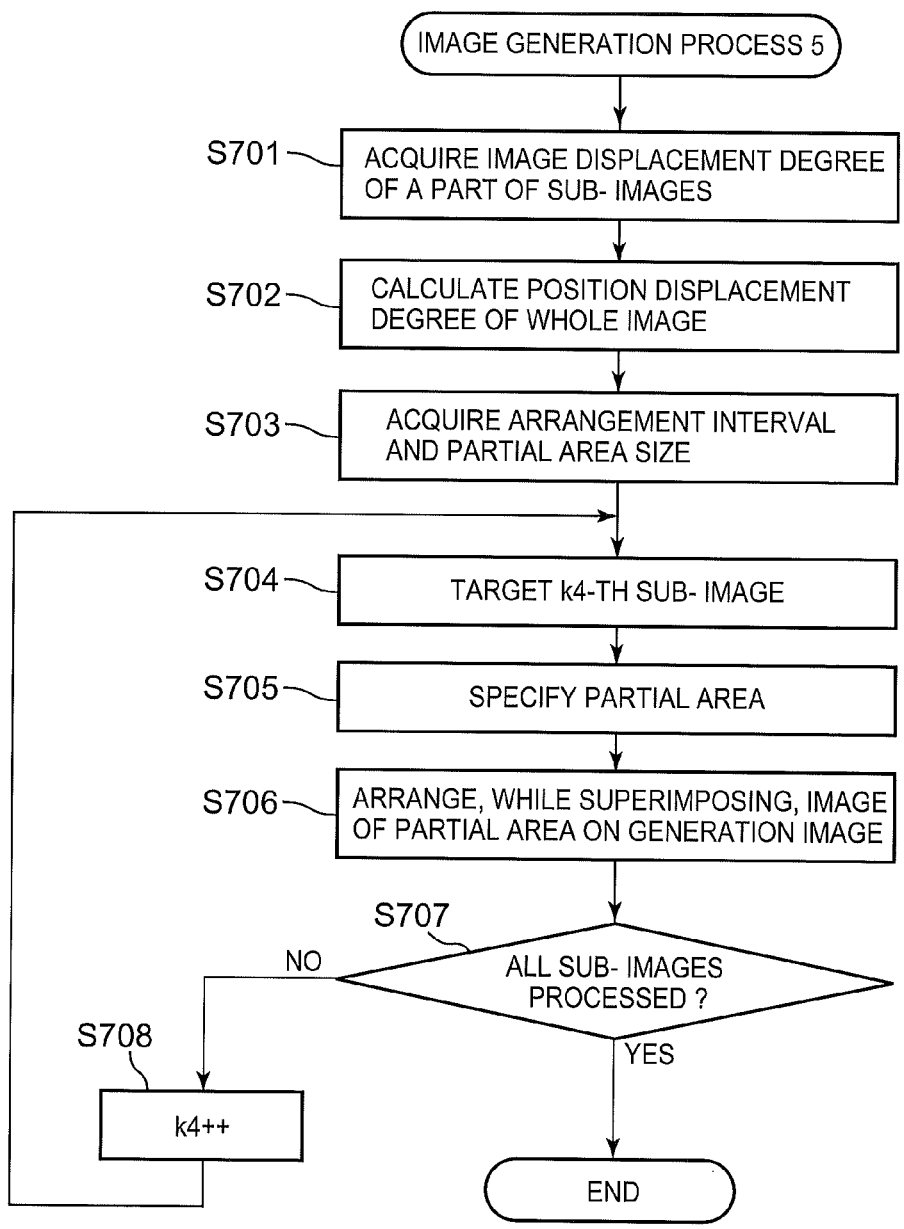
FIG. 20 is a flowchart of an image generation process executed by the digital camera according to the embodiment 3.

The image generation process 5 will be described with reference to FIG. 20.

In the image generation process 5, the image displacement degree calculator 734a first acquires one or more image displacement degrees for a part of sub-images determined by a setting among the sub-images included in the light field image LFI (step S701). Here, "a part of" sub-images is set so that the degree of displacement of overall light field image LFI is presented in the image displacement degree obtained from "a part of sub-images." Specifically, a part of sub-images may be sub-images of a predetermined central part of the light field image LFI, or four sub-images of corners, or the like.

The manner of acquiring the image displacement degree for each sub-image is the same as step S302 of the image generation process 2 (FIG. 11) according to the embodiment 1.

Next, the image displacement degree of the overall light field image LFI is determined based on the image displacement degrees of a part of sub-images calculated at step S701. Here, a plurality of calculated image displacement degrees are averaged, and the result is set as the displacement degree for the overall sub-images included in the light field image LFI (step S702).

Then, based on the displacement degree for the overall sub-images, the arrangement interval and partial area size which are applied to all sub-images are calculated in accordance with the conditions stored in advance at the ROM 22 or the memory 34 (step S703). As the displacement degree is larger, the partial area and the arrangement interval is also larger. Moreover, the partial area size is larger than the arrangement interval. In this embodiment, when the displacement degree of the overall sub-images is 10, for example, the arrangement interval is 10 pixels, and the partial area size is 20 pixels×20 pixels.

Next, k4 represents a counter variable, and the sub-image extractor 731 extracts the k4-th sub-image in the light field image LFI as a target sub-image (step S704).

Then, the partial area definer 735 defines the partial area in the size calculated at step S703 at the central part of the target sub-image as is the case for step S407 of FIG. 14 (step S705). As identifying the portion (partial area) of the sub-image which is either inside or outside a region (clipping partial area from sub-image), the partial area definer 735 also behave as a "clipper."

Furthermore, the image arranger 736 arranges the images of the partial area at the arrangement interval calculated at step S703 as is the case for step S408 of FIG. 14 (step S706). At this time, the images are arranged while inverting in four directions. At step S703, since the partial area size is larger than the arrangement interval, the partial images are arranged so as to overlap, as illustrated in FIG. 15. Averaging the pixel values of the overlapping section causes an addition of blurring to the generated live view image in accordance with the position displacement degree (which corresponds to the photographic object distance of the overall photographic object) calculated at step S702.

At step S707, it is determined whether the process which arranges images has been performed for all sub-images.

When an unprocessed sub-image remains, (step S707; NO), k4 is incremented (step S705), and the process is repeated from step S704.

On the other hand, when the process has been performed for all sub-images (step S707; YES), the generated image is output as the live view image, and the image generation process 5 is terminated.

Return to FIG. 19, the process from step S604 to step S609 is similarly performed with step S504 to step S509 of FIG. 17 in the embodiment 2, and this process is terminated.

As having described above, according to the digital camera 1 of the present embodiment, the image to which the blurring is added is displayed prior to the photographing (in the live view mode to generate the live view image). Accordingly, the user can expect a completed image easily prior to the photographing.

Moreover, in the live view mode to generate the live view image it is not needed to calculate the displacement degree for every pixel, and there is a little increase of the necessary calculation amount for adding blurring. Therefore, the image to which blurring is added can be generated at high speed.

(Embodiment 4)

The embodiment 4 of the present invention will be described.

The digital camera 1 of the present embodiment has a physical configuration illustrated in FIG. 2. The function of each element of the digital camera 1 is the same as the function in the digital camera 1 according to the embodiment 1.

According to the embodiment 1, the image displacement degrees are calculated for all sub-images in the image generation process 2 and the image generation process 3. In the image generation process 5 of the embodiment 3, the image displacement degrees of a part of sub-images (the predetermined part of the central part or four sub-images of corners, or the like) are calculated, and its average is set as the overall image displacement degree. On the other hand, in the present embodiment, when generating the live view image, the image displacement degrees are calculated for a part of sub-images, and from the calculation result, the image displacement degrees of other sub-images (other than the object for calculating the image displacement degree) are estimated. Moreover, the present embodiment is characterized by selecting the sub-images used as the object for calculation in cyclic manner.

The digital camera 1 of the present embodiment includes the functional constitution illustrated in FIG. 5.

In the present embodiment, the live view image generator 620 is a sixth reconstruction image generator 750 (FIG. 21), and the confirmation image generator 630 is the third reconstruction image generator 730 illustrated in FIG. 13A. The main image generator 640 is the fourth reconstruction image generator described in the embodiment 2. Other elements of FIG. 5 are the same as the elements of the digital camera 1 according to the embodiment 1.

Figure 21:
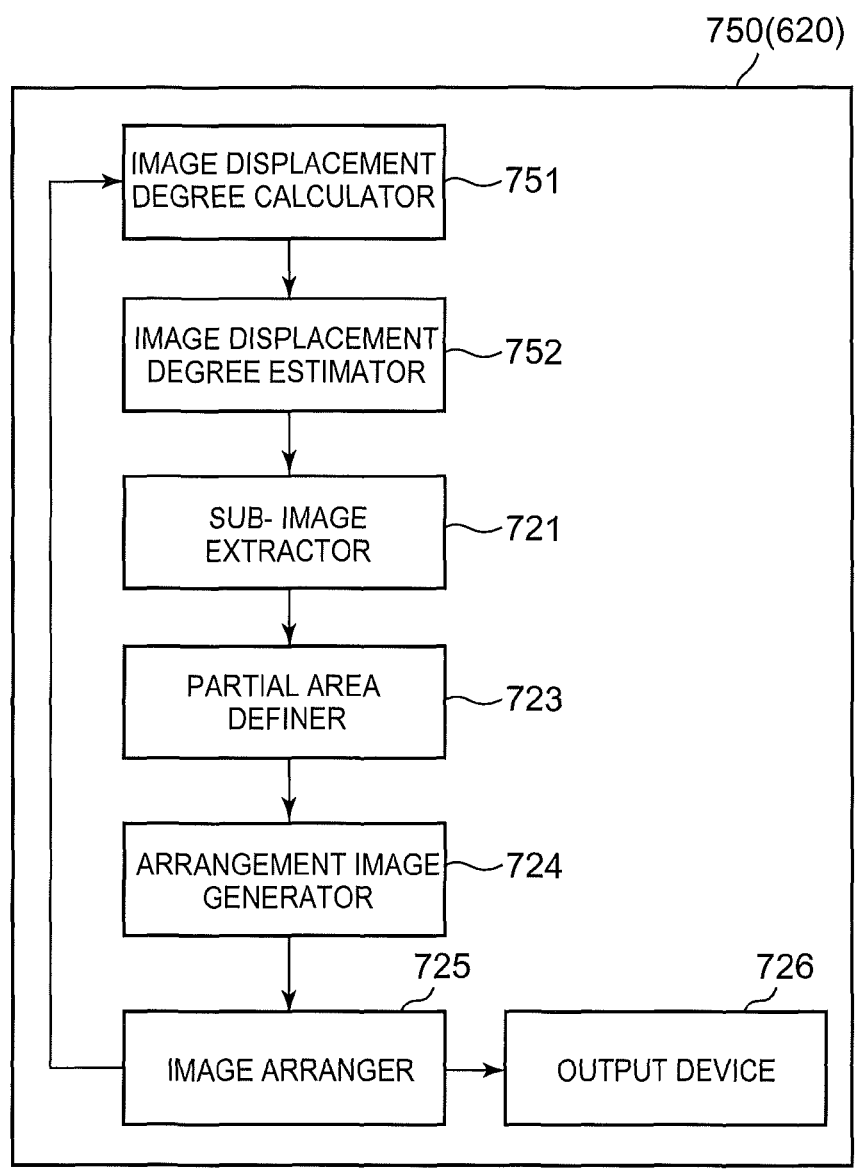
FIG. 21 is a block diagram illustrating a functional constitution of a live view image generator according to an embodiment 4 of the present invention.

The sixth reconstruction image generator 750 includes, as illustrated in FIG. 21, an image displacement degree calculator 751, an image displacement degree estimator 752, the sub-image extractor 721, the partial area definer 723, the arrangement image generator 724, the image arranger 725, and the output device 726. The sixth reconstruction image generator 750 includes the image displacement degree calculator 751 and the image displacement degree estimation unit 752 instead of the displacement value calculator 722 in comparison with the second reconstruction image generator 720 of FIG. 10A. Other configurations are the same as the second reconstruction image generator 720.

The image displacement degree calculator 751 selects the sub-image (calculation image) which is a calculation object for the displacement degree whenever the live view image is generated, in cyclic manner. Then, the image displacement degree is calculated for the selected calculation image. Specifically, the sub-image is divided into n groups (for example, n=2). When the live view images are sequentially generated, a group is selected in order for every loop as a target group (group including a calculation image). The sub-images belonging to the target group are used as the calculation image. The value of n is set in advance and stored in the memory 34. The calculation manner of the image displacement degree is the same as the manner by the displacement value calculator 722 in the embodiment 1.

The image displacement degree estimation unit 752 estimates the image displacement degree of sub-image (estimation image) other than the calculation image using the image displacement degree of the calculation image calculated by the image displacement degree calculator 751. The specific manner of the estimation is described below.

Figure 22:
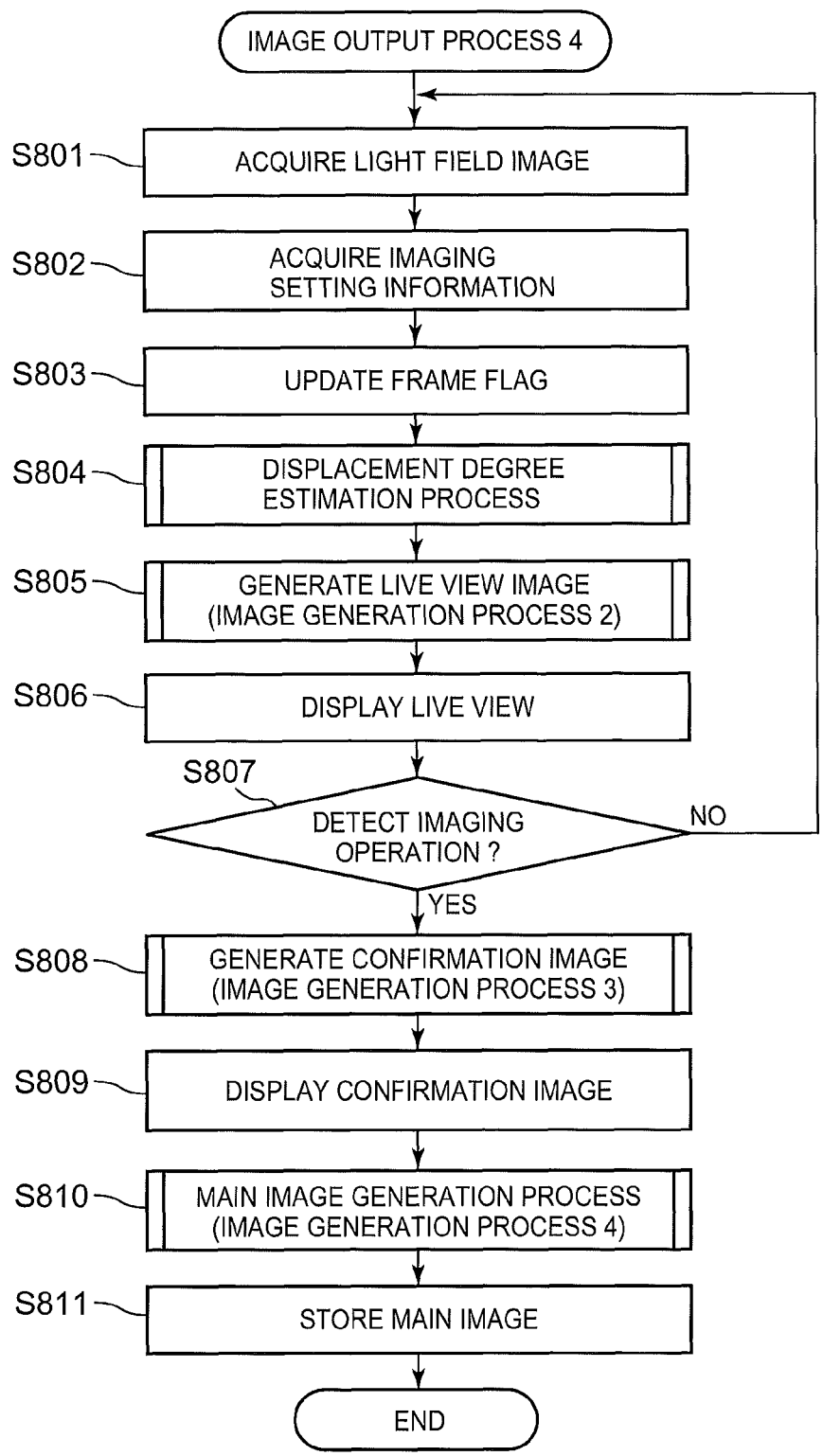
FIG. 22 is a flowchart of an image output process according to the embodiment 4.

The process performed by the digital camera 1 of the present embodiment will be described with reference to FIG. 22. The digital camera 1 of the present embodiment is powered on, and the input device 50 receives an operation for preparing a photographing, the digital camera 1 starts an image output process 4 illustrated in FIG. 22.

In the image output process 4, step S801 and step S802 are similarly performed with step S101 and step S102 of the image output process 1 (FIG. 6) performed in the embodiment 1.

The image displacement degree calculator 751 of the live view image generator 620 (the sixth reconstruction image generator 750) updates a frame flag (step S803). The frame flag is a flag for selecting a group for calculating the calculation image. The frame flag is set as 1 at first, and is incremented by 1 for every loop (step S801 to step S807) in which the live view image is generated. When the frame flag exceeds the number of groups n which is set, the frame flag returns to 1. As a result, in the case of n=4 for example, the frame flag is set the numerical values of 1 to 4 in cyclic manner such as 1, 2, 3, 4, 1, 2, 3, 4, and 1- - - .

After updating the frame flag at step S803, the image displacement degree calculator 751 calculates the image displacement degree of the calculation image, and starts the process (displacement degree estimation process) for estimating the image displacement degree of the estimation image.

The displacement degree estimation process performed at step S804 will be described with reference to FIG. 23. In the displacement degree estimation process, the image displacement degree calculator 751 first selects the calculation image according to the current frame flag (step S901).

Figures 24, 25:
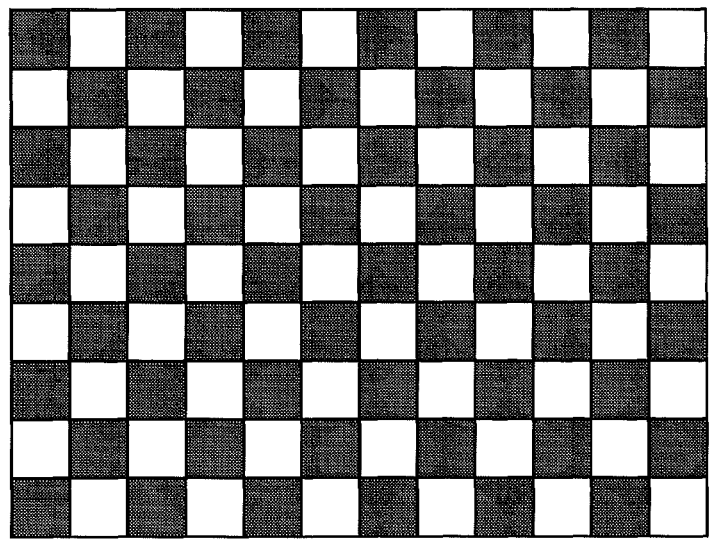
FIG. 24 is a drawing illustrating an example of grouping sub-images to estimation group and calculation group according to the embodiment 4.
FIG. 25 is a drawing illustrating an example of grouping sub-images to estimation images and calculation images according to the embodiment 4.

The selection manner of the calculation image selected in this step will be described using FIG. 24 and FIG. 25. In FIG. 24 and FIG. 25, each sub-image is represented in square form. For example, when the sub-image is divided into two groups (n=2), any of the sub-image illustrated in black in FIG. 24 and the sub-image illustrated in white is selected as the calculation image. For example, the sub-images in black is selected when the frame flag is 1, and the sub-images in white is selected when the frame flag is 2.

Alternatively, the light field image LFI is divided into n areas each of which includes the sub-images, and a calculation image is selected in cyclic manner in the divided area. For example, when n=9, the light field image LFI is divided into the area (thick line) which includes sub-images with three lines in vertical direction and with three lines in horizontal direction, as illustrated in FIG. 25. Then, the sub-images in the area are numbered from 1 to 9. For example, the sub-images a1 to a9 in FIG. 25 mean the first to ninth sub-images in a first area ("a" area), respectively. One sub-image with the number which matches with the current frame flag is selected as the calculation image from each area (in the example of FIG. 25 "a" area to "1" area).

After selecting the calculation image at step S901, the image displacement degree calculator 751 next selects one target sub-image from calculation image (step S902). The image displacement degree calculator 751 calculates the image displacement degree for the target sub-image (step S903). The calculation manner of the image displacement degree is the same as the manner in the embodiment 1.

The image displacement degree calculator 751 determines whether or not the amount of change of the image displacement degree for the target sub-image is equal to or larger than a threshold (step S904). In this step, the image displacement degree calculator 751 compares, for the target sub-image, a difference between the image displacement degree estimated in the last displacement degree estimation process and the image displacement degree calculated in current process, with a predetermined threshold. The threshold is obtained by experiments in advance, and is stored in the memory 34. In the case where the numerical values of n is relatively small and time lag from the time calculated last time (for example, when n=2) and the like, the difference between the image displacement degree calculated in the last process and the image displacement degree calculated in current process may be compared with a predetermined threshold.

When the amount of change is less than the threshold as a result of the comparison (step S904; NO), the image displacement degree calculator 751 sets a change flag of the target sub-image to OFF (step S905). On the other hand, when the amount of change is equal to or larger than the threshold (step S904; YES), the image displacement degree calculator 751 sets the change flag of the target sub-image to ON (step S906). The change flag is a binary variable associated with each sub-image.

After setting the change flag, the image displacement degree calculator 751 next determines whether the image displacement degrees have been calculated for all calculation images selected at step S901 (step S907). When an unprocessed calculation image exists (step S907; NO), the process is repeated from step S902 for the following calculation image. On the other hand, when all the calculation images has been processed (step S907; YES), process goes to nest step S908.

At step S908, one sub-image which has not been applied an estimation process is selected as a target image among images (estimation image) other than the calculation image (step S908).

The change flags for peripheral calculation images (peripheral image) are checked to determine whether or not the image displacement degree changed (step S909). For example, in the case of n=2, when there are a predetermined number of (for example, two or more) images of which the change flags are ON, among the calculation images adjacent to the target image in four directions, it is determined that a peripheral image has been change (step S909; YES). In this case, when all images of which the change flags are ON change in the same direction (for example, a direction of increasing displacement degree), it may be determined that the change can be trusted and there is a change. Moreover, when the images change in the different directions, it may be determined that the change cannot be trusted and there is no change. When n is larger than 2, m pieces of calculation images (for example, m=4) are selected in order from an image close to the target image, and the change flags are similarly referred to.

When it is determined that there is a change (step S909; YES), the image displacement degree of the nearest calculation image is estimated to be the image displacement degree of the target image (step S910). Alternatively, the numerical value obtained by averaging the image displacement degrees of the calculation images referred to at step S909 may be set as an estimated value.

On the other hand, when it is determined that there is no change in peripheral images (step S909; NO), step S910 is skipped. Then, it is determined whether the above-described process has been performed on all estimation images (step S911). When an unprocessed estimation image exists, the process from step S908 is repeated for the following estimation image (step S911; NO). On the other hand, when all estimation images have been processed (step S911; YES), the displacement degree estimation process is terminated.

Figure 26:
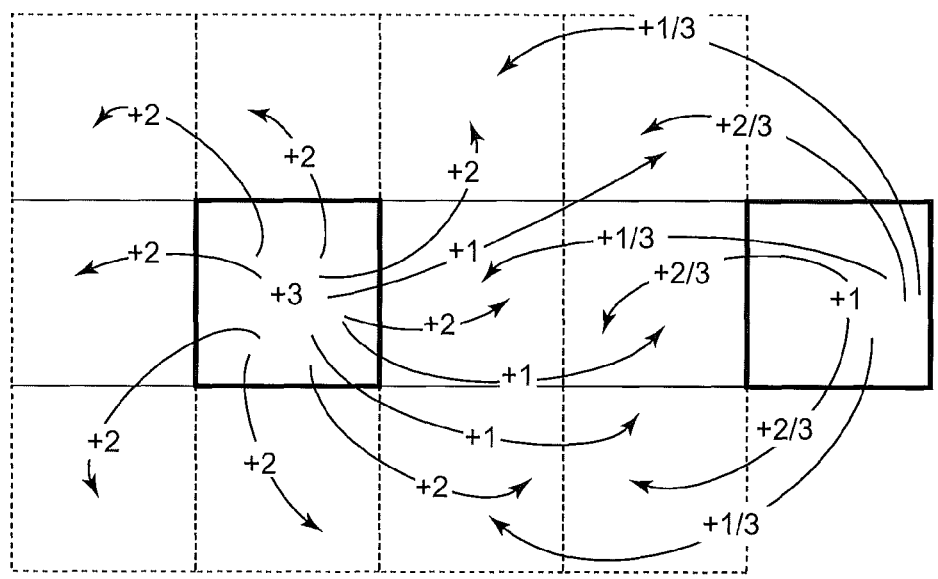
FIG. 26 is a drawing illustrating an example of an estimation process of a displacement degree according to the embodiment 4.

The process has been described above in which, when it is determined that the peripheral image has been changed, the image displacement degree of the peripheral calculation image is estimated as the image displacement degree of the estimation image. As another estimation manner, a method may be adopted in which the amount of change of the peripheral calculation image is distributed according to the distance from the calculation image. FIG. 26 illustrates a concrete example of the distribution. FIG. 26 illustrates an example of a case where the latest calculated value is different from the last calculated value (or last estimated value), for the calculation image depicted by a thick line (+3 for the calculation image on left side and +1 for the calculation image on right side). The difference of the image displacement degrees is multiplied by a weight which is smaller as increasing distance from the calculation image, the result of multiplication is added to the image displacement degree set in the last loop process for the estimation image (square by dotted lines), and the result of addition is regarded as the estimation result.

In FIG. 26, an arrow illustrates a direction of distribution (addition), and the numerical value on the arrow illustrates the number of distribution, respectively. In this example, two thirds of the differences of the calculation image is distributed to the estimation images adjacent to the calculation image in four directions and obliquely adjacent to the calculation image, and one thirds of the differences is distributed to the estimation image next to that image.

As another estimation manner, the image displacement degree of the estimation image may be set by a three-dimensional interpolation process using the image displacement degree of the calculation image.

Return to FIG. 22, after setting the image displacement degrees for all sub-images at step S804, the sub-image extractor 721 starts the image generation process 2 illustrated in FIG. 11 using the set image displacement degrees (step S805). In the image generation process 2, each step is performed as is the case in the embodiment 1 except for acquiring the image degree set in the image displacement degree estimation process at step S302.

When the live view image is generated in the image generation process 2, the display 70 displays the generated image (step S806). Then, it is determined whether the input device 50 detects an imaging operation (step S807).

When the imaging operation is not detected according to the determination (step S807; NO), it returns to step S801 and a generation of the live view image is continued. On the other hand, when the imaging operation is detected (step S807; YES), the confirmation image generator 630 (the third reconstruction image generator 730) generates the confirmation image by the image generation process 3 of FIG. 14 (step S808). In this case, the image generation process 3 may calculate the image displacement degrees for all sub-images, or may use the image displacement degree set in the last displacement degree estimation process (step S804). Alternatively, the estimation process may be performed by dividing the sub-image into the calculation image and the estimation image, as is the case in the process which generates the live view image. At this time, a rate of the calculation image to the overall sub-image is set larger than a case in the live view image, whereby allowing an improvement of estimation accuracy.

After that, the generated confirmation image is displayed (step S809), and the image generation process 4 generates the main image as is the case in the embodiment 3 (step S810). Then, the generated main image is stored (step S811), and the image output process 4 is terminated.

As having described above, according to the digital camera 1 of the present embodiment, there is no necessity of calculating the image displacement degree for all images, in the process which requires the image displacement degree of each sub-image such as the image generation process 2. When generating a high quality image, since a calculation of the image displacement degree which requires large calculation amount can be restricted, necessary calculation amount is reduced.

As a result, electric power required for calculation is also reduced. Accordingly, the drive time and the maximum number of photographing of the digital camera 1 can be increased.

Moreover, when generating the live view image, the calculation images are selected in cyclic manner. In the case where the calculation image is fixed, when the photographic object of the calculation image is different from other photographic objects of the estimation image, and when the noise has occurred in the calculation image, the calculation error due to these matters always appear on the whole image. According to the present embodiment, since the calculation image is changed for every generation process, it is possible to ease the influence of the calculation error even if some sub-images have error. Furthermore, in the long term view, since the image displacement degrees are calculated for all sub-images, the live view images represent the overall photographic object.

Figure 23:
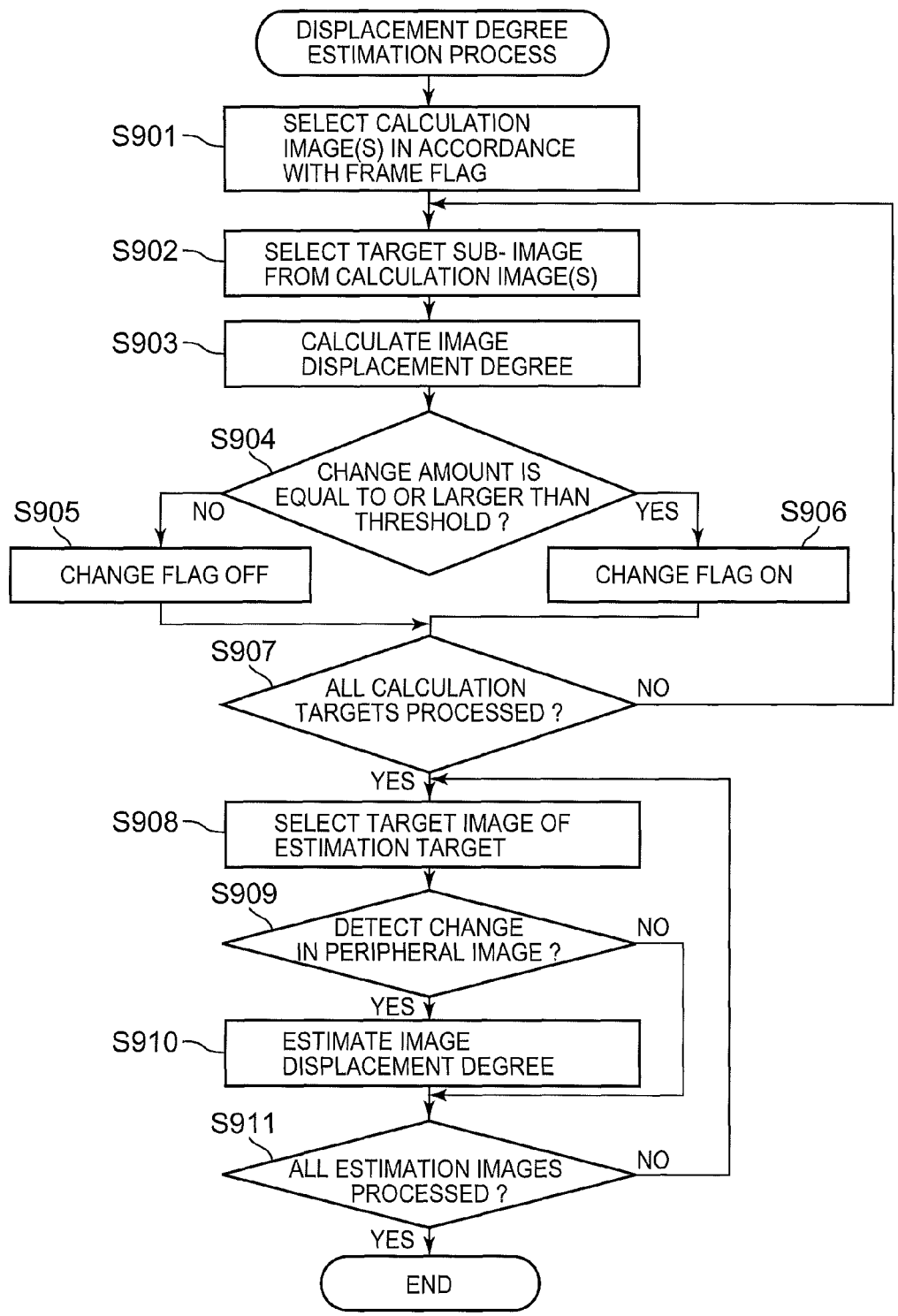
FIG. 23 is a flowchart of a displacement degree estimation process according to the embodiment 4.

In the present embodiment, the live view image generator 620 generates the live view image by the image generation process 2 using the image displacement degree calculated or estimated by the displacement degree estimation process of FIG. 23. It is not limited to this manner, the displacement degree estimation process is applicable to an arbitrary process (the image generation process 3, image generation process 5, or the like) which generates the reconstruction image using the image displacement degree. For example, the live view image generator 620 may generates the image by the displacement degree estimation process and the image generation process 3. Moreover, not only for the live view image generator 620 but also for the confirmation image generator 630 or the main image generator 640, the displacement degree estimation process of the present embodiment can be used, when adopting a configuration which generates the reconstruction image using the image displacement degree.

(Embodiment 5)

Hereinafter, the embodiment 5 of the present invention will be described based on drawings. The digital camera according to the embodiment 5 is characterized in that an image generation process 6 described below is used instead of the process performed by the main image generator 630 of the digital camera 1 in the embodiment 1. Other functional constitutions and processes are the same as the functional constitutions and processes of the digital camera 1 according to the embodiment 1.

The digital camera 1 of the present embodiment has functional constitution illustrated in FIG. 5.

In the present embodiment, the live view image generator 620 is the second reconstruction image generator 720, the confirmation image generator 630 is the third reconstruction image generator 730, and the main image generator 640 is a seventh reconstruction image generator 760. Other elements of FIG. 5 are the same as the corresponding elements of the digital camera 1 according to the embodiment 1.

Figures 27A, 27B:
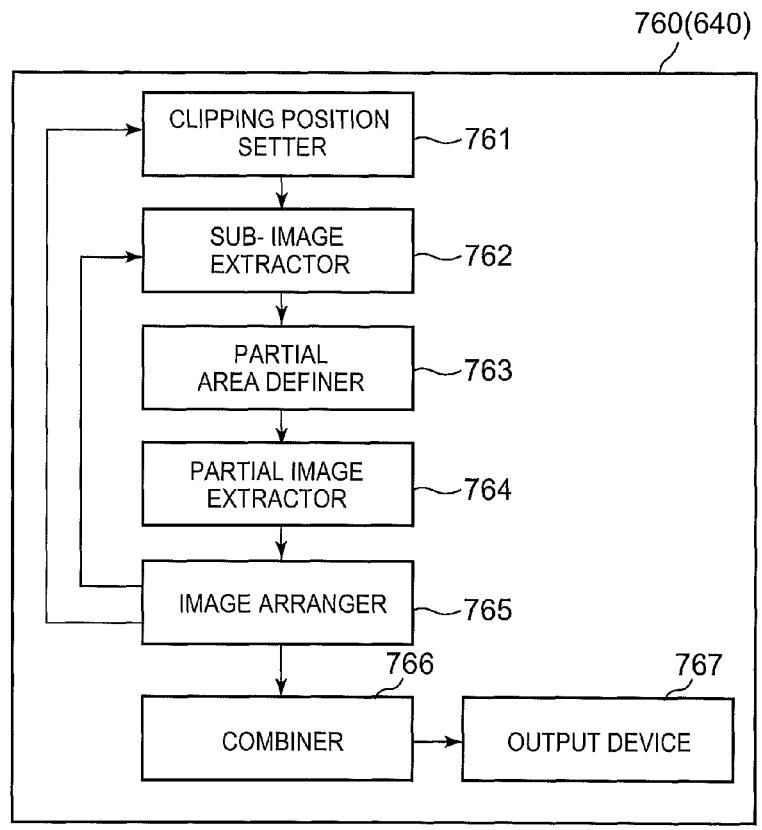
FIG. 27A is a block diagram illustrating a functional constitution of a main image generator according to an embodiment 5 of the present invention.
FIG. 27B is a drawing illustrating an example of a correspondence table of a re-focal length, a reconstruction distance, and a clipping size according to the embodiment 5.

The configuration of the seventh reconstruction image generator 760 will be described with reference to FIG. 27A. The seventh reconstruction image generator 760 includes, as illustrated in FIG. 27A, a clipping position setter 761, a sub-image extractor 762, a partial area definer 763, a partial image extractor 764, an image arranger 765, a combiner 766, and an output device 767.

By means of such configuration, the seventh reconstruction image generator 760 generates a predetermined number of intermediate images (for example, intermediate images $ImI_1$ to $ImI_n$), while changing an extracting (clipping) position of the partial area (partial image) from the sub-image. Then, respective generated intermediate images are combined to generate the reconstruction image (main image).

The clipping position setter 761 sets the position where the partial area (partial image) is extracted from the sub-image (target image extracted by the sub-image extractor 762). In the present embodiment, different positions of partial areas are set for each generation process of intermediate image (for example, the central part of the target image when generating the intermediate image $ImI_1$, and predetermined area at the upper right of the target image when generating the intermediate image $ImI_2$, and the like).

The sub-image extractor 762 extracts one sub-image from sub-images as the target image for generating the intermediate image, as is the case of the process performed by the sub-image extractor 731 for generating the reconstruction image of the embodiment 2, The partial area definer 763 defines the partial area at a position on the target image set by the clipping position setter 761, the size (clipping size) of partial area being determined in accordance with the focal lengths of the main lens and the micro lenses of the micro lens array, the position on which the imaging element 313 is arranged, and the reconstruction distance. Since the focal lengths of the micro lenses are usually constant, the partial area is determined using a table (for example, FIG. 27B) in which the focal length of the main lens 311, the reconstruction distance, and clipping size are associated with each other, and which is stored in the ROM 22.

The partial image extractor 764 resizes the image of the partial area to a predetermined image size (for example, 4×4 pixels), and extracts resized image as the partial image. As identifying the portion (partial area) of the sub-image which is either inside or outside a region (clipping partial area from sub-image) and extracting pixel data on the partial area, the partial area definer 763 and the partial image extractor 764 also behave as a "clipper" as a whole. The image arranger 765 arranges the image extracted by the partial image extractor 764 according to the position of the original sub-image to generate the intermediate image. For this reason, the image arranger 765 is also referred to as an intermediate image generator. The specific example of the process is described below.

Then, the combiner 766 combines respective intermediate images to generate the reconstruction image. The combiner 766 may generate the reconstruction image using an arbitrary known technique which summarizes a plurality of images into one image, but in the present embodiment, the reconstruction image is generated by averaging all intermediate images.

The output device 767 outputs the generated reconstruction image to outside (the display 35, the memory 80, the removable media 38 or the like), and stores the generated reconstruction image as the image for viewing.

The process performed by the digital camera 1 of the present embodiment will be described with reference to a flowchart. When the digital camera 1 is powered on, and the input device 50 receives an operation for preparing a photographing, the digital camera 1 starts an image output process as is the case in the digital camera 1 in the embodiment 1. The image output process in the present embodiment performs the image output process 1 of FIG. 6 as is the case in the embodiment 1, except for using the image generation process 6 illustrated in FIG. 28 as the main image generation process performed at step S109.

The image generation process 6 performed at step S109 will be described with reference to FIG. 28. Prior to the image generation process 6, the digital camera 1 has imaged the photographic object and has stored (captured) the data of the light field image obtained by the imaging in the RAM 23, the memory 34 or the like.

At step S1001, the seventh reconstruction image generator 760 retrieves from the ROM 22 the size of the partial image to be clipped from the sub-image, and sets (determines) the retrieved size as a clipping size. A correspondence table for the re-focal length and the clipping size has been stored in the ROM 22. The clipping size is determined according to the focal lengths of the main lens and the micro lenses in the micro lens array, the position on which the imaging element 33 is arranged, and the re-focal length.

The difference of the angles of view for every micro lens is smaller as the photographic object exists further away, and thus movement of the imaging location in the sub-images is also small. According to this face, the clipping size is made small. On the contrary, the difference of the angles of view for every micro lens is larger as the photographic object exists nearer, and thus the movement of the imaging location in the sub-image is also large. According to this face, the clipping size is made large. Specifically, it is assumed that the focal lengths of the main lens and the micro lenses are constant, and the correspondence table of the reconstruction distance and the clipping size is set so that the clipping size is smaller as the reconstruction distance is larger (refer to drawing 27B).

At step S1002, the clipping position setter 761 sets (determines) the position of the partial image to be clipped from the sub-image. In the present embodiment, an initial value (setting position in a first loop) is the center of the sub-image.

Next, at S1003, the sub-image extractor 762 selects the sub-image to be processed. Specifically, k4 represents a counter variable, and the k4-th sub-image in the light field image LFI is extracted as a target sub-image (step S1003).

Next, at step S1004, the partial area definer 763 and the partial image extractor 764 clip the partial image from the selected sub-image. Specifically, the partial area definer 763 defines the area with the size defined at step S1001, on a part corresponding to the clipping position set at step S1002 on the target sub-image, as the partial area. Then, the partial image extractor 764 clips (extracts) the image of the partial area (step S1004). Furthermore, at step S1004, the partial image extractor 764 resizes the clipped image into the partial image with a predetermined number of pixels (for example, 4×4 pixels).

Next, at step S1005, the image arranger 765 arranges the partial image clipped at step S1004 on the intermediate image, based on the clipping size, the clipping position in the sub-image, and an alignment position of the sub-image in the light field image. The concrete process is described below using a concrete example. In this case, in the light field image photographed by the optical system, as illustrated in FIG. 3, in which a focal point of the main lens is positioned in the main lens side from the imaging element, each partial image is inverted in four directions to arrange on the intermediate image. In the case of the optical system in which a focal point of the main lens is positioned behind the imaging element, the partial images are not inverted in the four directions.

At step S1006, the seventh reconstruction image generator 760 determines whether all sub-images have been processed. When the determining result is No, the seventh reconstruction image generator 760 increments the counter variable k4 (step S1007), and returns to step S1003 to repeat the process. When the determining result is Yes (step S1006; Yes), at step S1008, the seventh reconstruction image generator 760 stores the intermediate image in the RAM 23 or the memory 34 (step S1008).

Next, at step S1008, the seventh reconstruction image generator 760 determines whether a predetermined number (for example, eight pieces) of intermediate images have been generated. When the determining result is No (step S1009; No), the seventh reconstruction image generator 760 returns to step S1002, and repeats the process with respect to the next clipping position in which an offset is added to the last clipping position. Although the offset can be set arbitrarily, it is desirable to set the offset value so that the partial area does not protrude from the sub-image, and so that the partial area can be set without bias from the sub-image according to the shape (a circular pattern in FIG. 29) of a diaphragm.

The seventh reconstruction image generator 760 repeats the process from step S1002 to step S1009. In this case, the seventh reconstruction image generator 760 adds an offset of the clipping position, and arranges the partial image on the intermediate image. It will be describe specifically below. In this way, the photographic object's positions are aligned between the intermediate images. When the determining result is Yes at step S1009 (step S1009; Yes), at step S1010, the combiner 766 averages the plurality of obtained intermediate images to generate the reconstruction image. After that, the digital camera 1 stores and displays the generated reconstruction image, and the image output process 1 is terminated.

Figure 29:
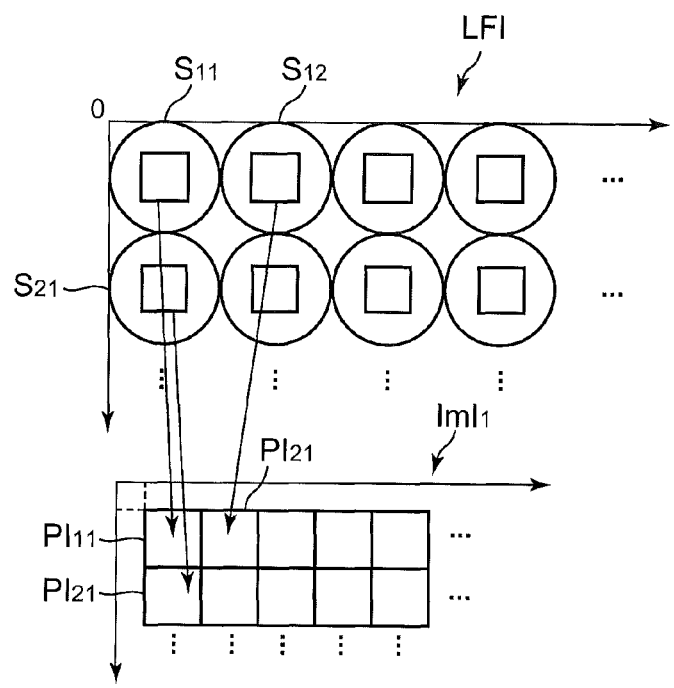
FIG. 29 to FIG. 31 are drawings illustrating a concept of a process which arranges partial images on an intermediate image according to the embodiment 5.
Figure 30:
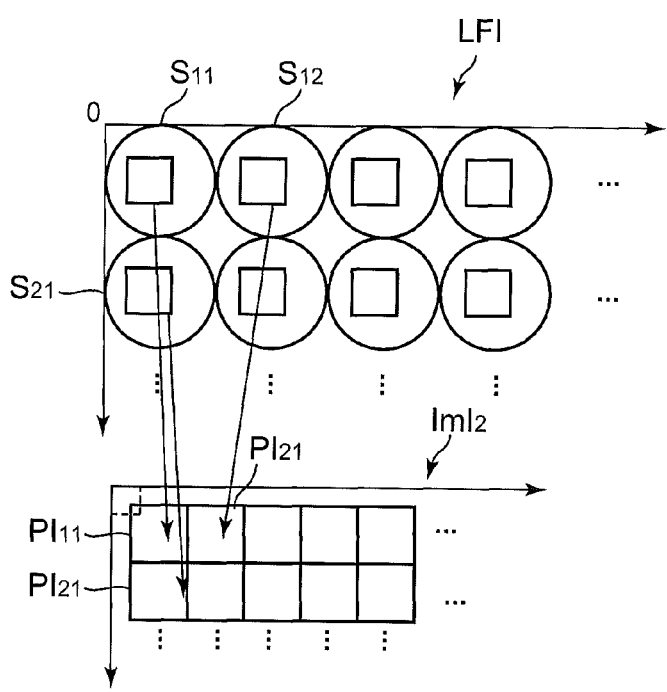
Figure 31:
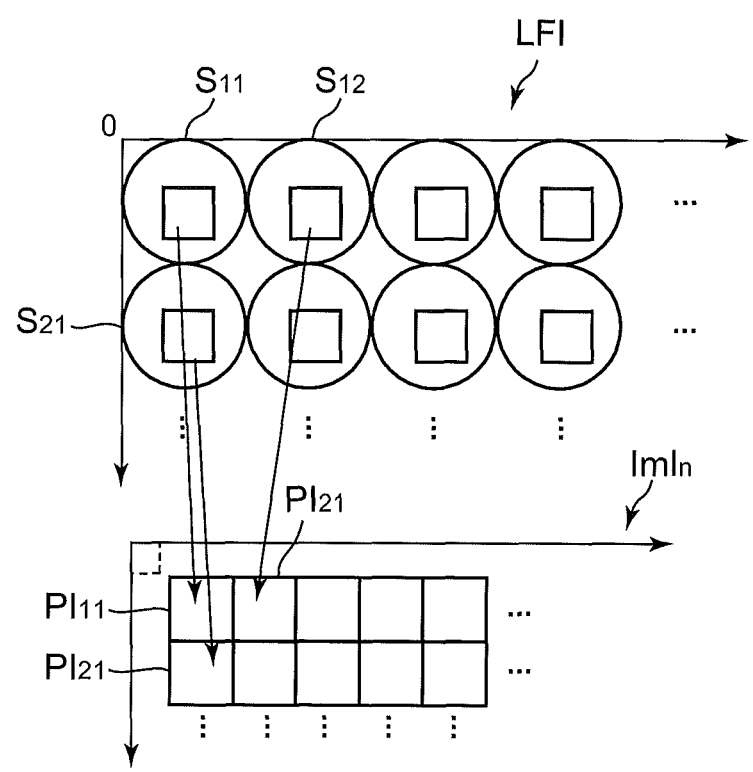

The process from step S1002 to step S1009 will be described using FIG. 29 to FIG. 31. The process (step S1003 to step S1006) which generates a first intermediate image is illustrated in FIG. 29. The sub-image $S_{11}$ at the upper left of the light field image LFI is selected first (S1003). The partial image $PI_{11}$ is clipped (extracted) from the central part (initial value of the clipping position) of the selected sub-image $S_{11}$ (S1004), and the partial image $PI_{11}$ is arranged at the upper left of the intermediate image $ImI_1$ (S1005). In FIG. 29 to FIG. 32, the reference position where the intermediate image $ImI_1$ is arranged is illustrated by the dotted line and the dot.

In the following loop, the sub-image $S_{12}$ on the right is selected (S1003). The partial image $PI_{12}$ is clipped from the central part of the selected sub-image $S_{12}$ (S1004), and the partial image $PI_{12}$ is arranged on the right of partial image $PI_{11}$ which has been arranged in the intermediate image $ImI_1$ (S1005). Such operations are repeated to the right end of the light field image LFI. When the process for the sub-image $S_{1N}$ at the right end is completed, it returns to the left end of the light field image LFI, and selects the sub-image $S_{21}$ on the second row from the top (step S1003). Then, the partial image $PI_{12}$ is clipped from the central part of the selected sub-image $S_{12}$ (S1004), and the partial image $PI_{12}$ is arranged under the partial image $PI_{11}$ which has been arranged first in the intermediate image 1 (S1005). Such operations are repeated to the right end of the light field image LFI, as is the case for the first row. When the process for the sub-image S at right end is completed, the sub-images S on the following row in the light field image LFI will be processed. These operations are repeated. When it is determined that the sub-image $S_{MN}$ at the lowermost and rightmost of light field image LFI is completed (S1006; Yes), the intermediate image $ImI_1$ is stored in the memory 34 or the like (S1008). Then, the generation of the intermediate image $ImI_1$ is terminated.

Since the partial images are arranged in order simply on the intermediate image $ImI_1$ in this phase, the connecting part of the sub-images is noticeable between each partial image.

FIG. 30 illustrates an example, in the second loop, of the process which sets the clipping position on the upper left side in the sub-image, and generates the intermediate image $ImI_2$. In this case, the offset value between the first loop and the second loop is a value to move the clipping position from the center of the sub-image to upper left side (for example, 10 pixels to the left and 10 pixels upward). In accordance with a movement of clipping position to the upper left side rather than the case illustrated in FIG. 29, the position where the image arranger 765 arranges the partial image on the intermediate image $ImI_2$ at step S1005 is moved to the upper left side (FIG. 30 lower side).

The process which generates the intermediate image while adding the offset to the clipping position (step S1002 to step S1009) are repeated. FIG. 31 illustrates an example of the process which sets the clipping position at lower right in n-th loop, and generates the intermediate image $ImI_n$. From the second loop to the n-th loop, the offset value is changed so that the clipping position moves gradually from the upper left to the lower right (for example, 3 pixels to the right when not changing the row, 3 pixels downward and 21 pixels on the left when changing the row, or the like). In accordance with a movement of clipping position to the lower right side rather than the case illustrated in FIG. 29, the position where the image arranger 765 arranges the partial image on the intermediate image $ImI_n$ at step S1005 is moved to the lower right side (FIG. 31 lower side).

In the reconstruction image obtained by averaging a plurality of intermediate images in this manner, the connecting part of the sub-images is not noticeable comparison with the intermediate image in which the partial images are simply arranged. In other words, at the time of reconstructing an image by clipping an image from the sub-image of the light field image, the clipping position is caused to change for each intermediate image, and the intermediate images are averaged, and therefore it is possible to obtain a comfortable (image with good quality) and good reconstruction image.

Figure 32A:
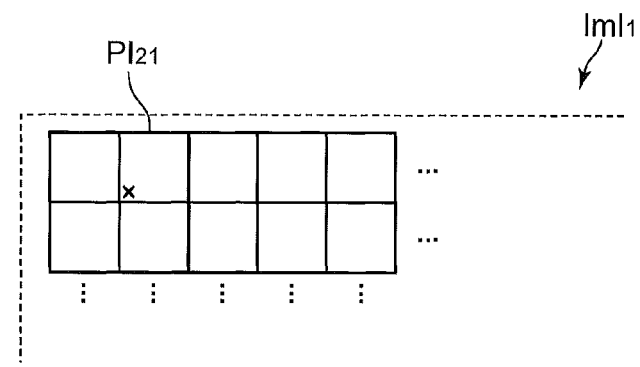
FIG. 32 A to FIG. 32C are drawings illustrating examples of arrangements of the partial images on the intermediate image according to the embodiment 5.
Figure 32B:
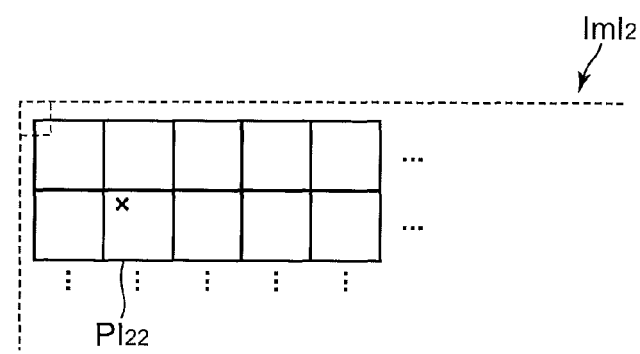
Figure 32C:
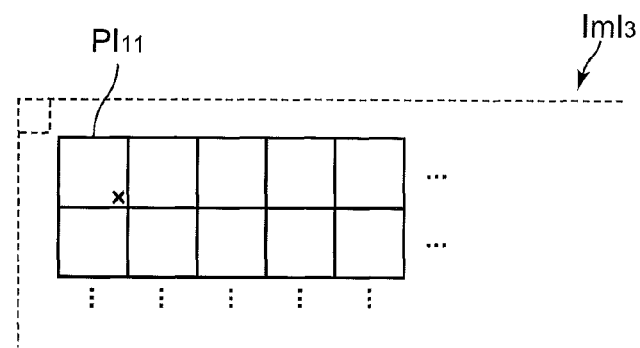

In the present embodiment, the reconstruction image is obtained by determining the clipping size according to the reconstruction distance, changing the clipping position for each intermediate image, and averaging the intermediate images. FIG. 32A to FIG. 32C illustrate comparisons of the intermediate images $ImI_1$, $ImI_2$ and $ImI_n$ in FIG. 29 to FIG. 31, where the clipping positions are different. When attention is paid to the pixel with mark x, it can be understood that, in the intermediate images $ImI_1$, $ImI_2$ and $ImI_n$, the pixels on different positions of the different sub-image are adopted, respectively. In other words, the present embodiment reconstructs the pixel of photographic object to be reconstructed by averaging pixels on different positions of different sub-images according to a re-focal length. Moreover, since the positions of the connecting part between the partial images are different in $ImI_1$ to $ImI_n$ respectively, combining the images (additional average) allows a generation of the reconstruction image with high image quality, in which sections between the partial images are not noticeable, with a small calculation amount for arrangement of the partial images and averaging.

In the present embodiment, alignment is performed taking the offset of the partial image into consideration when arranging the partial images on each intermediate image, but alignment may be performed taking the offset of the clipping position into consideration when averaging intermediate images. In other words, at the time of generating the intermediate images, the partial images are arranged on one image irrespective of the clipping position. Then, at the time when the combiner 766 combines the intermediate images, the intermediate images are shifted with each other according to the offset value and averaged. By this means, a similar effect can be provided.

The reconstruction distance may be set on the basis of manual operation, or may be set by measuring a distance to the photographic object which is desired to focusing. Furthermore, the re-focal length may be set again by reselecting a photographic object which is desired to focusing a touch panel or the like after displaying the reconstruction image.

In the present embodiment, although the repetition process while changing a clipping position is terminated by having created a predetermined number of intermediate images, the repetition process may be terminated by a user's operation. For example, whenever the seventh reconstruction image generator 760 generates one intermediate image, the reconstruction image in which the intermediate images generated by then are combined is displayed on the display to provide the image to the user, and promoting user to operate a given handler (for example, a shutter button) when the user is satisfied with image quality. Then, the repetition process may be terminated by the operation of the handler. In this way, even if throughput of the CPU is low, the image quality with which the user is satisfied in the shortest time can be achieved.

Subsequently, a modification of the present embodiment will be described. The present modification is an example which achieves the similar effect with the embodiments, even if the order of steps in the image generation process 6 is changed. The main image generator (an eighth reconstruction image generator) of the present modification has same functional elements in the seventh reconstruction image generator 760 illustrated in FIG. 27A.

Figure 33:
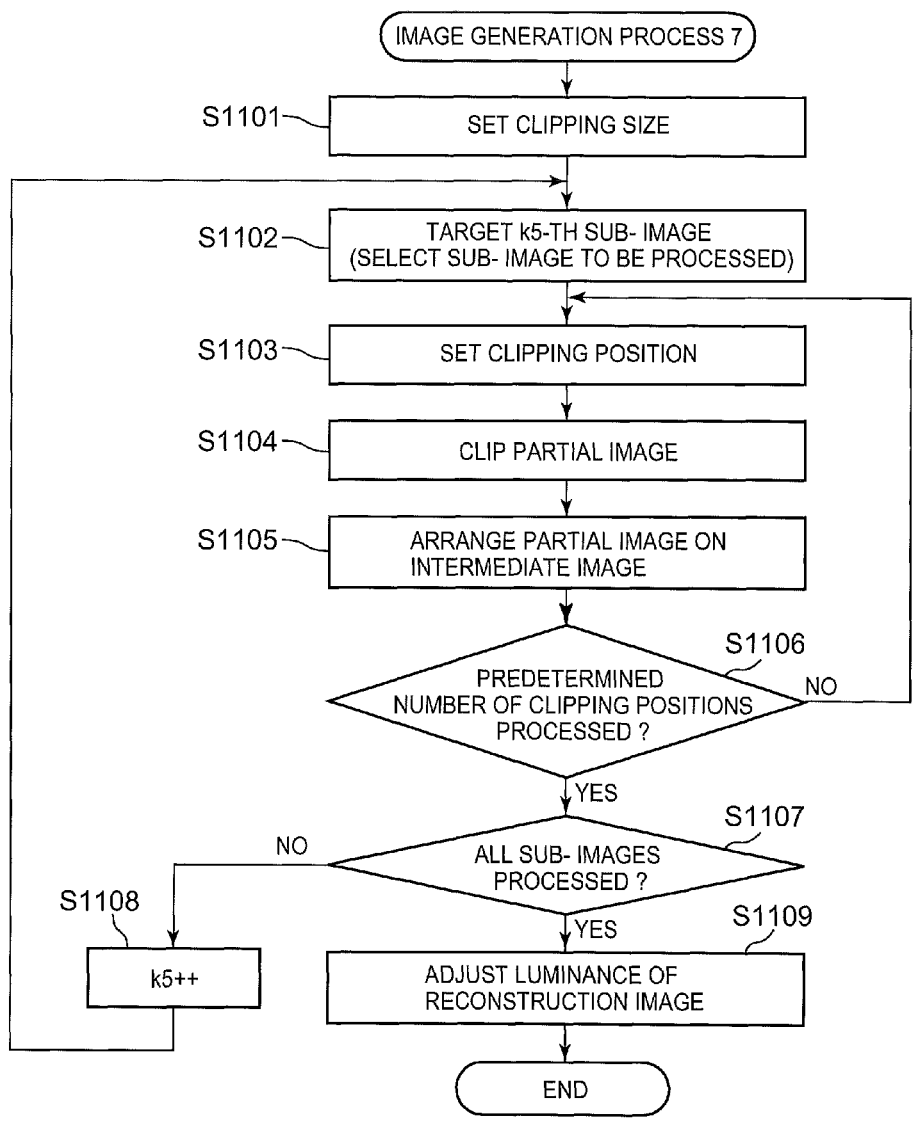
FIG. 33 is a flowchart of an image generation process 7 according to a modification of the embodiment 5.

FIG. 33 is a flowchart of a process (an image generation process 7) performed by the main image generator (the eighth reconstruction image generator) according to the present modification. Before performing the image generation process 7 and before arriving at step S1101 of the image generation process 7, the digital camera of the modification performs the process as is the case in step S1001 of FIG. 28.

At step S1102, the sub-image extractor of the eighth reconstruction image generator selects the sub-image to be processed. Specifically, k5 represents a counter variable, and k5-th sub-image in the light field image LFI is extracted as a target sub-image (step S1102). At step S1103, the clipping position setter sets (determines) a position of the partial image to be clipped (extracted) from the sub-image as is the case in step S1002 of the image generation process 6 (FIG. 28). An initial position is the center of the sub-image. At step S1104, the partial area definer and the partial image extractor clip the partial image from the sub-image selected as is the case in step S1004 of the image generation process 6 (FIG. 28).

At step S1105, the image arranger adds the partial image to the reconstruction image based on the clipping size, the clipping position in the sub-image, and the alignment position of the sub-image in the light field image. Specific process is described below. At step S1106, the eighth reconstruction image generator determines whether a predetermined number (for example, 8) of clipping positions have been processed. When a determination result is No (step S1106; No), the CPU 11 returns to step S1103, changes the clipping position as is the case in the image generation process 6, and repeats the process. Such repetition results in setting of a plurality of clipping positions in the overall process.

The boundary (circle in upper side of FIG. 34) of the sub-images depends on a shape of the diaphragm located in the optical system. In view of this matter, a range of changing the clipping position of the partial image is restricted according to the shape of the diaphragm. For example, when the diaphragm has a substantially circular shape, and the clipped partial image has a quadrangle shape, at the clipping position setting process of step S1103, the offset value is set so that the range of changing the clipping position in a diagonal direction of the partial image is smaller than a range of changing in a vertical and/or horizontal direction of the sub-image.

When the determination result is Yes at step S1106 (step S1106; Yes), the eighth reconstruction image generator determines, at step S1107, whether all sub-images have been processed. When the determination result is No (step S1107; No), the eighth reconstruction image generator increments the counter variable k5 (step S1108), and after that, returns to step S1102, selects following sub-image, and repeats the process.

When the determination result is Yes (step S1107; Yes), at step S1109, the combiner of the eighth reconstruction image generator adjusts the luminance of the reconstruction image. In other words, luminance is adjusted by dividing the pixel value which is increased by repetition of the addition by a setting number of the clipping position (normalization). After that, the digital camera 1 stores and displays the generated reconstruction image, and the image output process of present modification is terminated.

Figure 34:
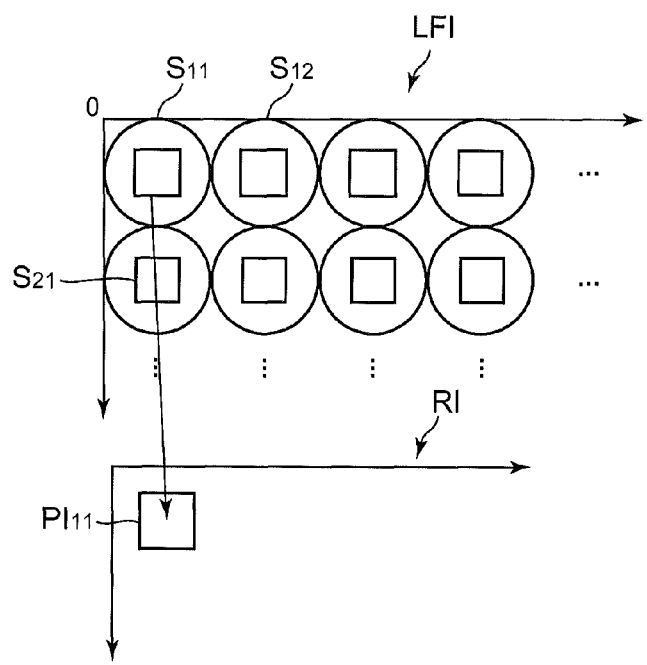
FIG. 34 is a drawing illustrating a concept of a process which arranges the partial images on the intermediate image according to the modification of the embodiment 5.
Figure 35:
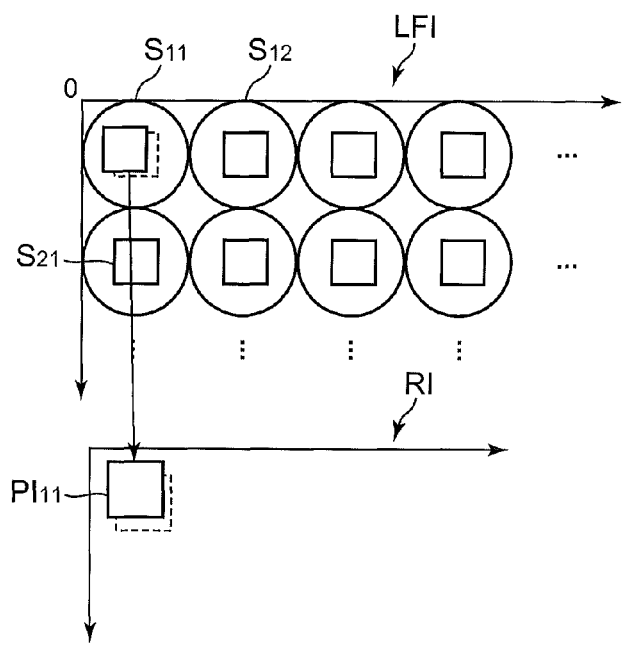
FIG. 35 is a drawing illustrating a concept of a process which arranges the partial images on the intermediate image according to the modification of the embodiment 5.

The concept (outline) of the process of step S1103 to step 1106 of the image generation process 7 will be described using FIG. 34 and FIG. 35.

The description is made using an example of process for the sub-image S11 at the upper left on the light field image LFI. At step S1103 in a first loop, the clipping position (central part) in the selected sub-image S11 is set. The partial image $PI_{11}$ is clipped (extracted) from the selected sub-image $S_{11}$ (S1104). The clipped partial image $PI_{11}$ is added to the reconstruction image RI based on the clipping size, the clipping position in the sub-image $S_{11}$, and the alignment position of the sub-image $S_{11}$ in light field image LFI (S1105). The square in lower side of FIG. 34 illustrates this addition position.

In the following loop (FIG. 35), a new clipping position (upper left from the central part) in which the offset is added is set (S1103). In this loop, the clipping size and the alignment position of the sub-image $S_{11}$ in the light field image LFI are the same as the size and position in FIG. 34, but the clipping positions in the sub-image $S_{11}$ are different.

The light field image LFI is a series of images including a plurality of sub-images $S_{11}$ to $S_{NM}$. Therefore, depending on a inapplicable setting of the offset, not only an area which is effective as the sub-image S but also an area which is invalid as the sub-image may be clipped as the partial images. The partial image including the invalid area serves as a noise source, and therefore the clipping range (the partial area) is required to be set within a range formed by the boundary of the sub-image S. Therefore, it is necessary to restrict the offset amount of the clipping position of the partial image according to the shape of the diaphragm. For example, when the diaphragm has a substantially circular shape, and the clipped partial image has a quadrangle shape, the range of changing the clipping position in the diagonal direction of the partial image is made smaller than the range of changing in the vertical and/or horizontal direction of the sub-image. As a concrete example, when the clipping position is changed from the central part which is set as the starting point, a possible offset value in the vertical and/or horizontal direction may be set larger, and a possible offset value in the diagonal direction may be set smaller.

The position where the partial image is added to the reconstruction image RI is also applied the offset with the offset amount of the clipping position. FIG. 35 illustrates a first addition position with a dotted line, and a second addition position with a solid line, for the sake of illustrating the addition positions which are applied the offset. On the reconstruction image RI, the partial images are added so that the boundary of the partial images do not overlap, and thus the connecting part of a plurality of sub-images is made not noticeable and a good (high image quality) reconstruction image RI can be obtained.

Although the embodiments 1 to 5 of the present invention have been described, but the embodiments of the present invention is not limited to the above-described embodiments, and various modifications can be made.

Although the above-described embodiments are described taking an example that the images are gray scale images, the images used as the processing object in the present invention are not limited to the gray scale image. For example, the images may be RGB images in which three pixel values of R (red), G (green) and B (blue) are defined for each pixel. In this case, pixel values are similarly processed with a vector of RGB. Alternatively, the above-described process may be applied to each of values R, G, and B respectively, by handling each value of RGB as independent gray scale image. According to this configuration, the reconstruction image which is a color image can be generated from the light field image which is a color image.

The reconstruction distance (which corresponds to a distance to the reconstruction surface) may be set on the basis of manual operation, or may be set by measuring a distance to the photographic object which is desired to focusing. Furthermore, the re-focal length may be set again by reselecting a photographic object which is desired to focusing a touch panel or the like after displaying the reconstruction image.

Moreover, although a case where the main lens imaging plane MA exists in the main lens side from the micro lens array is described, the configuration of the optical system of the present invention is not limited to such configuration.

For example, the main lens imaging plane MA may exist on the back of the micro lens array, and the others are same design. In this case, when arranging the image for arrangement on the generation image, the image is arranged as it is, without inverting in four directions.

Moreover, a case may be presumable in which the imaging plane of the micro lens is on the micro lens side from the imaging element. In this case, the arrangement image is further inverted in four directions, and is arranged on the generation image, on the basis of a case other than this case.

The live view image generation process, the confirmation image generation process, and the main image generation process are not limited to above-described combination. In the present invention, a combination of the above-described processes can be arbitrarily selected under the condition that a required calculation amount for the live view image generation process is equal to or less than a calculation amount for the confirmation image generation process, and a required calculation amount for the main image generation process is larger than a calculation amount for the confirmation image generation process.

For example, the live view image generation process and the confirmation image generation process may be the above-described image generation process 1, and the main image generation process may be the image generation process 3 or 4. Alternatively, a combination that, the live view image generation process and the confirmation image generation process are the image generation processes 2, and the main image generation process is the image generation process 3 or 4, may be employed.

Moreover, the same type of image generation process may be adopted by the live view image generation process and the confirmation image generation process, and the calculation amounts may be adjusted in the processes. For example, when the image generation process 2 is adopted by the live view image generation process and the confirmation image generation process, the live view image generation process calculates the image displacement degrees only in one direction, and the confirmation image generation process calculates the image displacement degrees in two directions of vertical and horizontal directions, and thereby allowing a configuration which improves the accuracy of the image displacement degrees with respect to the confirmation image.

Alternatively, the confirmation image generation process may take the larger area for calculating the image displacement degree than the area in the live view generation process, and thereby allowing a configuration which improves the accuracy of the image displacement degrees.

According to such configuration, the live view image which is required to be displayed most rapidly can be generated at high speed using least calculations according to a speed of the CPU. The confirmation image can be displayed sufficiently with the image quality at least equivalent to the live view image, or with higher image quality depending on setting. Furthermore, as for the main image, it is possible to obtain a high quality image. Thus, a digital camera with higher convenience for a user can be provided by using different image generation processes according to a required display speed.

In addition, the hardware configurations and flowcharts are examples, and modification and correction can be made arbitrarily.

For example, in the present embodiments and the modifications of the embodiments, the image generation process is performed by the reconstruction image generator included in the digital camera 1. However, the image generation process (particularly a process performed by the main image generator) may be performed in an image processing device (for example, PC which has installed a program performing the image generation process) other than the digital camera 1. In this case, the light field image generated in another imaging device may be acquired and read by the image processing device, and this image processing device may perform the reconstruction process (the image generation process 6 or 7). In this case, another imaging device may store the position of the photographic object selected by the touch panel and the light field image in the removable media or the like. Accordingly a reconstruction in the image processing device is facilitated. Moreover, the photographic object distance measured at the time of photographing and the light field image are stored in advance in the removable media or the like so that these data can be utilized at the time of reconstruction.

The core elements for performing the process of the image generation, which includes the CPU 21, the ROM 22, the RAM 23 and the like, can be implemented using a general computer system, other than a dedicated system. For example, a computer program for performing the above-described operation is distributed by a computer readable recording medium (a flexible disk, CD-ROM, DVD-ROM, or the like) in which the program is stored, and the computer program is installed in a computer to implement a part for performing the above-described described image generation process. Alternatively, the computer program is stored in advance in a storage device included in a server located on a communication network such as the Internet, and a general computer system downloads the program to implement the part for performing the above-described described image generation process.

In cases where OS (operating system) and an application program shares and realizes the functions for performing the above-described image generation process or in cases where the OS and the application program realizes the functions in cooperation, only the application program may be stored in a recording medium or a storage device.

Moreover, it is also possible to distribute the computer program through a communication network. For example, the computer program may be places on the bulletin board system (BBS) on the communication network, and may be distributed through the network. The system may be constituted so that the above-described processes can be executed, by activating this computer program and executing the program as well as other application programs under a control of OS.

Although the embodiments of the present invention are described, the embodiments are only exemplification and does not limit the technical scope of the present invention. The present invention can employ other various embodiments, and various modifications, such as an omission and substitution, can be made within a range not departing from the gist of the present invention. These embodiments and the modifications thereof are included in the scope and gist of the invention described in the specification and the like, and in the invention specified in the claims and equivalent thereof.

[Industrial Availability]

The present invention can apply to an image processing device which can photograph a multi-view image and an image processing device which processes a multi-view image.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An image processing device comprising:
   an image obtainer that obtains a multi-view image in which sub-images from viewpoints are aligned;
   a clipper that clips partial images from the sub-images;
   a generator that generates a reconstruction image by arranging the partial images based on an alignment position of the sub-images corresponding to the partial images;
   a distance setter that sets a re-focal length of the reconstruction image;
   an interval determiner that determines an interval, at which the partial images are arranged on the reconstruction image, according to the re-focal length; and
   a size determiner that determines a clipping size of the partial images so that the partial images are overlapped on the reconstruction image.

2. The image processing device according to claim 1, further comprising:
   a blurring degree determiner that determines a blurring degree,
   wherein the size determiner determines a larger clipping size as the blurring degree is larger.

3. An image processing device comprising:
   an image obtainer that obtains a multi-view image in which sub-images from viewpoints are aligned;
   a clipper that clips partial images from the sub-images;
   a generator that generates a reconstruction image by arranging the partial images based on an alignment position of the sub-images corresponding to the partial images;
   a size determiner that determines a clipping size of the partial images; and
   a position determiner that determines clipping positions of the partial images,
   wherein the generator combines partial images corresponding to the clipping positions based on the clipping size and the alignment position of the sub-images, to generate the reconstruction image.

4. The image processing device according to claim 3, further comprising:
   a distance setter that sets a re-focal length of the reconstruction image,
   wherein the size determiner determines the clipping size according to the re-focal length.

5. The image processing device according to claim 4, wherein the size determiner determines a smaller clipping size as the re-focal length is larger.

6. The image processing device according to claim 3, wherein the position determiner determines the clipping positions according to a shape of a diaphragm by which the multi-view image is photographed.

7. The image processing device according to claim 3, wherein:
   the generator includes:
      an intermediate image generator that generates an intermediate image each time the position determiner determines the clipping positions, by arranging the partial images on the intermediate image based on the alignment position of the sub-images and the clipping positions currently determined by the position determiner; and
      a combiner that combines each of the generated intermediate images to generate the reconstruction image; and
   the image processing device further comprises a display that displays the reconstruction image in which the intermediate images are combined each time the position determiner determines the clipping positions.

8. An image processing device comprising:
   an image obtainer that obtains a multi-view image in which sub-images from viewpoints are aligned;
   a clipper that clips partial images from the sub-images;
   a generator that generates a reconstruction image by arranging the partial images based on an alignment position of the sub-images corresponding to the partial images;
   an image displacement obtainer that obtains image displacement degrees for the sub-images respectively, wherein each of the image displacement degrees indicates a displacement between a position of a predetermined part in the sub-image and a position of a part corresponding to a photographic object captured in the predetermined part in another sub-image; and
   a size determiner that determines a larger clipping size for the partial images with a larger image displacement degree.

9. The image processing device according to claim 8, wherein the image displacement obtainer calculates an image displacement degree for a sub-image selected as a calculation object from among the sub-images, and estimates the image displacement degree for a sub-image other than the calculation object based on the calculated image displacement degree.

10. The image processing device according to claim 9, wherein the image obtainer sequentially obtains multi-view images, the image displacement obtainer selects the sub-images for the calculation object in a cyclic manner, for each of the multi-view images sequentially obtained, to obtain the image displacement degrees for the sub-images, and the generator sequentially generates the reconstruction image from the sequentially obtained multi-view images using the sequentially obtained image displacement degrees.

11. An image processing device comprising:
    an image obtainer that obtains a multi-view image in which sub-images from viewpoints are aligned;
    a clipper that clips partial images from the sub-images;
    a generator that generates a reconstruction image by arranging the partial images based on an alignment position of the sub-images corresponding to the partial images; and
    a size determiner that determines a clipping size of the partial images to fit arrangement areas which are obtained by dividing the reconstruction image according to the sub-images.

12. An image processing device comprising:
    an image obtainer that obtains a multi-view image in which sub-images from viewpoints are aligned;
    a clipper that clips partial images from the sub-images;
    a generator that generates a reconstruction image by arranging the partial images based on an alignment position of the sub-images corresponding to the partial images; and
    a size determiner that determines a clipping size of the partial images,
    wherein the generator (a) divides the reconstruction image into arrangement areas corresponding to the sub-images, (b) reduces or expands the partial images to fit a size of a corresponding arrangement area, and (c) arranges the partial images.

13. An image processing device comprising:
an image obtainer that obtains a multi-view image in which sub-images from viewpoints are aligned;
a first selector that selects a first image from the sub-images;
a pixel selector that selects a first pixel included in the first image;
a second selector that selects a second image from the sub-images;
a searcher that searches a second pixel corresponding to the first pixel among pixels included in the second image;
a pixel processor that processes the sub-images by applying a blurring addition process to the first pixel and the second pixel in accordance with a blurring intensity, the blurring intensity being based on a positional relationship between the first pixel and the second pixel and a re-focal length; and
a reconstructor that reconstructs an image from the sub-images processed by the pixel processor.

14. The image processing device according to claim 13, wherein the reconstructor includes:
a clipper that clips partial images from the sub-images; and
a generator that arranges the partial images based on an alignment position of the sub-images corresponding to the partial images to generate the reconstruction image.

15. An image generating method comprising:
obtaining a multi-view image in which sub-images from viewpoints are aligned;
clipping partial images from the sub-images;
setting a re-focal length of a reconstruction image; and
generating the reconstruction image by arranging the partial images based on an alignment position of the sub-images corresponding to the partial images;
wherein generating the reconstruction image comprises determining an interval, at which the partial images are arranged on the reconstruction image, according to the re-focal length; and
wherein clipping the partial images comprises determining a clipping size of the partial images so that the partial images are overlapped on the reconstruction image.

16. A non-transitory computer-readable storage medium having a computer-executable program stored thereon, the program being executable to control a computer to execute functions comprising:
obtaining a multi-view image in which sub-images from viewpoints are aligned;
clipping partial images from the sub-images;
setting a re-focal length of a reconstruction image; and
generating the reconstruction image by arranging the partial images based on an alignment position of the sub-images corresponding to the partial images;
wherein generating the reconstruction image comprises determining an interval, at which the partial images are arranged on the reconstruction image, according to the re-focal length; and
wherein clipping the partial images comprises determining a clipping size of the partial images so that the partial images are overlapped on the reconstruction image.

17. An image generating method comprising:
obtaining a multi-view image in which sub-images from viewpoints are aligned;
clipping partial images from the sub-images; and
generating a reconstruction image by arranging the partial images based on an alignment position of the sub-images corresponding to the partial images;
wherein clipping the partial images comprises determining a clipping size of the partial images and clipping positions of the partial images; and
wherein generating the reconstruction image comprises combining partial images corresponding to the clipping positions based on the clipping size and the alignment position of the sub-images, to generate the reconstruction image.

18. An image generating method comprising:
obtaining a multi-view image in which sub-images from viewpoints are aligned;
obtaining image displacement degrees for the sub-images respectively, wherein each of the image displacement degrees indicates a displacement between a position of a predetermined part in the sub-image and a position of a part corresponding to a photographic object captured in the predetermined part in another sub-image;
clipping partial images from the sub-images, wherein a larger clipping size is determined for the partial images with a larger image displacement degree; and
generating a reconstruction image by arranging the partial images based on an alignment position of the sub-images corresponding to the partial images.

19. An image generating method comprising:
obtaining a multi-view image in which sub-images from viewpoints are aligned;
clipping partial images from the sub-images; and
generating a reconstruction image by arranging the partial images based on an alignment position of the sub-images corresponding to the partial images;
wherein clipping the partial images comprises determining a clipping size of the partial images to fit arrangement areas which are obtained by dividing the reconstruction image according to the sub-images.

20. An image generating method comprising:
obtaining a multi-view image in which sub-images from viewpoints are aligned;
clipping partial images from the sub-images; and
generating a reconstruction image by arranging the partial images based on an alignment position of the sub-images corresponding to the partial images;
wherein clipping the partial images comprises determines a clipping size of the partial images; and
wherein generating the reconstruction image comprises (a) dividing the reconstruction image into arrangement areas corresponding to the sub-images, (b) reducing or expanding the partial images to fit a size of a corresponding arrangement area, and (c) arranging the partial images.

21. An image generating method comprising:
obtaining a multi-view image in which sub-images from viewpoints are aligned;
selecting a first image from the sub-images;
selecting a first pixel included in the first image;
selecting a second image from the sub-images;
searching a second pixel corresponding to the first pixel among pixels included in the second image;
processing the sub-images by applying a blurring addition process to the first pixel and the second pixel in accordance with a blurring intensity, the blurring intensity being based on a positional relationship between the first pixel and the second pixel and a re-focal length; and
reconstructing an image from the sub-images having been processed.

22. A non-transitory computer-readable storage medium having a computer-executable program stored thereon, the program being executable to control a computer to execute functions comprising:
- obtaining a multi-view image in which sub-images from viewpoints are aligned;
- clipping partial images from the sub-images; and
- generating a reconstruction image by arranging the partial images based on an alignment position of the sub-images corresponding to the partial images;
- wherein clipping the partial images comprises determining a clipping size of the partial images and clipping positions of the partial images; and
- wherein generating the reconstruction image comprises combining partial images corresponding to the clipping positions based on the clipping size and the alignment position of the sub-images, to generate the reconstruction image.

23. A non-transitory computer-readable storage medium having a computer-executable program stored thereon, the program being executable to control a computer to execute functions comprising:
- obtaining a multi-view image in which sub-images from viewpoints are aligned;
- obtaining image displacement degrees for the sub-images respectively, wherein each of the image displacement degrees indicates a displacement between a position of a predetermined part in the sub-image and a position of a part corresponding to a photographic object captured in the predetermined part in another sub-image;
- clipping partial images from the sub-images, wherein a larger clipping size is determined for the partial images with a larger image displacement degree; and
- generating a reconstruction image by arranging the partial images based on an alignment position of the sub-images corresponding to the partial images.

24. A non-transitory computer-readable storage medium having a computer-executable program stored thereon, the program being executable to control a computer to execute functions comprising:
- obtaining a multi-view image in which sub-images from viewpoints are aligned;
- clipping partial images from the sub-images; and
- generating a reconstruction image by arranging the partial images based on an alignment position of the sub-images corresponding to the partial images;
- wherein clipping the partial images comprises determining a clipping size of the partial images to fit arrangement areas which are obtained by dividing the reconstruction image according to the sub-images.

25. A non-transitory computer-readable storage medium having a computer-executable program stored thereon, the program being executable to control a computer to execute functions comprising:
- obtaining a multi-view image in which sub-images from viewpoints are aligned;
- clipping partial images from the sub-images; and
- generating a reconstruction image by arranging the partial images based on an alignment position of the sub-images corresponding to the partial images;
- wherein clipping the partial images comprises determines a clipping size of the partial images; and
- wherein generating the reconstruction image comprises (a) dividing the reconstruction image into arrangement areas corresponding to the sub-images, (b) reducing or expanding the partial images to fit a size of a corresponding arrangement area, and (c) arranging the partial images.

26. A non-transitory computer-readable storage medium having a computer-executable program stored thereon, the program being executable to control a computer to execute functions comprising:
- obtaining a multi-view image in which sub-images from viewpoints are aligned;
- selecting a first image from the sub-images;
- selecting a first pixel included in the first image;
- selecting a second image from the sub-images;
- searching a second pixel corresponding to the first pixel among pixels included in the second image;
- processing the sub-images by applying a blurring addition process to the first pixel and the second pixel in accordance with a blurring intensity, the blurring intensity being based on a positional relationship between the first pixel and the second pixel and a re-focal length; and
- reconstructing an image from the sub-images having been processed.

* * * * *

UNITED STATES PATENT AND TRADEMARK OFFICE
CERTIFICATE OF CORRECTION

PATENT NO. : 8,941,750 B2
APPLICATION NO. : 13/721582
DATED : January 27, 2015
INVENTOR(S) : Yamamoto It is certified that error appears in the above-identified patent and that said Letters Patent is hereby corrected as shown below:

In the Claims

Column 42, Claim 20, line 8, delete "determines" and insert --determining--.

Column 44, Claim 25, line 11, delete "determines" and insert --determining--.

Signed and Sealed this
Twenty-first Day of July, 2015

Michelle K. Lee
*Director of the United States Patent and Trademark Office*